United States Patent
Mercury et al.

(10) Patent No.: US 11,042,885 B2
(45) Date of Patent: Jun. 22, 2021

(54) DIGITAL CREDENTIAL SYSTEM FOR EMPLOYER-BASED SKILLS ANALYSIS

(71) Applicant: Pearson Education, Inc., New York, NY (US)

(72) Inventors: Mark Mercury, Minneapolis, MN (US); Jarin Schmidt, Eden Prairie, MN (US); E. Clarke Porter, Minneapolis, MN (US); Peter Pascale, Edina, MN (US); Andrew Stockinger, Bloomington, MN (US); Ronald D. Lancaster, Jr., Saint Paul, MN (US)

(73) Assignee: PEARSON EDUCATION, INC., New York, NY (US)

( * ) Notice: Subject to any disclaimer, the term of this patent is extended or adjusted under 35 U.S.C. 154(b) by 95 days.

(21) Appl. No.: 16/123,910

(22) Filed: Sep. 6, 2018

(65) Prior Publication Data
US 2019/0087781 A1    Mar. 21, 2019

Related U.S. Application Data

(60) Provisional application No. 62/559,433, filed on Sep. 15, 2017.

(51) Int. Cl.
*G06Q 30/00*  (2012.01)
*G06F 16/23*  (2019.01)
(Continued)

(52) U.S. Cl.
CPC .......... *G06Q 30/018* (2013.01); *G06F 3/011* (2013.01); *G06F 16/2365* (2019.01);
(Continued)

(58) Field of Classification Search
CPC .... G06F 16/2379; G06F 3/011; G06F 16/285; G06F 16/2365; G06F 30/20;
(Continued)

(56) References Cited

U.S. PATENT DOCUMENTS 4,413,277 A    11/1983    Murray
4,425,097 A    1/1984     Owens
(Continued)

FOREIGN PATENT DOCUMENTS

WO    2008030759 A1    3/2008

OTHER PUBLICATIONS

E. Niehaus, M. Platz, M. Herselman and A. Botha, "Using digital badges in South Africa informing the validation of a multi-channel open badge system at a German University," 2017 IST-Africa Week Conference (IST-Africa), Windhoek, 2017, pp. 1-12, doi: 10.23919/ISTAFRICA.2017.8101977. (Year: 2017).*

(Continued)

*Primary Examiner* — Bruce I Ebersman
*Assistant Examiner* — Steven R Chism
(74) *Attorney, Agent, or Firm* — Quarles & Brady LLP

(57) ABSTRACT

Techniques relate to managing digital credentials. An employee records database is accessed to identify a plurality of employees. Within the plurality of employees, a first set of employees is identified. For each employee in the first set of employees, a server computer hosting a digital credential repository is accessed to identify a plurality of digital credentials associated with the employee. The plurality of digital credentials of each employee in the first set of employees are analyzed to generate a statistical analysis of the plurality of digital credentials. With the statistical analysis complete, data identifying the statistical analysis is transmitted to a user device.

9 Claims, 47 Drawing Sheets

(51) Int. Cl.
*H04W 4/38* (2018.01)
*G06F 16/28* (2019.01)
*G06K 9/00* (2006.01)
*G06F 30/20* (2020.01)
*G06F 40/186* (2020.01)
*G06F 21/32* (2013.01)
*G06Q 10/06* (2012.01)
*G09B 7/00* (2006.01)
*G06F 3/01* (2006.01)
*G06F 21/31* (2013.01)
*H04L 29/06* (2006.01)
*H04L 29/08* (2006.01)
*G06Q 10/10* (2012.01)
*G06Q 50/20* (2012.01)
*G06N 20/00* (2019.01)
*G06T 7/73* (2017.01)
*H04N 7/18* (2006.01)

(52) U.S. Cl.
CPC ........ *G06F 16/2379* (2019.01); *G06F 16/285* (2019.01); *G06F 21/316* (2013.01); *G06F 21/32* (2013.01); *G06F 30/20* (2020.01); *G06F 40/186* (2020.01); *G06K 9/00288* (2013.01); *G06K 9/00302* (2013.01); *G06N 20/00* (2019.01); *G06Q 10/067* (2013.01); *G06Q 10/06393* (2013.01); *G06Q 10/06398* (2013.01); *G06Q 10/063112* (2013.01); *G06Q 10/105* (2013.01); *G06Q 50/2057* (2013.01); *G06T 7/74* (2017.01); *G09B 7/00* (2013.01); *H04L 63/083* (2013.01); *H04L 63/0861* (2013.01); *H04L 63/0876* (2013.01); *H04L 63/107* (2013.01); *H04L 67/22* (2013.01); *H04L 67/306* (2013.01); *H04L 67/38* (2013.01); *H04W 4/38* (2018.02); *G06K 9/00335* (2013.01); *G06Q 10/0639* (2013.01); *G06Q 10/06395* (2013.01); *G06T 2207/10016* (2013.01); *G06T 2207/30201* (2013.01); *H04N 7/18* (2013.01)

(58) Field of Classification Search
CPC ...... G06F 40/186; G06F 21/316; G06F 21/32; G06Q 30/018; G06Q 10/063112; G06Q 10/06393; G06Q 10/06398; G06Q 10/067; G06Q 10/105; G06Q 50/2057; G06T 7/74; G06T 2207/10016; G06T 2207/30201; G06N 20/00; G09B 7/00; G06K 9/00288; G06K 9/00302; G06K 9/00335; H04W 4/38; H04N 7/18; H04L 63/083; H04L 63/0876; H04L 63/107; H04L 67/22
See application file for complete search history.

(56) References Cited

U.S. PATENT DOCUMENTS

| | | |
|---|---|---|
| 4,671,772 A | 6/1987 | Slade et al. |
| 5,103,408 A | 4/1992 | Greenberg et al. |
| 5,212,635 A | 5/1993 | Ferriter |
| 5,239,460 A | 8/1993 | LaRoche |
| 5,444,226 A | 8/1995 | Collins, Jr. |
| 5,535,256 A | 7/1996 | Maloney et al. |
| 5,748,738 A | 5/1998 | Bisbee et al. |
| 5,781,732 A | 7/1998 | Adams |
| 5,892,900 A | 4/1999 | Ginter |
| 5,909,669 A | 6/1999 | Havens |
| 5,963,649 A | 10/1999 | Sako |
| 5,980,429 A | 11/1999 | Nashner |
| 6,033,226 A | 3/2000 | Bullen |
| 6,056,556 A | 5/2000 | Braun et al. |
| 6,119,097 A | 9/2000 | Ibarra |
| 6,146,148 A | 11/2000 | Stuppy |
| 6,157,808 A | 12/2000 | Hollingsworth |
| 6,183,259 B1 | 2/2001 | Macri et al. |
| 6,389,402 B1 | 5/2002 | Ginter et al. |
| 6,431,875 B1 | 8/2002 | Elliott et al. |
| 6,513,014 B1 | 1/2003 | Walker et al. |
| 6,516,411 B2 | 2/2003 | Smith |
| 6,659,038 B2 | 12/2003 | Salva Calcagno |
| 6,735,574 B2 | 5/2004 | Bull |
| 6,792,394 B1 | 9/2004 | Matsko et al. |
| 6,850,252 B1 | 2/2005 | Hoffberg |
| 6,871,195 B2 | 3/2005 | Ryan et al. |
| 6,948,657 B2 | 9/2005 | Sugino et al. |
| 6,973,196 B2 | 12/2005 | Patton et al. |
| 6,988,199 B2 | 1/2006 | Toh et al. |
| 7,043,453 B2 | 5/2006 | Stetik et al. |
| 7,089,583 B2 | 8/2006 | Mehra et al. |
| 7,097,617 B1 | 8/2006 | Smith |
| 7,099,849 B1 | 8/2006 | Reeder et al. |
| 7,133,845 B1 | 11/2006 | Ginter |
| 7,188,138 B1 | 3/2007 | Schneider |
| 7,197,161 B2 | 3/2007 | Fan |
| 7,206,765 B2 | 4/2007 | Gilliam et al. |
| 7,206,941 B2 | 4/2007 | Raley et al. |
| 7,222,086 B2 | 5/2007 | Huffman |
| 7,237,114 B1 | 6/2007 | Rosenberg |
| 7,237,144 B2 | 6/2007 | Safford et al. |
| 7,277,925 B2 | 10/2007 | Warnock |
| 7,278,168 B1 | 10/2007 | Chaudhury et al. |
| 7,302,634 B2 | 11/2007 | Lucovsky et al. |
| 7,328,245 B1 | 2/2008 | Hull et al. |
| 7,340,058 B2 | 3/2008 | Jakobsson et al. |
| 7,353,541 B1 | 4/2008 | Ishibashi et al. |
| 7,392,395 B2 | 6/2008 | Ginter et al. |
| 7,441,263 B1 | 10/2008 | Bakshi et al. |
| 7,483,670 B2 | 1/2009 | Walker et al. |
| 7,587,369 B2 | 9/2009 | Ginter et al. |
| 7,596,689 B2 | 9/2009 | Toh et al. |
| 7,606,401 B2 | 10/2009 | Hoffman et al. |
| 7,630,986 B1 * | 12/2009 | Herz ..................... G06Q 10/10 |
| 7,653,556 B2 | 1/2010 | Rovinelli et al. |
| 7,660,902 B2 | 2/2010 | Graham et al. |
| 7,660,981 B1 | 2/2010 | Hunt |
| 7,665,141 B2 | 2/2010 | Young |
| 7,676,568 B2 | 3/2010 | Day |
| 7,702,531 B2 | 4/2010 | Draper et al. |
| 7,725,723 B2 | 5/2010 | Landrock et al. |
| 7,743,259 B2 | 6/2010 | Raley et al. |
| 7,764,772 B2 | 7/2010 | Weksel |
| 7,769,712 B2 | 8/2010 | Waldo |
| 7,793,106 B2 | 9/2010 | Bugbee |
| 7,805,382 B2 | 9/2010 | Rosen et al. |
| 7,817,162 B2 | 10/2010 | Bolick et al. |
| 7,860,736 B2 | 12/2010 | Draper et al. |
| 7,865,937 B1 | 1/2011 | White et al. |
| 7,881,898 B2 | 2/2011 | Gedlinske et al. |
| 7,970,722 B1 | 6/2011 | Owen et al. |
| 8,014,992 B2 | 9/2011 | Smith |
| 8,051,289 B2 | 11/2011 | Johnson et al. |
| 8,103,634 B2 | 1/2012 | Saito |
| 8,182,271 B2 | 5/2012 | Sacher |
| 8,190,468 B1 | 5/2012 | Drew et al. |
| 8,195,657 B1 | 6/2012 | Dellovo |
| RE43,601 E | 8/2012 | Arseneau et al. |
| 8,414,387 B2 | 4/2013 | Paradise et al. |
| 8,428,926 B2 | 4/2013 | Choquet |
| 8,443,202 B2 | 5/2013 | White et al. |
| 8,447,272 B2 | 5/2013 | Faith et al. |
| 8,457,353 B2 | 6/2013 | Reville et al. |
| 8,512,043 B2 | 8/2013 | Choquet |
| 8,554,685 B2 | 10/2013 | Patterson et al. |
| 8,628,331 B1 | 1/2014 | Wright |
| 8,693,737 B1 | 4/2014 | Newman et al. |
| 8,694,793 B2 | 4/2014 | Evans |
| 8,714,981 B2 | 5/2014 | Herman et al. |
| 8,764,454 B1 | 7/2014 | Turner |
| 8,819,793 B2 | 8/2014 | Gottschalk, Jr. |

(56) References Cited

U.S. PATENT DOCUMENTS

| | | |
|---|---|---|
| 8,826,030 B2 | 9/2014 | White et al. |
| 8,949,608 B2 | 2/2015 | Hoornaert et al. |
| 8,958,606 B2 | 2/2015 | Hanna et al. |
| 9,036,871 B2 | 5/2015 | Hanna et al. |
| 9,112,730 B2 | 8/2015 | Dewaele et al. |
| 9,141,827 B2 | 9/2015 | Ho et al. |
| 9,280,706 B2 | 3/2016 | Hanna |
| 9,373,002 B2 | 6/2016 | Johnson et al. |
| 9,495,526 B2 | 11/2016 | Hanna |
| 9,509,690 B2 | 11/2016 | Carter et al. |
| 9,589,183 B2 | 3/2017 | Brown |
| 9,646,217 B2 | 5/2017 | Hanna |
| 9,667,427 B2 | 5/2017 | Oberhauser et al. |
| 9,729,411 B2 | 8/2017 | Purusothaman |
| 9,729,556 B2 | 8/2017 | Brock |
| 9,786,193 B2 | 10/2017 | Falash et al. |
| 9,792,659 B2 | 10/2017 | Ho et al. |
| 9,858,828 B1 | 1/2018 | Fuka |
| 9,931,539 B1 | 4/2018 | De Pablos et al. |
| 9,990,856 B2 | 6/2018 | Kuchenbecker et al. |
| 10,025,987 B2 | 7/2018 | Ackland et al. |
| 10,032,075 B2 | 7/2018 | Hanna |
| 10,033,536 B2 | 7/2018 | Mercury et al. |
| 10,043,229 B2 | 8/2018 | Hanna |
| 10,052,026 B1 | 8/2018 | Tran |
| 10,055,733 B2 | 8/2018 | Hanna |
| 10,068,074 B2 | 9/2018 | Mercury et al. |
| 10,086,262 B1 | 10/2018 | Capper et al. |
| 10,101,804 B1 | 10/2018 | Tennakoon et al. |
| 10,114,609 B2 | 10/2018 | Annett et al. |
| 10,133,856 B2 | 11/2018 | Nama |
| 10,152,141 B1 | 12/2018 | Lohse et al. |
| 10,187,394 B2 | 1/2019 | Bar et al. |
| 10,198,962 B2 | 2/2019 | Postlethwaite et al. |
| 10,225,522 B1 | 3/2019 | Kusens |
| 10,242,501 B1 | 3/2019 | Pusch et al. |
| 10,311,299 B2 | 6/2019 | Gerber et al. |
| 10,311,300 B2 | 6/2019 | Teverovskiy |
| 10,373,523 B1 | 8/2019 | Fields et al. |
| 10,402,771 B1 | 9/2019 | De et al. |
| 10,460,083 B2 | 10/2019 | Baldwin et al. |
| 10,489,526 B1 | 11/2019 | Sattigeri et al. |
| 10,510,267 B2 | 12/2019 | Jarc et al. |
| 10,581,828 B2 | 3/2020 | Kessler et al. |
| 10,783,801 B1 | 9/2020 | Beaubien et al. |
| 10,878,714 B2 | 12/2020 | Liberatore et al. |
| 10,885,530 B2 | 1/2021 | Mercury et al. |
| 2001/0032094 A1 | 10/2001 | Ghosh et al. |
| 2001/0047326 A1 | 11/2001 | Broadbent et al. |
| 2002/0023140 A1 | 2/2002 | Hile et al. |
| 2002/0026574 A1 | 2/2002 | Watanabe et al. |
| 2002/0026581 A1 | 2/2002 | Matsuyama et al. |
| 2002/0037094 A1 | 3/2002 | Salva Calcagno |
| 2002/0052896 A1 | 5/2002 | Streit et al. |
| 2002/0087861 A1 | 7/2002 | Segev et al. |
| 2002/0095389 A1 | 7/2002 | Gaines |
| 2002/0128844 A1 | 9/2002 | Wilson et al. |
| 2002/0143818 A1 | 10/2002 | Roberts et al. |
| 2002/0157015 A1 | 10/2002 | Gilbert et al. |
| 2002/0192624 A1 | 12/2002 | Darby et al. |
| 2002/0197584 A1 | 12/2002 | Kendir et al. |
| 2003/0028494 A1 | 2/2003 | King et al. |
| 2003/0048294 A1 | 3/2003 | Arnold |
| 2003/0070072 A1 | 4/2003 | Nassiri |
| 2003/0120589 A1 | 6/2003 | Williams et al. |
| 2003/0182234 A1 | 9/2003 | Degroot |
| 2003/0187798 A1 | 10/2003 | McKinley et al. |
| 2003/0191653 A1 | 10/2003 | Birnbaum et al. |
| 2003/0233563 A1 | 12/2003 | Kruse |
| 2004/0039704 A1 | 2/2004 | Gilliam et al. |
| 2004/0054893 A1 | 3/2004 | Ellis |
| 2004/0123111 A1 | 6/2004 | Makita et al. |
| 2004/0131999 A1 | 7/2004 | Dresnick |
| 2004/0133793 A1 | 7/2004 | Ginter et al. |
| 2004/0158476 A1 | 8/2004 | Blessinger et al. |
| 2004/0185931 A1 | 9/2004 | Lowell et al. |
| 2004/0220815 A1 | 11/2004 | Belanger et al. |
| 2004/0237035 A1 | 11/2004 | Cummins |
| 2004/0248071 A1 | 12/2004 | Bedziouk et al. |
| 2005/0027558 A1 | 2/2005 | Yamamoto |
| 2005/0027568 A1 | 2/2005 | Dorris |
| 2005/0048453 A1 | 3/2005 | Macri et al. |
| 2005/0080682 A1 | 4/2005 | Wilson |
| 2005/0177412 A1 | 8/2005 | Kemp |
| 2005/0182821 A1 | 8/2005 | Chan et al. |
| 2005/0222899 A1 | 10/2005 | Varadarajan et al. |
| 2005/0229258 A1 | 10/2005 | Pigin |
| 2005/0257253 A1 | 11/2005 | Ekers et al. |
| 2005/0262339 A1 | 11/2005 | Fischer |
| 2005/0273621 A1 | 12/2005 | Davis |
| 2005/0288939 A1 | 12/2005 | Peled et al. |
| 2005/0289058 A1 | 12/2005 | Hoffman et al. |
| 2006/0039304 A1 | 2/2006 | Singer et al. |
| 2006/0095317 A1 | 5/2006 | Brown et al. |
| 2006/0095831 A1 | 5/2006 | Kawada et al. |
| 2006/0180658 A1 | 8/2006 | Anderson |
| 2006/0274945 A1 | 12/2006 | Chu et al. |
| 2006/0282661 A1 | 12/2006 | True et al. |
| 2007/0006322 A1 | 1/2007 | Karimzadeh et al. |
| 2007/0038859 A1 | 2/2007 | Tadayon et al. |
| 2007/0074270 A1 | 3/2007 | Meehan et al. |
| 2007/0118735 A1 | 5/2007 | Cherrington et al. |
| 2007/0124584 A1 | 5/2007 | Gupta |
| 2007/0192140 A1 | 8/2007 | Gropper |
| 2007/0192173 A1 | 8/2007 | Moughler et al. |
| 2007/0192609 A1 | 8/2007 | Yoshioka et al. |
| 2007/0220614 A1 | 9/2007 | Ellis et al. |
| 2007/0226488 A1 | 9/2007 | Lin et al. |
| 2007/0269788 A1 | 11/2007 | Flowers et al. |
| 2007/0289022 A1 | 12/2007 | Wittkotter |
| 2008/0005024 A1 | 1/2008 | Kirkwood |
| 2008/0014917 A1 | 1/2008 | Rhoads et al. |
| 2008/0027747 A1* | 1/2008 | McGovern ......... G06Q 10/1053 705/321 |
| 2008/0044801 A1 | 2/2008 | Modica et al. |
| 2008/0066181 A1 | 3/2008 | Haveson et al. |
| 2008/0071746 A1 | 3/2008 | Concordia et al. |
| 2008/0083025 A1 | 4/2008 | Meijer et al. |
| 2008/0091954 A1 | 4/2008 | Morris et al. |
| 2008/0106756 A1 | 5/2008 | Okamoto |
| 2008/0208646 A1 | 8/2008 | Thompson et al. |
| 2008/0208873 A1 | 8/2008 | Boehmer |
| 2008/0235175 A1 | 9/2008 | Olive |
| 2008/0235236 A1 | 9/2008 | Olive |
| 2009/0012433 A1 | 1/2009 | Fernstrom et al. |
| 2009/0049070 A1 | 2/2009 | Steinberg |
| 2009/0172777 A1 | 7/2009 | Hansen et al. |
| 2009/0299827 A1 | 12/2009 | Puri et al. |
| 2010/0033739 A1 | 2/2010 | Phelan et al. |
| 2010/0057487 A1 | 3/2010 | Heh et al. |
| 2010/0099060 A1 | 4/2010 | Bijou |
| 2010/0106645 A1 | 4/2010 | Peckover |
| 2010/0122093 A1 | 5/2010 | Tuyls et al. |
| 2010/0150448 A1 | 6/2010 | Lecerf et al. |
| 2010/0167248 A1 | 7/2010 | Ryan |
| 2010/0205649 A1 | 8/2010 | Becker et al. |
| 2010/0217988 A1 | 8/2010 | Johnson |
| 2010/0332008 A1 | 12/2010 | Knipfer et al. |
| 2011/0022496 A1 | 1/2011 | Johnson et al. |
| 2011/0066490 A1 | 3/2011 | Bassin et al. |
| 2011/0165542 A1 | 7/2011 | Campbell et al. |
| 2011/0279228 A1 | 11/2011 | Kumar |
| 2011/0320423 A1 | 12/2011 | Gemmell et al. |
| 2012/0059917 A1 | 3/2012 | Dawson et al. |
| 2012/0069131 A1 | 3/2012 | Abelow |
| 2012/0122062 A1 | 5/2012 | Yang et al. |
| 2013/0011819 A1 | 1/2013 | Horseman |
| 2013/0012786 A1 | 1/2013 | Horseman |
| 2013/0012788 A1 | 1/2013 | Horseman |
| 2013/0012790 A1 | 1/2013 | Horseman |
| 2013/0012802 A1 | 1/2013 | Horseman |
| 2013/0013327 A1 | 1/2013 | Horseman |
| 2013/0063432 A1 | 3/2013 | Kaps et al. |
| 2013/0086484 A1 | 4/2013 | Antin et al. |

(56) References Cited

U.S. PATENT DOCUMENTS

| | | |
|---|---|---|
| 2013/0097093 A1 | 4/2013 | Kolber et al. |
| 2013/0117400 A1 | 5/2013 | An et al. |
| 2013/0128022 A1 | 5/2013 | Bose et al. |
| 2013/0189656 A1 | 7/2013 | Zboray et al. |
| 2013/0203509 A1 | 8/2013 | Reed et al. |
| 2013/0210406 A1 | 8/2013 | Vidal et al. |
| 2013/0251214 A1 | 9/2013 | Chung |
| 2013/0281079 A1 | 10/2013 | Vidal et al. |
| 2013/0311244 A1 | 11/2013 | Abotchie |
| 2013/0317791 A1 | 11/2013 | Danielson |
| 2013/0340058 A1 | 12/2013 | Barnes et al. |
| 2014/0006615 A1 | 1/2014 | Karnik et al. |
| 2014/0039956 A1 | 2/2014 | Cicio, Jr. |
| 2014/0045589 A1 | 2/2014 | Paradise et al. |
| 2014/0101264 A1 | 4/2014 | Dewaele et al. |
| 2014/0122355 A1 | 5/2014 | Hardtke et al. |
| 2014/0162224 A1 | 6/2014 | Wallace et al. |
| 2014/0163333 A1 | 6/2014 | Horseman |
| 2014/0173748 A1 | 6/2014 | Esmailzdeh |
| 2014/0195312 A1 | 7/2014 | Ansel et al. |
| 2014/0205990 A1 | 7/2014 | Wellman et al. |
| 2014/0278821 A1 | 9/2014 | McConnell |
| 2014/0279587 A1 | 9/2014 | Gafford |
| 2014/0304181 A1* | 10/2014 | Kurien ............... G07C 9/27 705/321 |
| 2014/0304787 A1 | 10/2014 | Kurien et al. |
| 2014/0309849 A1 | 10/2014 | Ricci |
| 2014/0315164 A1 | 10/2014 | Jones et al. |
| 2014/0330412 A1 | 11/2014 | Bjarnason |
| 2014/0336796 A1 | 11/2014 | Agnew |
| 2014/0348396 A1 | 11/2014 | Laaser et al. |
| 2014/0349255 A1 | 11/2014 | Watt et al. |
| 2014/0353369 A1 | 12/2014 | Malin et al. |
| 2014/0369602 A1 | 12/2014 | Meier et al. |
| 2014/0376876 A1 | 12/2014 | Bentley et al. |
| 2015/0052075 A1 | 2/2015 | Jayadevan et al. |
| 2015/0056582 A1 | 2/2015 | Selvaraj |
| 2015/0059003 A1 | 2/2015 | Bouse |
| 2015/0066612 A1 | 3/2015 | Karpoff et al. |
| 2015/0066792 A1 | 3/2015 | Sprague |
| 2015/0067811 A1 | 3/2015 | Agnew et al. |
| 2015/0079545 A1 | 3/2015 | Kurtz |
| 2015/0095999 A1 | 4/2015 | Toth |
| 2015/0104757 A1 | 4/2015 | Moncrief et al. |
| 2015/0127565 A1 | 5/2015 | Chevalier et al. |
| 2015/0164409 A1 | 6/2015 | Benson et al. |
| 2015/0187224 A1 | 7/2015 | Moncrief et al. |
| 2015/0196804 A1 | 7/2015 | Koduri et al. |
| 2015/0196805 A1 | 7/2015 | Koduri et al. |
| 2015/0200935 A1 | 7/2015 | Ikeda et al. |
| 2015/0229623 A1 | 8/2015 | Grigg et al. |
| 2015/0242797 A1 | 8/2015 | Hoanca et al. |
| 2015/0242979 A1 | 8/2015 | Abts |
| 2015/0249661 A1* | 9/2015 | Cauthen ............. H04L 63/0823 726/10 |
| 2015/0302769 A1 | 10/2015 | Johnson |
| 2015/0318993 A1 | 11/2015 | Hamlin et al. |
| 2015/0375104 A1 | 12/2015 | Nishar et al. |
| 2016/0004862 A1 | 1/2016 | Almehmadi et al. |
| 2016/0059136 A1 | 3/2016 | Ferris |
| 2016/0063314 A1 | 3/2016 | Sarnet |
| 2016/0163217 A1 | 6/2016 | Harkness |
| 2016/0180248 A1 | 6/2016 | Regan |
| 2016/0188765 A1 | 6/2016 | Vossler et al. |
| 2016/0203732 A1 | 7/2016 | Wallace et al. |
| 2016/0248598 A1 | 8/2016 | Lin et al. |
| 2016/0248759 A1 | 8/2016 | Tsurumi et al. |
| 2016/0253486 A1* | 9/2016 | Sarkar .................. G06F 21/316 726/7 |
| 2016/0253710 A1 | 9/2016 | Publicover et al. |
| 2016/0267292 A1 | 9/2016 | Johnson et al. |
| 2016/0322078 A1 | 11/2016 | Bose et al. |
| 2016/0323173 A1 | 11/2016 | Bivens et al. |
| 2016/0356751 A1 | 12/2016 | Blackley |
| 2016/0360791 A1 | 12/2016 | Blackley |
| 2016/0361452 A1 | 12/2016 | Blackley |
| 2016/0361677 A1 | 12/2016 | Blackley |
| 2016/0361678 A1 | 12/2016 | Blackley |
| 2016/0361972 A1 | 12/2016 | Blackley |
| 2016/0363332 A1 | 12/2016 | Blackley |
| 2016/0363339 A1 | 12/2016 | Blackley |
| 2016/0363567 A1 | 12/2016 | Blackley |
| 2016/0363570 A1 | 12/2016 | Blackley |
| 2016/0363572 A1 | 12/2016 | Blackley |
| 2016/0363582 A1 | 12/2016 | Blackley |
| 2016/0363917 A1 | 12/2016 | Blackley |
| 2016/0367925 A1 | 12/2016 | Blackley |
| 2016/0367926 A1 | 12/2016 | Blackley |
| 2016/0367927 A1 | 12/2016 | Blackley |
| 2016/0370335 A1 | 12/2016 | Blackley |
| 2016/0370337 A1 | 12/2016 | Blackley |
| 2016/0370340 A1 | 12/2016 | Blackley |
| 2017/0005868 A1 | 1/2017 | Scheines et al. |
| 2017/0020195 A1 | 1/2017 | Cameron |
| 2017/0031449 A1 | 2/2017 | Karsten et al. |
| 2017/0032248 A1 | 2/2017 | Dotan-Cohan et al. |
| 2017/0054702 A1 | 2/2017 | Turgeman |
| 2017/0132464 A1 | 5/2017 | Brown |
| 2017/0139762 A1 | 5/2017 | Sherlock et al. |
| 2017/0147801 A1 | 5/2017 | Hamlin et al. |
| 2017/0148340 A1 | 5/2017 | Popa-Simil et al. |
| 2017/0154307 A1 | 6/2017 | Maurya et al. |
| 2017/0154310 A1 | 6/2017 | Duerr et al. |
| 2017/0154539 A1 | 6/2017 | King et al. |
| 2017/0176127 A1 | 6/2017 | Ferris |
| 2017/0193839 A1 | 7/2017 | Breed |
| 2017/0206064 A1 | 7/2017 | Breazeal et al. |
| 2017/0206567 A1 | 7/2017 | Sutton-Shearer |
| 2017/0272427 A1 | 9/2017 | Robison et al. |
| 2017/0279614 A1 | 9/2017 | Mercury et al. |
| 2017/0323244 A1 | 11/2017 | Rani et al. |
| 2017/0357928 A1 | 12/2017 | Ross et al. |
| 2017/0361213 A1 | 12/2017 | Goslin et al. |
| 2017/0372249 A1 | 12/2017 | Abraham et al. |
| 2018/0040256 A1 | 2/2018 | Alvarez et al. |
| 2018/0075229 A1 | 3/2018 | Jan |
| 2018/0083986 A1 | 3/2018 | Hurley et al. |
| 2018/0095613 A1 | 4/2018 | Ready et al. |
| 2018/0096306 A1 | 4/2018 | Wang et al. |
| 2018/0129790 A1 | 5/2018 | Nama et al. |
| 2018/0143757 A1 | 5/2018 | Champion et al. |
| 2018/0144108 A1 | 5/2018 | Sawai et al. |
| 2018/0144541 A1 | 5/2018 | Champion et al. |
| 2018/0173871 A1 | 6/2018 | Toth |
| 2018/0268341 A1 | 9/2018 | Rini et al. |
| 2018/0284453 A1 | 10/2018 | Irvin et al. |
| 2018/0341901 A1 | 11/2018 | Shike |
| 2018/0101806 A1 | 12/2018 | Adepoju |
| 2019/0028492 A1 | 1/2019 | Coleman et al. |
| 2019/0051046 A1 | 2/2019 | Jin et al. |
| 2019/0051199 A1 | 2/2019 | Corbett |
| 2019/0089701 A1 | 3/2019 | Mercury et al. |
| 2019/0090816 A1 | 3/2019 | Horseman |
| 2019/0114940 A1 | 4/2019 | Gobert et al. |
| 2019/0124471 A1 | 4/2019 | Chelnik |
| 2019/0207932 A1 | 7/2019 | Bud et al. |
| 2019/0295101 A1 | 9/2019 | Porter et al. |
| 2020/0118456 A1 | 4/2020 | Breed et al. |
| 2020/0160180 A1 | 5/2020 | Lehr et al. |
| 2020/0279464 A1 | 9/2020 | Llewelyn |

OTHER PUBLICATIONS

Alicoding et al., "BadgeKit API" Aug. 25, 2015, 3 pages. Retrieved from URL: https://github.com/mozilla/badgekit-api.

Badge Alliance Standard Working Group, "Open Badges Specification v1.1" Badge Alliance, published May 1, 2015, 10 pages. Retrieved on Apr. 27, 2018, from URL: https://openbadgespec.org/history/1.1-specification.html.

Badge Alliance Standard Working Group, "Open Badges Technical Specification" Badge Alliance, published May 1, 2015, 9 pages. Retrieved on Nov. 28, 2017 (archive date: Apr. 26, 2016), from

(56) References Cited

OTHER PUBLICATIONS

URL: http://web.archive.org/web/20160426204303 /https://openbadgespec.org/.

Brianloveswords, "Authorization" Mar. 3, 2014, 2 pages. Retrieved from URL: https://github.com/mozilla/badgekit-api/blob/master/docs/authorization.md.

Chamilo / chamilo-lms, "Get badges when the user has achieved skills—ref BT#9082" Feb. 12, 2015, 2 pages. Retrieved on Feb. 16, 2018 from URL: https://github.com/chamilo/chamilo-lms/commit/15d7e22521aa752f9a96840ae57d493250533671.

Davelester, "Assertion Specification Changes" mozilla/openbadges-backpack Wiki, GitHub, last edited Apr. 16, 2013, 1 revision, 3 pages. Retreived on Nov. 28, 2017, from URL: https://github.com/mozilla/opengadges-backpack/wiki/Assertion-Specification-Changes.

Grant, Sheryl "What Counts as Learning: Open Digital Badges for New Opportunities" Aug. 2014, 57 pages. Retrieved on Apr. 13, 2017 from URL: https://dmlhub.net/wp-content/uploads/files/WhatCountsAsLearning_Grant.pdf.

Mozilla, "Open Badges Backpack-ng (Next Generation)" GitHub, 5 pages. Retrieved on Nov. 28, 2017, from URL: https://github.com/mozilla/openbadges-backpack.

Mozilla, LRNG, IMS Global Learning Consortium, "Developers Guide" copyright 2016, 12 pages. Retrieved on Nov. 28, 2017, from URL: http://opengadges.org/developers/.

Mozilla, LRNG, IMS Global Learning Consortium, "What's an Open Badge?" 3 pages. Retreived on Nov. 28, 2017, from URL: https://opengadebs.ort/get-started/.

Otto, Nate et al. "Open Badges v2.0 IMS Candidate Final / Public Draft" IMS Global Learning Consortium, issued Mar. 8, 2017, 17 pages. Retreived on Nov. 28, 2017, from URL: htpp://www.imsglobal.org/Badges/OBv2p0/index.html.

Pearson, "Open badges are unlocking the emerging jobs economy", Pearson Education, Inc., copyright 2013, 7 pages.

SueSmith, "Assessment" Jun. 18, 2014, 19 pages. Retrieved from URL: https://github.com/mozilla/badgekit-api/blob/master/docs/assessment.md.

SueSmith, "Badgekit API Documentation" Jun. 13, 2014, 2 pages. Retrieved from URL: https://github.com/mozilla/badgekitapi/blob/master/docs/README.md.

SueSmith, "Issuing" Jun. 24, 2014, 7 pages. Retrieved from URL: https://github.com/mozilla/badgekit-api/blob/master/docs/issuing.md.

SueSmith et al., "API Endpoints" Jul. 31, 2014, 4 pages. Retrieved from URL: https://github.com/mozilla/badgekit-api/blob/master/docs/api-endpoints.md.

SueSmith et al., "Badges" Jul. 31, 2014, 20 pages. Retrieved from URL: https://github.com/mozilla/badgekit-api/blob/master/docs/badges.md.

SueSmith et al., "Claim Codes" Jun. 18, 2014, 11 pages. Retrieved from URL: https://github.com/mozilla/badgekit-api/blob/master/docs/claim-codes.md.

Sue Smith et al., "Issuers" Jun. 16, 2014, 9 pages. Retrieved from URL: https://github.com/mozilla/badgekit-api/blob/master/docs/issuers.md.

SueSmith et al., "Milestones" Jun. 16, 2014, 15 pages. Retrieved from URL: https://github.com/mozilla/badgekit-api/blob/master/docs/milestones.md.

SueSmith et al., "Programs" Jun. 16, 2014, 8 pages. Retrieved from URL: https://github.com/mozilla/badgekit-api/blob/master/docs/programs.md.

SueSmith et al., "Systems" Jun. 16, 2014, 9 pages. Retrieved from URL: https://github.com/mozilla/badgekit-api/blob/master/docs/systems.md.

SueSmith et al., "SystemCallbacks (Webhooks)" Jun. 13, 2014, 4 pages. Retrieved from URL: https://github.com/mozilla/badgekit-api/blob/master/docs/webhooks.md.

The Mozilla Foundation and Peer 2 Peer University, in collaboration with The MacArthur Foundation, "Open Badges for Life Long Learning", updated Jan. 23, 2012, pp. 1-14.

The Mozilla Foundation and Peer 2 Peer University, in collaboration with The MacArthur Foundation, "Open Badges for Lifelong Learning", updated Aug. 27, 2012, pp. 1-14. Retrieved on Dec. 20, 2018, from URL: https://wiki.mozilla.org/images/5/59/OpenBadges-Working-Paper_012312.pdf.

Thompson, Matt, "Introducing Open Badges 1.0" The Mozilla Blog, Mar. 14, 2013, 11 pages. Retrieved on Nov. 29, 2017, from URL: https://blog.mozilla.org/blog/2013/03/14/open_badges/.

PCT/US2017/018817 received an International Search Report and Written Opinion dated May 3, 2017, 12 pages.

PCT/US2017/018821 received an International Search Report and Written Opinion dated May 5, 2017, 7 pages.

PCT/US2018/049767 received an International Search Report and Written Opinion dated Nov. 28, 2018, 15 pages.

U.S. Appl. No. 15/081,173 received a Notice of Allowance dated Mar. 14, 2018, 5 pages.

U.S. Appl. No. 15/081,215 received a First Action Interview Office Action dated Jan. 26, 2018, 5 pages.

Ross, "Drive Operator Excellence through Simulator Training", Honeywell Training Manual, Honeywell users Group Europe, Middle East and Africa, 2013, 31 pp.

* cited by examiner

BADGE EARNER VIEW - [NAME]

Badge View | Skills View | Job Listings | Suggested Badges | Badge Planner | Career Mapping

ACTIVE BADGE LIST

| Badge | Skills | Status | Issuer | Evidence | Auth. Data | Share/Remove |
|---|---|---|---|---|---|---|
| Badge 1 Title/Desc. | Skills List | Exp. Date/ Strength | Issuer Name | Link to Evidence Files | User Auth Method Data | Share Badge / Remove |
| Badge 2 Title/Desc. | | | | | | |
| ... | ... | ... | ... | ... | ... | ... |

Add/Approve New Badge          Export Badge Portfolio

FIG. 34

EMPLOYER VIEW - [EMPLOYER NAME]

Badge Stats     Skills Stats     Industry Comparison     Job Postings     Candidate Search     Team Builder

EMPLOYEE BADGE STATISTICS

Search In: [Entire Workforce ▶]

| Badge | Employee % | Badge Required % | Salary | Level | Review Score | Badge Age |
|---|---|---|---|---|---|---|
| Badge 1 Title/Desc. | 25.4% | 19.1% | + $4,500 | 39 | 84% | 23 months |
| Badge 2 Title/Desc. | ... | ... | ... | ... | ... | ... |

FIG. 35

RECRUITER VIEW - [RECRUITER NAME]

Candidate Search | Position Search

CANDIDATE SEARCH TOOL

Job Listing #: _____

SEARCH FOR CANDIDATES

Job Criteria

Position Description: _____
Location: _____
Education Level Req: _____

Skills Needed: _____
Badges Needed: _____
Salary Range: _____

SEARCH FOR CANDIDATES

FIG. 36

POTENTIAL BADGE OFFERINGS (FOR USER ABC)

| Badge Offering | Issuer | Time Commitment | Cost | Change In Market Value For User | |
|---|---|---|---|---|---|
| *Data Science Specialization* | Issuer AAA | 50 hours | $185 | + $1,200/year | Purchase/ Enroll |
| *Intro to Analytics* | Issuer BBB | 15 hours | $100 | + $2,500/year | Purchase/ Enroll |
| *Intro to Data Science* | Issuer CCC | 40 hours | $500 | + $0/year | Purchase/ Enroll |
| *Advanced Statistics* | Issuer AAA | 2 hours | $50 | + $800/year | Purchase/ Enroll |
| *Predictive Analytics* | Issuer CCC | 8 hours | $75 | + $3,000/year | Purchase/ Enroll |
| *Data-Driven Marketing* | Issuer CCC | 80 hours | $2,000 | + $1,000/year | Purchase/ Enroll |
| *Software Security Foundations* | Issuer AAA | 120 hours | $3,500 | + $4,000/year | Purchase/ Enroll |

FIG. 45

DIGITAL CREDENTIAL SYSTEM FOR EMPLOYER-BASED SKILLS ANALYSIS

CROSS-REFERENCE TO RELATED APPLICATIONS

This application claims priority to U.S. Provisional Patent Application No. 62/559,433 filed on Sep. 15, 2017 and entitled "DIGITAL CREDENTIAL PLATFORM."

BACKGROUND

Changes in computing technologies have provided individuals with additional options for obtaining and validating technical skills and proficiencies. Rather than attending traditional educational institutions and professional training courses, many individuals may now obtain their technical skills and proficiencies from alternative sources, such as structured or unstructured and asynchronous eLearning programs using distance learning technology, self-study research without any direct supervision, or various alternative technical learning, training, and testing entities. Although such advances in technologies and increasing globalization trends provide many more options for individuals to obtain technical skills and proficiencies, they also present challenges in publishing, verifying, and tracking the sets of technical skills and proficiencies that these individuals have obtained. Many individuals and institutions no longer rely on physical certificates such as diplomas, transcripts, certification statements, and physical licenses, to verify the authenticity of an individual's proficiencies or qualifications. Instead, certain institutions may issue digital credentials (or digital badges) to qualifying individuals, and these digital credential earners may use the digital credentials to certify the skills or qualifications that the earner obtained vis-à-vis the institution.

BRIEF DESCRIPTION OF THE DRAWINGS

FIG. 34 depicts an example user interface illustrating a badge earner view that illustrates various features that may be available to authorized badge earners via a badge platform server.

FIG. 35 depicts an example user interface illustrating an employer view that illustrates various features that may be available to authorized employers that have logged into a badge platform server.

FIG. 36 depicts an example user interface illustrating a recruiter view that illustrates various features that may be available to authorized recruiters that have logged into the badge platform server.

FIG. 45 depicts an example user interface screen displaying the results of a prospective badge search for a particular user ("User ABC").

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
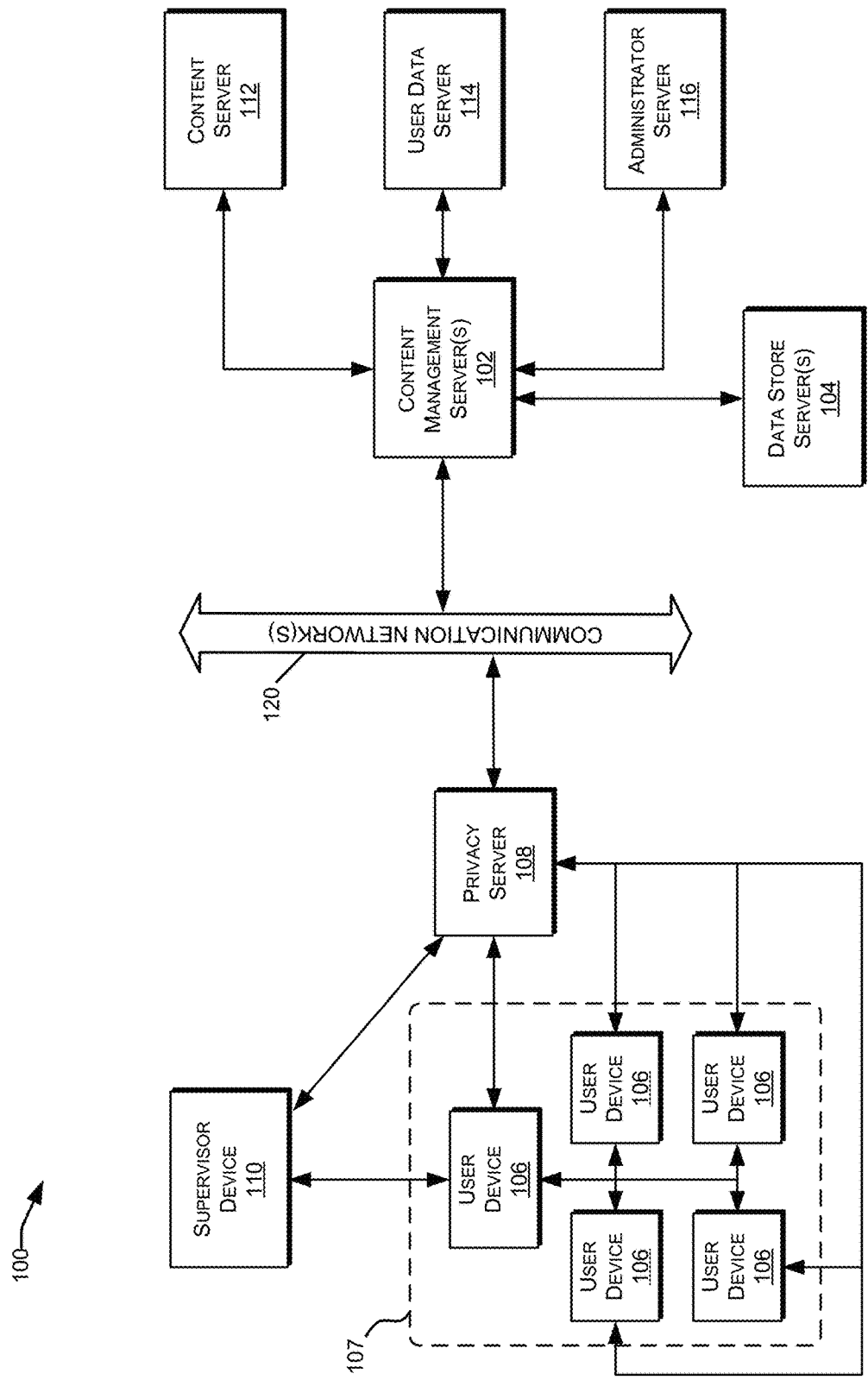
FIG. 1 is a block diagram showing illustrating an example of a content distribution network.

With reference now to FIG. 1, a block diagram is shown illustrating various components of a content distribution network (CDN) 100 which implements and supports certain embodiments and features described herein. Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, such as database servers and file-based storage systems. Data stores 104 may comprise stored data relevant to the functions of the content distribution network 100. Illustrative examples of data stores 104 that may be maintained in certain embodiments of the content distribution network 100 are described below in reference to FIG. 3. In some embodiments, multiple data stores may reside on a single server 104, either using the same storage components of server 104 or using different physical storage components to assure data security and integrity between data stores. In other embodiments, each data store may have a separate dedicated data store server 104.

Content distribution network 100 also may include one or more user devices 106 and/or supervisor devices 110. User devices 106 and supervisor devices 110 may display content received via the content distribution network 100, and may support various types of user interactions with the content. User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as thin-client computers, Internet-enabled gaming systems, business or home appliances, and/or personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location 107, such as a classroom or conference room. In such cases, the devices may contain components that support direct communications with other nearby devices, such as a wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 112, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include data stores of training materials, presentations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, data stores, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

Figure 2:
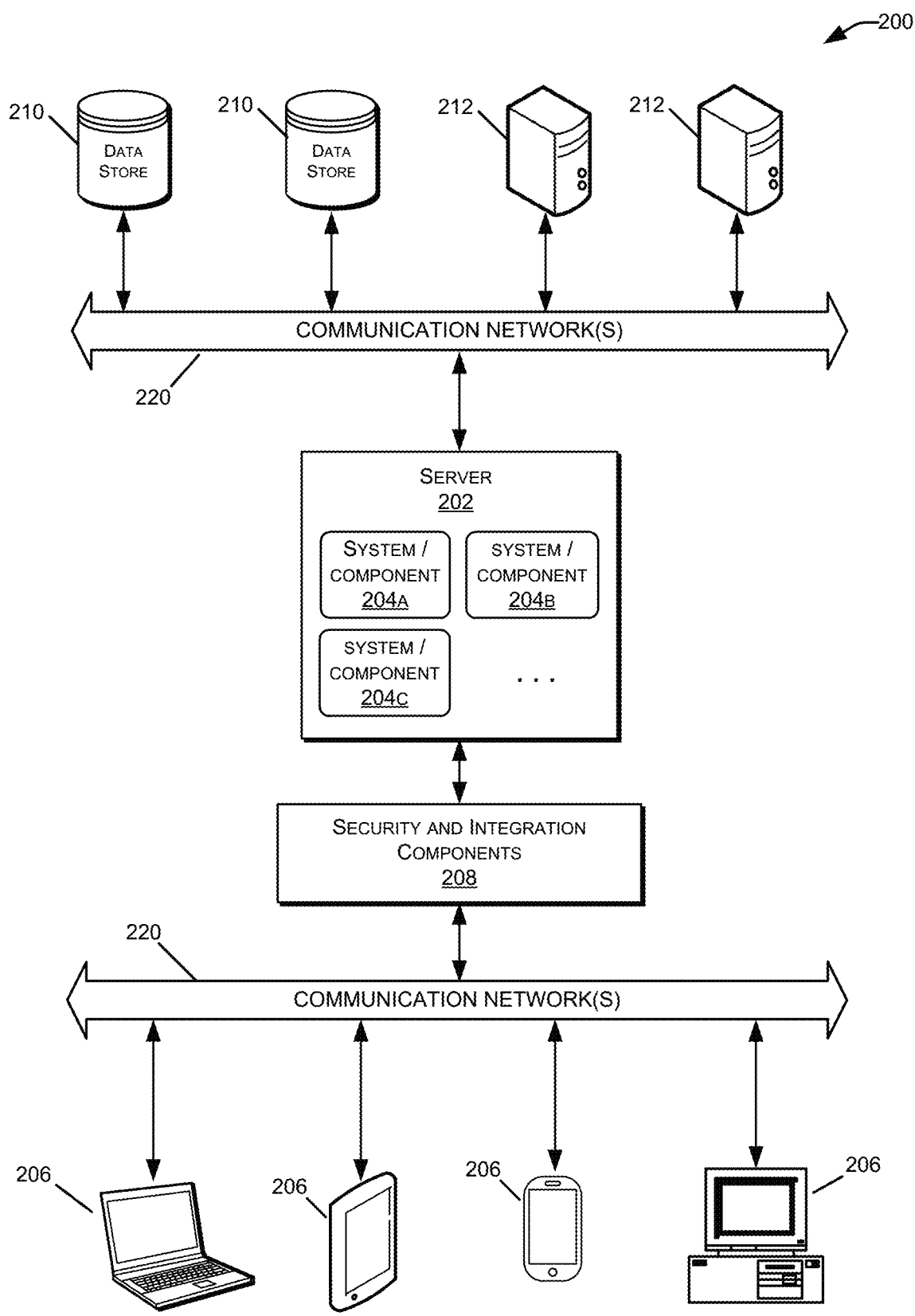
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to transmit, receive, and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. Some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using REST over HTTPS with the OAuth open standard for authentication, or using the WS-Security standard which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more data stores 210 and/or back-end servers 212. In certain examples, the data stores 210 may correspond to data store server(s) 104 discussed above in FIG. 1, and back-end servers 212 may correspond to the various back-end servers 112-116. Data stores 210 and servers 212 may reside in the same datacenter or may operate at a remote location from server 202. In some cases, one or more data stores 210 may reside on a non-transitory storage medium within the server 202. Other data stores 210 and back-end servers 212 may be remote from server 202 and configured to communicate with server 202 via one or more networks 220. In certain embodiments, data stores 210 and back-end servers 212 may reside in a storage-area network (SAN), or may use storage-as-a-service (STaaS) architectural model.

Figure 3:
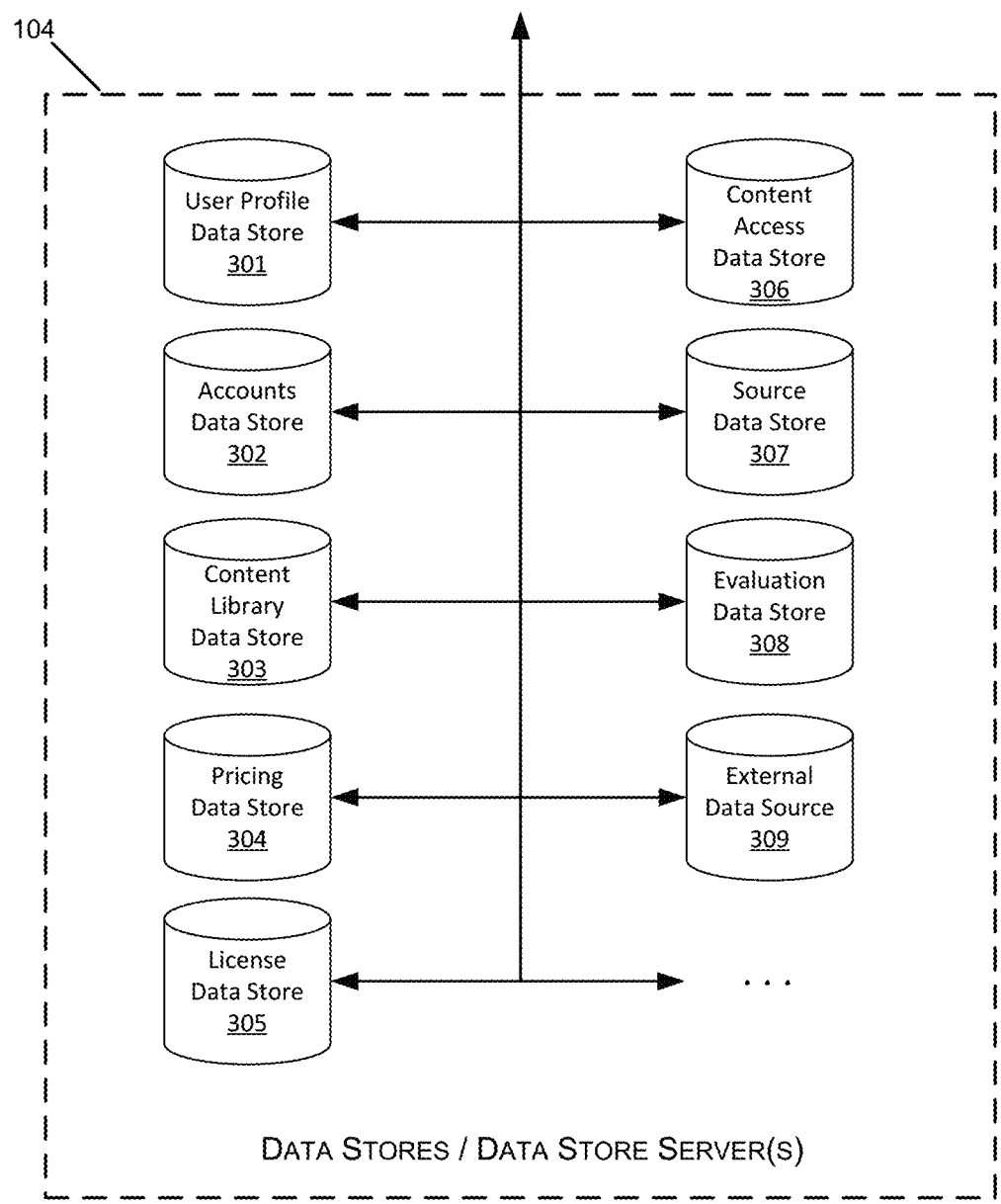
FIG. 3 is a block diagram illustrating an embodiment of one or more data store servers within a content distribution network.

With reference to FIG. 3, an illustrative set of data stores and/or data store servers is shown, corresponding to the data store servers 104 of the content distribution network 100 discussed above in FIG. 1. One or more individual data stores 301-309 may reside in storage on a single computer server 104 (or a single server farm or cluster) under the control of a single entity, or may reside on separate servers operated by different entities and/or at remote locations. In some embodiments, data stores 301-309 may be accessed by the content management server 102 and/or other devices and servers within the network 100 (e.g., user devices 106, supervisor devices 110, administrator servers 116, etc.). Access to one or more of the data stores 301-309 may be limited or denied based on the processes, user credentials, and/or devices attempting to interact with the data store.

The paragraphs below describe examples of specific data stores that may be implemented within some embodiments of a content distribution network 100. It should be understood that the below descriptions of data stores 301-309, including their functionality and types of data stored therein, are illustrative and non-limiting. Data stores server architecture, design, and the execution of specific data stores 301-309 may depend on the context, size, and functional requirements of a content distribution network 100. For example, in content distribution systems 100 used for professional training and educational purposes, separate databases or file-based storage systems may be implemented in data store server(s) 104 to store trainee and/or student data, trainer and/or professor data, training module data and content descriptions, training results, evaluation data, and the like. In contrast, in content distribution systems 100 used for media distribution from content providers to subscribers, separate data stores may be implemented in data stores server(s) 104 to store listings of available content titles and descriptions, content title usage statistics, subscriber profiles, account data, payment data, network usage statistics, etc.

A user profile data store 301 may include information relating to the end users within the content distribution network 100. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.).

An accounts data store 302 may generate and store account data for different users in various roles within the content distribution network 100. For example, accounts may be created in an accounts data store 302 for individual end users, supervisors, administrator users, and entities such as companies or educational institutions. Account data may include account types, current account status, account characteristics, and any parameters, limits, restrictions associated with the accounts.

A content library data store 303 may include information describing the individual content items (or content resources) available via the content distribution network 100. In some embodiments, the library data store 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library data store 303 may be configured to allow updating of content metadata or properties, and to allow the addition and/or removal of information relating to the content resources. For example, content relationships may be implemented as graph structures, which may be stored in the library data store 303 or in an additional store for use by selection algorithms along with the other metadata.

A pricing data store 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage and. In other cases, pricing may be tied to specific content resources. Certain content resources may have associated pricing information, whereas other pricing determinations may be based on the resources accessed, the profiles and/or accounts of the user, and the desired level of access (e.g., duration of access, network speed, etc.). Additionally, the pricing data store 304 may include information relating to compilation pricing for groups of content resources, such as group prices and/or price structures for groupings of resources.

A license data store 305 may include information relating to licenses and/or licensing of the content resources within the content distribution network 100. For example, the license data store 305 may identify licenses and licensing terms for individual content resources and/or compilations of content resources in the content server 112, the rights holders for the content resources, and/or common or large-scale right holder information such as contact information for rights holders of content not included in the content server 112.

A content access data store 306 may include access rights and security information for the content distribution network 100 and specific content resources. For example, the content access data store 306 may include login information (e.g., user identifiers, logins, passwords, etc.) that can be verified during user login attempts to the network 100. The content access data store 306 also may be used to store assigned user roles and/or user levels of access. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source data store 307 may include information relating to the source of the content resources available via the content distribution network. For example, a source data store 307 may identify the authors and originating devices of content resources, previous pieces of data and/or groups of data originating from the same authors or originating devices, and the like.

An evaluation data store 308 may include information used to direct the evaluation of users and content resources in the content management network 100. In some embodiments, the evaluation data store 308 may contain, for example, the analysis criteria and the analysis guidelines for evaluating users (e.g., trainees/students, gaming users, media content consumers, etc.) and/or for evaluating the content resources in the network 100. The evaluation data store 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics or scoring guides for use in the evaluation of the content, users, or applications. The evaluation data store 308 also may include past evaluations and/or evaluation analyses for users, content, and applications, including relative rankings, characterizations, explanations, and the like.

In addition to the illustrative data stores described above, data store server(s) 104 (e.g., database servers, file-based storage servers, etc.) may include one or more external data aggregators 309. External data aggregators 309 may include third-party data sources accessible to the content management network 100, but not maintained by the content management network 100. External data aggregators 309 may include any electronic information source relating to the users, content resources, or applications of the content distribution network 100. For example, external data aggregators 309 may be third-party data stores containing demographic data, education related data, consumer sales data, health related data, and the like. Illustrative external data aggregators 309 may include, for example, social networking web servers, public records data stores, learning management systems, educational institution servers, business servers, consumer sales data stores, medical record data stores, etc. Data retrieved from various external data aggregators 309 may be used to verify and update user account information, suggest user content, and perform user and content evaluations.

Figure 4:
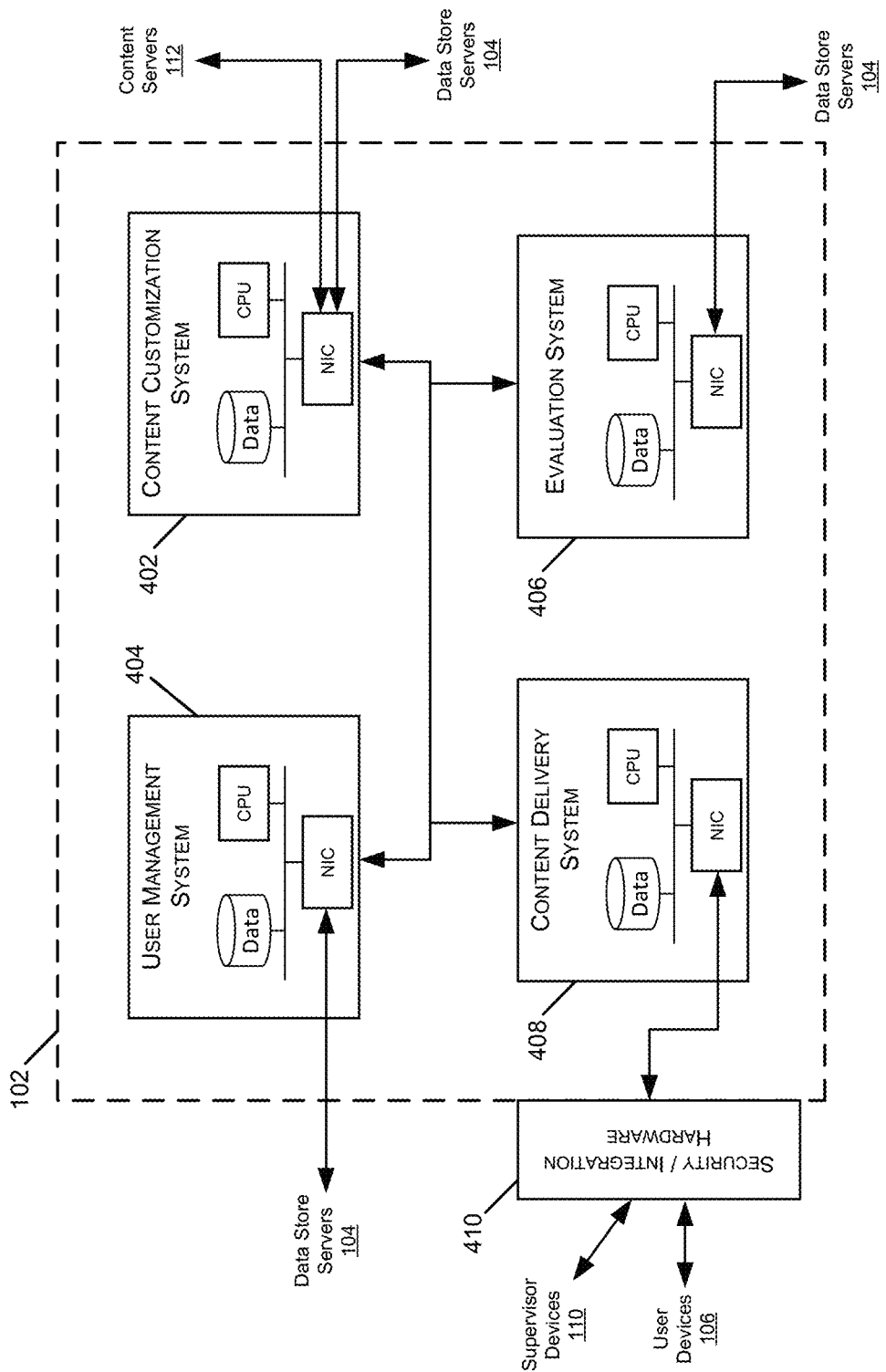
FIG. 4 is a block diagram illustrating an embodiment of one or more content management servers within a content distribution network.

With reference now to FIG. 4, a block diagram is shown illustrating an embodiment of one or more content management servers 102 within a content distribution network 100. As discussed above, content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a content customization system 402. The content customization system 402 may be implemented using dedicated hardware within the content distribution network 100 (e.g., a content customization server 402), or using designated hardware and software resources within a shared content management server 102. In some embodiments, the content customization system 402 may adjust the selection and adaptive capabilities of content resources to match the needs and desires of the users receiving the content. For example, the content customization system 402 may query various data stores and servers 104 to retrieve user information, such as user preferences and characteristics (e.g., from a user profile data store 301), user access restrictions to content recourses (e.g., from a content access data store 306), previous user results and content evaluations (e.g., from an evaluation data store 308), and the like. Based on the retrieved information from data stores 104 and other data sources, the content customization system 402 may modify content resources for individual users.

A content management server 102 also may include a user management system 404. The user management system 404 may be implemented using dedicated hardware within the content distribution network 100 (e.g., a user management server 404), or using designated hardware and software resources within a shared content management server 102. In some embodiments, the user management system 404 may monitor the progress of users through various types of content resources and groups, such as media compilations, courses or curriculums in training or educational contexts, interactive gaming environments, and the like. For example, the user management system 404 may query one or more databases and/or data store servers 104 to retrieve user data such as associated content compilations or programs, content completion status, user goals, results, and the like.

A content management server 102 also may include an evaluation system 406. The evaluation system 406 may be implemented using dedicated hardware within the content distribution network 100 (e.g., an evaluation server 406), or using designated hardware and software resources within a shared content management server 102. The evaluation system 406 may be configured to receive and analyze information from user devices 106. For example, various ratings of content resources submitted by users may be compiled and analyzed, and then stored in a data store (e.g., a content library data store 303 and/or evaluation data store 308) associated with the content. In some embodiments, the evaluation server 406 may analyze the information to determine the effectiveness or appropriateness of content resources with, for example, a subject matter, an age group, a skill level, or the like. In some embodiments, the evaluation system 406 may provide updates to the content customization system 402 or the user management system 404, with the attributes of one or more content resources or groups of resources within the network 100. The evaluation system 406 also may receive and analyze user evaluation data from user devices 106, supervisor devices 110, and administrator servers 116, etc. For instance, evaluation system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

A content management server 102 also may include a content delivery system 408. The content delivery system 408 may be implemented using dedicated hardware within the content distribution network 100 (e.g., a content delivery server 408), or using designated hardware and software resources within a shared content management server 102. The content delivery system 408 may receive content resources from the content customization system 402 and/or from the user management system 404, and provide the resources to user devices 106. The content delivery system 408 may determine the appropriate presentation format for the content resources based on the user characteristics and preferences, and/or the device capabilities of user devices 106. If needed, the content delivery system 408 may convert the content resources to the appropriate presentation format and/or compress the content before transmission. In some embodiments, the content delivery system 408 may also determine the appropriate transmission media and communication protocols for transmission of the content resources.

In some embodiments, the content delivery system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 5:
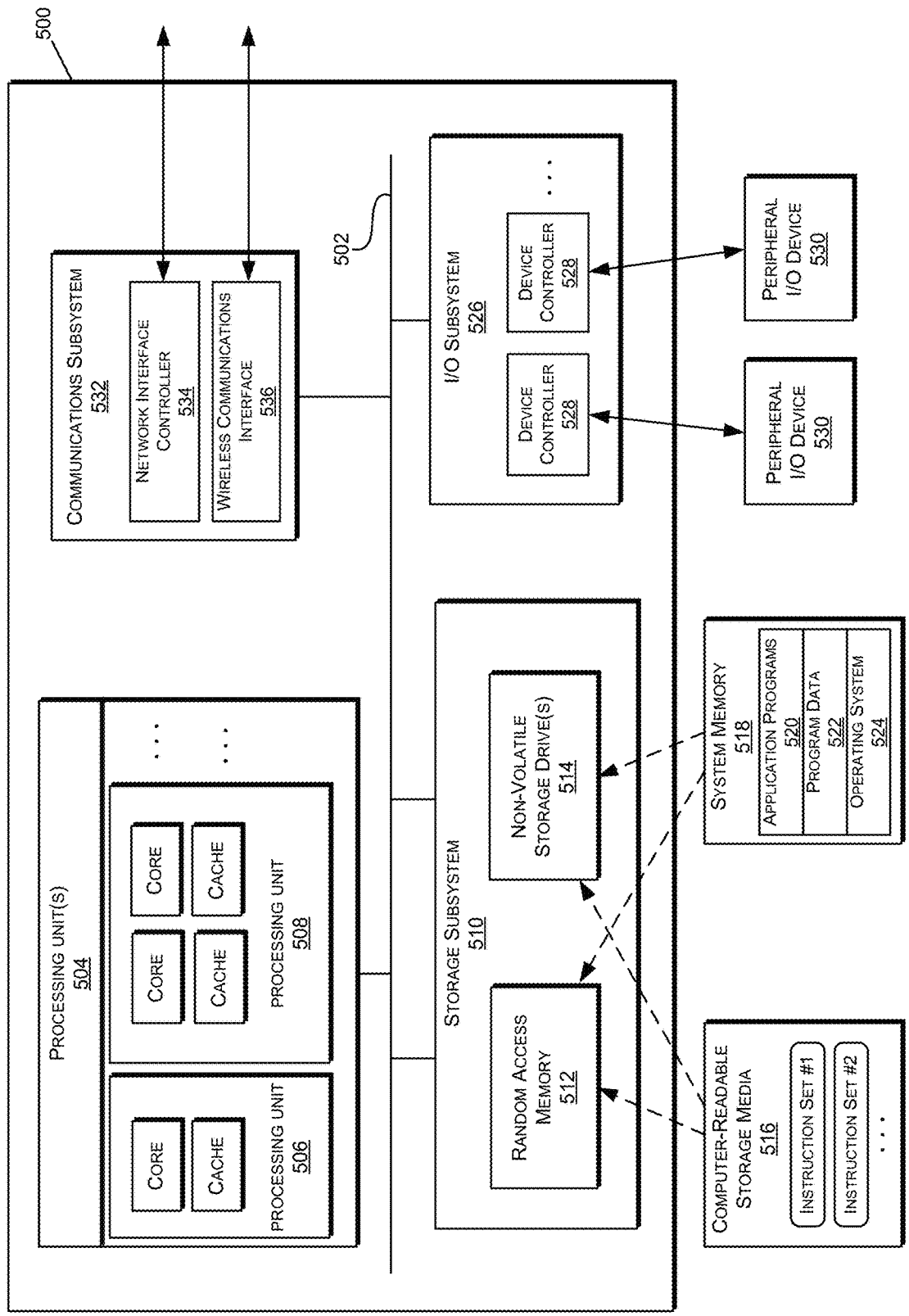
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 318 may be stored in volatile memory (such as random access memory (RAM) 512) and/or in non-volatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 309). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more data stores 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
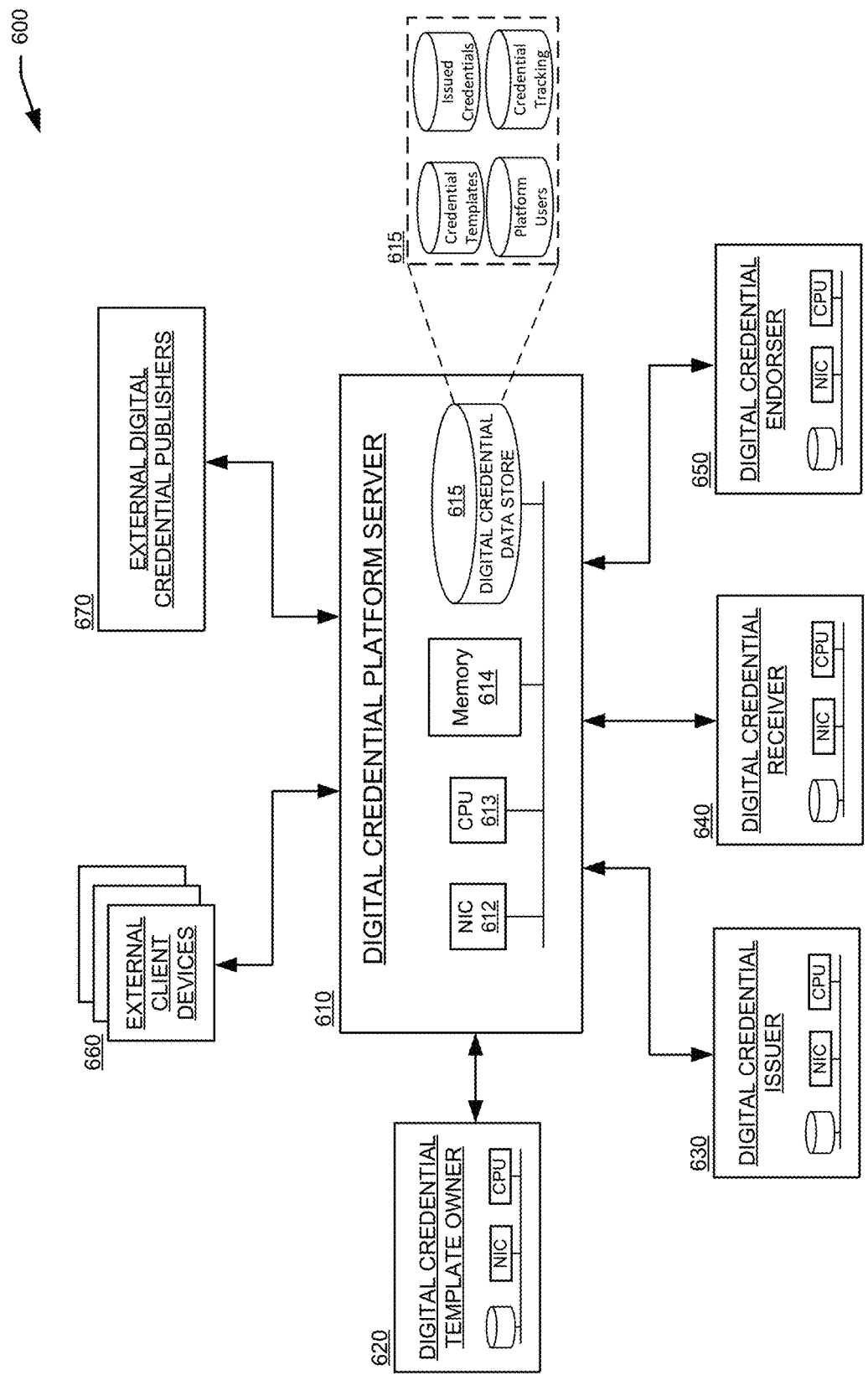
FIG. 6 is a block diagram illustrating an example computing environment for generating, managing, and tracking digital credential templates and digital credentials, according to one or more embodiments of the disclosure.

With reference now to FIG. 6, a block diagram is shown illustrating an example of a digital credential management system 600 for generating, managing, and tracking digital credential templates and digital credentials. As shown in this example, a digital credential management system 600 may include a digital credential platform server 610 configured to communicate with various other digital credential systems 620-680. As discussed below, the digital credential platform server 610 may receive and store digital credential templates from various digital credential template owner systems 620. Systems 620 may correspond to the computer servers and/or devices of educational institutions or professional training organizations, which may have the primary responsibility for defining a digital credential template and controlling the content and requirements for users to receive a digital credential from the organization. The digital credential management system 600 may include one or more digital credential issuer systems 630. As discussed below, each issuer system 630 may communicate with the platform server to request and receive access to issue digital credentials based on specific digital credential templates. The platform server 610 may process template access requests from the credential issuer systems 630, permitting or denying a specific system 630 to generate (or issue) a digital credential based on a specific digital credential template.

As used herein, a digital credential template (or digital badge template) may refer to an electronic document or data structure storing a general (e.g., non-user specific) template or description of a specific type of digital credential that may be issued to an individual. Digital credential templates may include, for example, a description of the skills, proficiencies, and/or achievements that the digital credential represents. This description may take the form of diploma data, certification data, and/or license data, including the parent organization (i.e., the digital credential template owner) responsible for creating and defining the digital credential template. Examples of digital credential templates may include templates for various technology certifications, licensure exams, professional tests, training course completion certificates, and the like. In contrast to a digital credential template, a digital credential (or digital badge) may refer to an instance of an electronic document or data structure, generated for a specific individual (i.e., the credential receiver), and based on a digital credential template. Thus, a digital credential document or data structure may be based on a corresponding digital credential template, but may be customized and populated with user-specific information such as individual identification data (e.g., name, email address, and other user identifiers), credential issuance data (e.g., issue date, geographic location of issuance, authorized issuer of the credential, etc.), and links or embedded data that contain the specific user's supporting documentation or evidence relating to the credential.

As shown in this example, the system 600 also may include a digital credential receiver system 640 and a digital credential endorser system 650. The digital credential receiver system 640 may be a computing device associated with a credential receiver (or credential earner), for example, an individual user of an electronic learning system, professional training system, online certification course, etc. In some embodiments, credential receivers may access the platform server 610 via systems 640 to accept or reject newly issued digital credentials, review and update their own set of previously earned digital credentials, as well as to publish (or share) their digital credentials via communication applications or publishing platforms such as social media systems. Digital credential endorser system 650 may be a computing system associated with an endorsing entity, such as an educational institution, business, or technical organization that has chosen to review and endorse a specific digital credential template. The platform server 610 may receive and track the endorsements received from systems 650, and may associate the endorsements with the user-specific digital credentials issued based on the endorsed templates.

Additionally, the digital credential management system 600 in this example includes a number of external client devices 660 and external digital credential publishers 670. External client devices 660 may correspond to computing systems of third-party users that may interact with the platform server 610 to initiate various functionality or retrieve data relating to templates and/digital credentials managed by the platform 610. For example, a client device 660 may query the platform server 610 for data metrics and/or analyses relating to a subset of digital credentials stored in the digital credential data store 615. The third-party systems 660 also may provide data to the platform server 610 that may initiate updates to the templates and/digital credentials stored in the data store 615. External digital credential publishers 670 may correspond to third-party systems configured to receive digital credential data from the platform 610 and publish (or present) the digital credential data to users. Examples of publishers 670 may include social media website and systems, digital badge wallets, and/or other specialized servers or applications configured to store and present views of digital badges to users.

In various embodiments described herein, the generation and management of digital credentials, as well as the tracking and reporting of digital credential data, may be performed within CDNs 100, such as eLearning, professional training, and certification systems 100. For example, within the context of an eLearning CDN 100, a content management server 102 or other CDN server (e.g., 104, 112, 114, or 116) may create and store digital credential templates to describe and define various proficiencies, achievements, or certifications supported by the eLearning CDN 100. Additionally or alternatively, the content management server 102 or other servers of an eLearning CDN 100 may issue digital credentials to users, based on its own digital certificate templates and/or templates received from other systems or CDNs. Further, in some implementations, an eLearning CDN 100 may be configured to include a digital credential platform server 610 to store and manage templates and digital credentials between separate systems within the CDN 100. Thus, in various different implementations, the content management server(s) 102 of a CDN 100 may incorporate one or more digital certificate template owner system(s) 620, digital certificate issuer system(s) 630, and/or digital certificate platform server(s) 610. In such embodiments, the various components and functionalities described herein for the platform server 610, owner system 620, and/or issuer system 630 all may be implemented within one or more content management servers 102 (and/or other servers) of an eLearning or professional training CDN 100. In other examples, a digital credential platform server 610 may be implemented using one or more computer servers, and other specialized hardware and software components, separately from any other CDN components such as content servers 112, content management servers 102, data store servers 104, and the like. In these examples, the digital credential platform server 610 may be configured to communicate directly with related systems 620-670, or indirectly through content management servers 102 and/or other components and communications networks of the CDN 100.

In order to perform these features and other functionality described herein, each of the components and sub-components discussed in the example digital credential management system 600 may correspond to a single computer server or a complex computing system including a combination of computing devices, storage devices, network components, etc. Each of these components and their respective subcomponents may be implemented in hardware, software, or a combination thereof. Certain systems 620-670 may communicate directly with the platform server 610, while other systems 620-670 may communicate with the platform server 610 indirectly via one or more intermediary network components (e.g., routers, gateways, firewalls, etc.) or other devices (e.g., content management servers 102, content servers 112, etc.). Although the different communication networks and physical network components have not been shown in this example so as not to obscure the other elements depicted in the figure, it should be understood that any of the network hardware components and network architecture designs may be implemented in various embodiments to support communication between the systems, servers, and devices in the digital credential management system 600. Additionally, different systems 620-670 may use different networks and networks types to communicate with the platform server 610, including one or more telecommunications networks, cable networks, satellite networks, cellular networks and other wireless networks, and computer-based IP networks, and the like. Further, certain components within the digital credential management system 600 may include special purpose hardware devices and/or special purpose software, such as those included in I/O subsystem 611 and memory 614 of the platform server 610, as well as those within the memory of the other systems 620-670, and the digital credential data store 615 maintained by the platform server 610, discussed below.

Although the various interactions between the platform server 610 and other systems 620-670 may be described below in terms of a client-server model, it should be understood that other computing environments and various combinations of servers and devices may be used to perform the functionality described herein in other embodiments. For instance, although the requests/responses to determine the authorized issuers 630 for specific digital credential templates, the generation of digital credentials, and the retrieval and presentation of digital credential tracking and reporting data, may be performed by a centralized web-based platform server 610 in collaboration with various client applications at the other systems 620-670 (e.g., web browser applications or standalone client software), in other cases these techniques may be performed entirely by a specialized digital credential platform server 610, or entirely by one or more digital credential tools (e.g., software services) executing on any one of the systems 620-670. In other examples, a client-server model may be used as shown in system 600, but different functional components and processing tasks may be allocated to the client-side or the sever-side in different embodiments. Additionally, the digital credential data store 615 may be implemented as separate servers or storage systems in some cases, and may use independent hardware and software service components. However, in other implementations, some or all of the digital credential data store 615 may be incorporated into the platform server 610 (as shown in this example) and/or may be incorporated into various other systems 620-670.

In some embodiments, each of the systems 620-670 that collaborate and communicate with the platform server 610 may be implemented as client computing systems, such desktop or laptop computers, smartphones, tablet computers, and other various types of computing devices, each of which may include some or all of the hardware, software, and networking components discussed above. Specifically, any of client systems 620-670 may be implemented using any computing device with sufficient processing components, memory and software components, and I/O system components for interacting with users and supporting the desired set of communications with the platform server 610, as described herein. Accordingly, client systems 620-670 may include the necessary hardware and software components to establish the network interfaces, security and authentication capabilities, and capabilities for transmitting/receiving digital credential templates and digital credentials, digital credential data requests/responses to the platform server 610, etc. Each client system 620-670 may include an I/O subsystem, network interface controller, a processing unit, and memory configured to operate client software applications. The digital credential platform server 610 may be configured to receive and execute various programmatic and graphical interfaces for generating, managing, and tracking issued digital credentials, in collaboration with the various client systems 620-670. Accordingly, each client system 620-670 may include an I/O subsystem 611 having hardware and software components to support a specific set of output capabilities (e.g., LCD display screen characteristics, screen size, color display, video driver, speakers, audio driver, graphics processor and drivers, etc.), and a specific set of input capabilities (e.g., keyboard, mouse, touchscreen, voice control, cameras, facial recognition, gesture recognition, etc.). Different client systems 620-670 may support different input and output capabilities within their I/O subsystems, and thus different types of user interactions, and platform server 610 functionality may be compatible or incompatible with certain client systems 620-670. For example, certain types of digital credential generation and search functionality may require specific types of processors, graphics components, network components, or I/O components in order to be optimally designed and constructed using a client system 620-670.

In some embodiments, the digital credential platform server 610 may generate and provide software interfaces (e.g., via a web-based application, or using other programmatic or graphical interface techniques) used by the various client systems 620-670 to perform the various digital credential management functionality described herein. In response to receiving inputs from a client system 620-670 corresponding to digital credentials, templates, credential search requests and criteria, etc., the platform server 610 may access the underlying digital credential data store 615 perform the various functionality described herein. In other to perform the tasks described herein, platform server 610 may include components such as network interface controllers 612, processing units 613, and memory 614 configured to store server software, handle authentication and security, and to store, analyze, and manage the digital credentials, templates, and credential tracking data stored within the digital credential data store 615. As shown in this example, the digital credential data store 615 may be implemented as separate dedicated data stores (e.g., databases, file-based storage, etc.) used for storing digital credential template objects, issued digital credentials, credential tracking data, and authorized user/role data. The platform server 610 and data store 615 may be implemented as separate software (and/or storage) components within a single computer server 610 in some examples, while in other examples may be implemented as separate computer servers/systems having separate dedicated processing units, storage devices, and/or network components.

Certain aspects described herein related to the testing and certification processes used to verify the skills or qualifications that a user (or earner) has obtained in order to be awarded with a digital credential (or badge) or any other skill certification from an institution or credentialing body. In some embodiments, physical testing environments including "simulation laboratories" may use implemented to allow users to perform physical tasks (including mental and/or computer-based tasks) in a monitored environment. Such physical testing environments may use virtual reality and/or augmented reality in various cases. The simulation lab and/or the user may be monitored by various sensors during testing or certification processes, and the results may be analyzed to determine (at least in part) whether or not the user should be awarded a particular badge or skills certification. As discussed below in more detail, simulation labs may be implemented as testing environments for manual tasks, computer-based tasks, scenario training, etc., and various monitoring of the simulation lab environment during test may provide data metrics relating to successful completion of tasks, efficiency of task completion, user response times, user decision making behaviors, user biometrics and risk factors, etc. Further, as discussed below, certain simulation labs may provide the ability to change testing scenarios as well as environmental conditions (lighting, noise, temperature, etc.) during testing.

Figure 7:
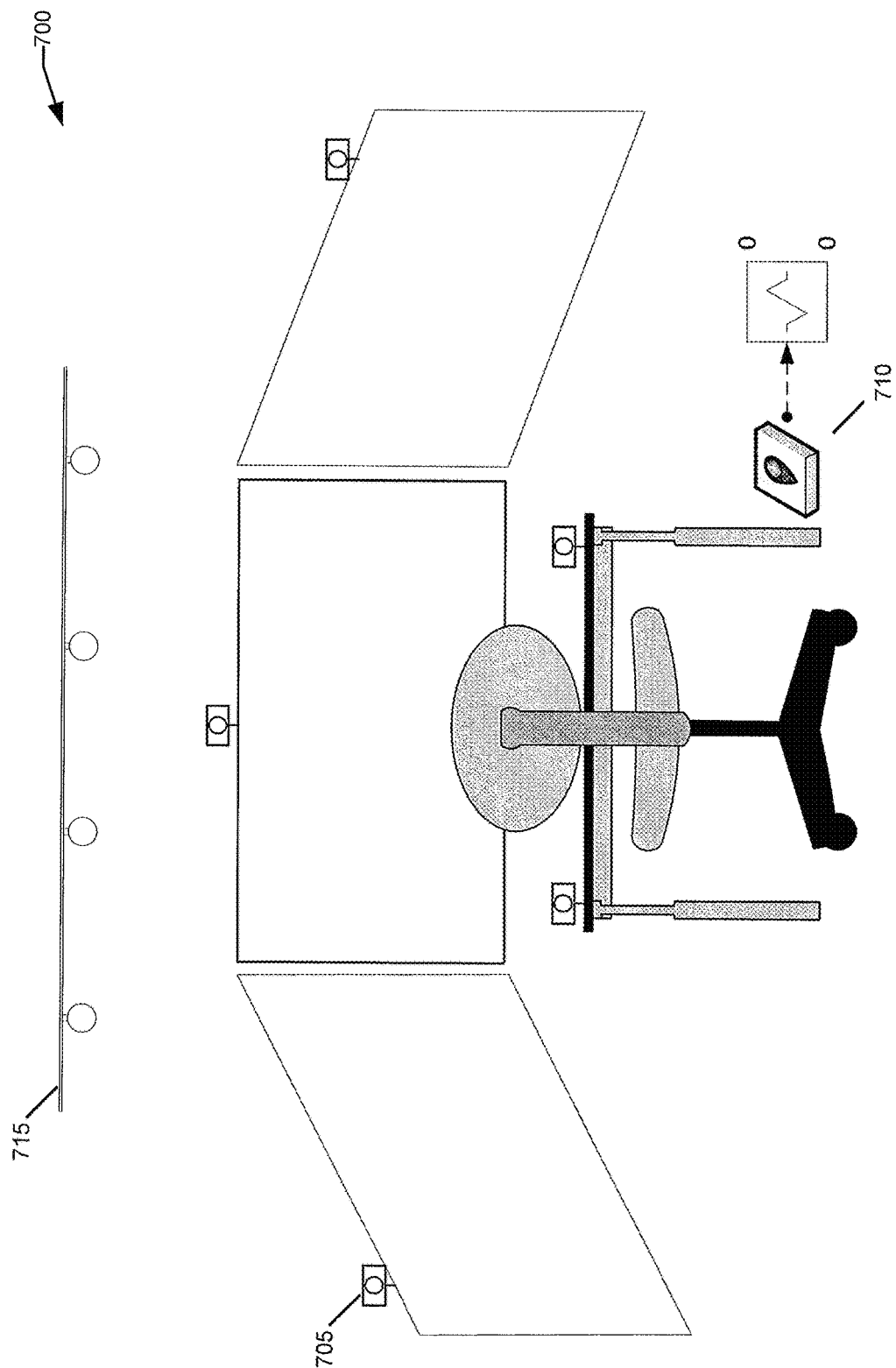
FIG. 7 is a diagram illustrating an example computing environment for executing and monitoring physical simulations within a digital credential system, according to one or more embodiments of the disclosure.

Referring now to FIG. 7, an example is shown of a physical testing environment that may be used for badge testing, skills certification, and other behaviors monitoring and credential in accordance with certain aspects described herein. In this example, a basic testing environment 700 is shown to illustrate certain features and concepts that may be included in various embodiments. Depending on the particular credential, badge, or skill or ability to be verified, different devices and components may be included in the testing environments 700. For example, testing environments 700 for standardized testing and completion of computer-based tasks may be setup to simulate an office environment, for instance, with a computer, keyboard, monitor, desk and chair, etc. Other testing environments 700 designed for other badges and/or skills certifications may be configured differently. For instance, testing environments 700 may be configured as a driving simulator (e.g., having front and side display screens, an installed automobile seat with steering wheel, pedals, vehicle controls and gauges, simulated mirror displays, etc.), or a flight simulator (e.g., having front and side display screens, up and down fields of vision, a pilot seat with a center stick and/or other airplane controls and gauges, etc.). Other testing environments 700 might not require or have any display screens, for example testing environments 700 for CPR certification may include one or more CPR manikins and other accessories to test CPR scenarios. Additional testing environments 700 may be implemented for law enforcement use of force or defensive tactics scenarios (with or with display screens, with or without live firearms capabilities, etc.). Still other testing environments 700 may be implemented for skills testing and verification on machine assembly tasks, and/or on machine use tasks. The machines in testing environments 700 in such scenarios may range from simple to complex, to allow users to any testable task on any machine, from bicycle assembly, to automobile maintenance, to semiconductor design, to electrical work, to laser fabrication, to welding. Other testing environments 700 may be implemented for skills testing and verification in performance of medical or dental procedures, and the like, and thus may resemble a hospital operating room or dentist office with a full complement of medical tools and devices necessary to perform the tasks to be verified. Still other testing environments 700 may be configured to test/verify skills with respect to sports or other physical activities, and thus the testing environments 700 may comprise a dance studio, gymnastics apparatus, golf driving range, or other sports equipment. For each of these examples, and many others, it should be understood that the different configuration of testing environments 700 may require different sets of testing equipment, as well as different monitoring and environmental control features. Further, although many examples and implementations described herein refer to human users as the subjects of testing and simulation scenarios, in some cases the test subjects may include mechanical devices (e.g., machines configured to assemble parts), artificial intelligences and/or other software programs configured to perform certain tasks, etc.

In addition to the testing equipment and apparatuses in the physical testing environment 700, the environment may have cameras 705 and sensors configured to monitor the performance and behavior of the user during the testing. As shown in this example, a number of cameras 705 may be installed throughout the testing environment 700 to capture image/video data of the user from different angles during the testing/skills verification process. In addition to cameras, in various embodiments (depending on the type of test or skill being evaluated), additional sensors may be deployed within the testing environment 700, including microphones, light sensors, heat sensors, vibration sensors, and any other sensor type, depending on the type of testing/evaluation being performed. For instance, for testing of computer-based tasks, additional sensors such as mouse movement trackers, keystroke loggers, and user eye-tracking software may be used. For machine usage tasks, scenario training, and the like, movement sensors may be placed on the user and/or on any objects with which the user may interact during the testing scenario. Additionally, for any testing or skills evaluation scenario, certain embodiments may include biometric sensors and devices 710 configured to detect and track the user's biometric data during the testing process. Such biometric sensors and devices may measure the user's temperature, heartrate, blood pressure, respiration, skin conductivity, body movements, brainwave activities, etc.

In some embodiments, the physical testing environment 700 also may include various environmental controls that allow a test administrator to control the physical environmental conditions during a test or skills evaluation. Such environmental controls may include lights 715 that allow the test administrator to control the light levels, angles, and/or colors during a test. By way of example, lighting control within the environment 700 may allow the test administrator to evaluate the user's ability to perform a driving maneuver or roadside maintenance task at night, etc. Additional environmental controls may include may include temperature controls, weather simulation (e.g., wind, rain, snow, sunshine, fog, etc.), speakers to provide background noise or distraction, olfactory control that provides scents/odors to simulate the smells that be present during a comparable real-life scenario, vibration control to simulate the activity, and so on.

Figure 8:
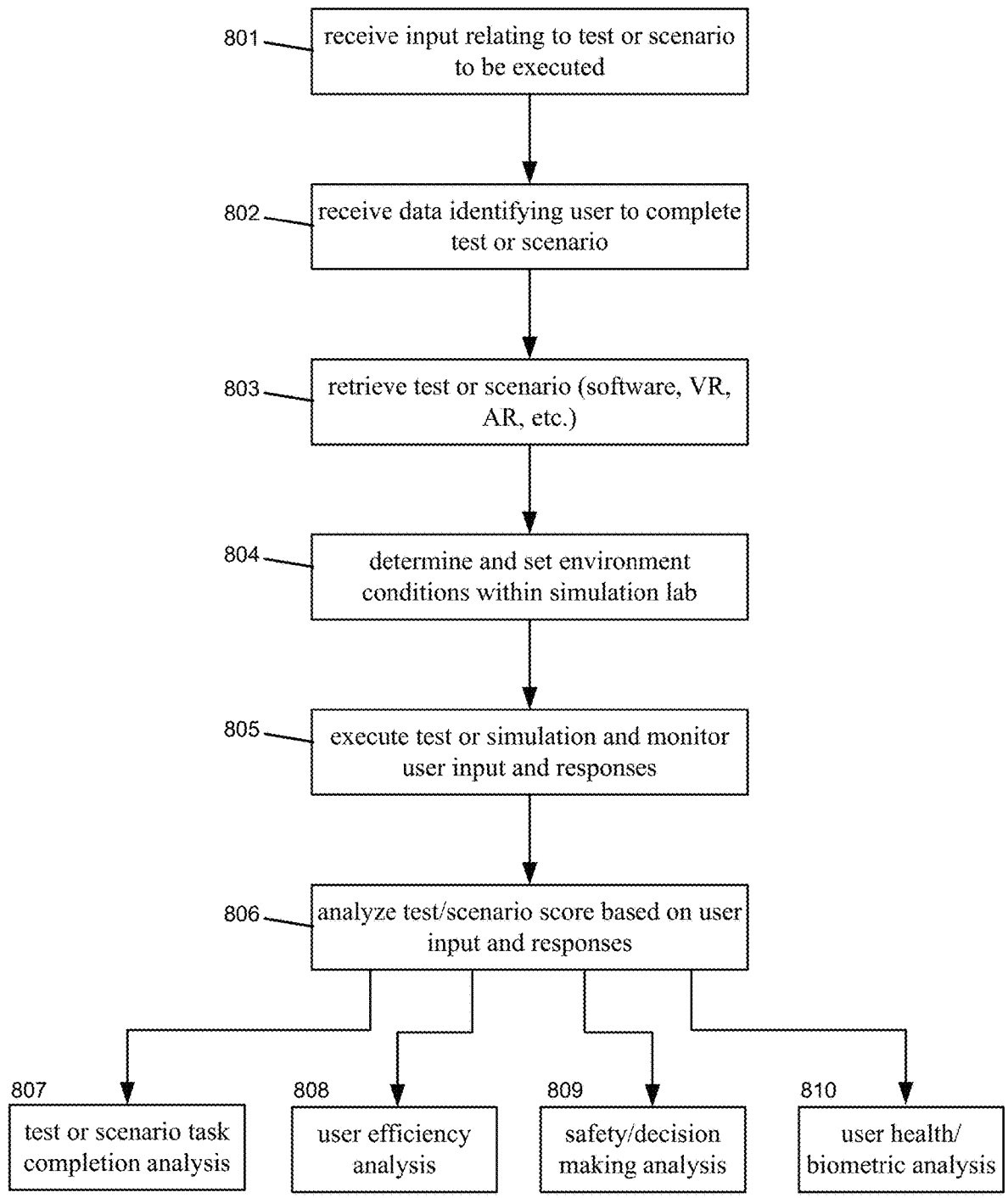
FIG. 8 is a flow diagram illustrating an example process of executing and monitoring physical simulations for generation of digital credentials, according to one or more embodiments of the disclosure.

Referring now to FIG. 8, a flow diagram is shown illustrating an example process of executing tests or simulations, as well as monitoring and analyzing the results of the tests or simulations. As described below, the steps in this process may be performed using various components of a simulation lab and/or other physical testing environment 700, described above. For example, each of steps 801-810 may be performed by a computer server of a test administrator associated with a physical testing environment 700. In other examples, physical testing environments 700 might be configured to receive test content and configuration parameters, to execute the tests and monitor the execution, and then to transmit the test results and related observation data to a separate server (e.g., a digital credential platform server 610) for scoring and analysis.

In step 801, a computer server controlling the physical testing environment 700 may receive input relating to the test or skills evaluation scenario to be executed within the physical testing environment 700. In step 802, the server may receive data identifying the particular user designated to complete the test or skills evaluation scenario.

In step 803, the server may retrieve the test or scenario to be loaded/executed within the physical testing environment 700. As noted above, the test or scenario may include interactive user software (e.g., driving or flight simulator programs, law enforcement scenarios, etc.) and/or may include testing software or other software programs loaded onto a desktop, laptop, or tablet computer. For instance, the test or scenario may require the user to work with computer-aided design software, spreadsheet software, database development software, etc. In other cases, the test or scenario may include audio and/or video files to be played via speakers and/or display screens within the physical testing environment 700, such as instructional videos or audio/visual test questions.

The test or scenario retrieved in step 803 also may be retrieved based on the identity of the particular user who will be completing the test or skills evaluation scenario. In some embodiments, the server of the physical testing environment 700 may be configured to select the appropriate test or scenario (e.g., particular software scenario, skill level, etc.) based on the user's current set of badges or digital credentials, the user's skill level, and/or the user's performance history on previous tests or scenarios within the testing environment 700. Additionally, in some cases, the server may vary scenarios/test questions so that a particular user doesn't receive the same test questions, scenarios, or other testing content that they have already completed (or completed within a particular recent time window).

In step 804, the server may determine and apply a set of environmental conditions within the physical testing environment 700 for the execution of the test or scenario. As noted above, the physical testing environment 700 in some embodiments may be capable of setting various environment conditions such as lighting (e.g., to simulate different day or night, and/or different real-world working environments), temperature and weather conditions (e.g., to simulate outdoor scenarios, different seasons and locations), noise (e.g., to provide background noise, traffic noise, distractions, etc.) and other various environment conditions. The server may select and apply environmental conditions as part of the test or scenario selected in step 803, or as a separate determination which is performed based on random chance or selected by a test administrator, etc. For instance, for certain types of badges and other certifications, separate day and night testing of certain tasks may be required. In other cases, the environmental conditions may be selected randomly and changed for each testing session. In still other cases, user may select and/or save their preferred environmental conditions for different types of testing. Further, in some embodiments, the physical testing environment 700 may track and analyze the user's various testing or scenario performance metrics (e.g., accuracy, efficiency, safety, compliance, biometrics, etc.) under different environmental conditions, in order to determine the optimal environmental conditions for the particular user. In such cases, user's may receive different badges or certifications (or may have different badge assigned characteristics or endorsements) based on their test or scenario performance in different environmental conditions.

In step 805, the computer server(s) associated with the physical testing environment 700 may execute the test or simulation scenario, during which the user's performance and any/all user reactions or responses may be monitored. As noted above, even for certain tests that are entirely manual in nature, the physical testing environment 700 may use cameras and any other sensors to monitor the user's actions. Such monitoring may include various aspects of the user's performance, such as answers to test questions selected via a testing computer terminal, or the user's interactions with physical objects (and/or other people) within the physical testing environment 700. The user's answers and actions may be recorded by cameras and computer input devices, and additional user data may be collected using various other sensors such as microphones, biometric sensors, etc.

In step 806, the results for the test and/or simulation scenario completed by the user may be analyzed. In some embodiments, such analyses may be performed based not only on the user's responses to particular test questions or scenarios. Additionally or alternatively, the analysis in step 806 may include an evaluation of the user's other reactions or responses, such as speed and confidence of action (e.g., as determined by user comments, speed of response, facial expression analysis, body movement analysis, biometric data, etc.), efficiency, safety, decision making, and user biometrics. One or more of these separate analyses may be performed in steps 807-810, and each may be performed independently of the others, or may be combined into a single analysis. For instance, in some cases the goal of the simulation might be only to measure the user's biometric data, and the user's actual responses to the questions/scenarios may be irrelevant and need not be evaluated in step 807. In other tests or simulation scenarios, the opposite analysis may be applied, where only the accuracy of the user's responses or behaviors are measured and analyzed in step 807, and the user's biometric data is irrelevant and thus the analysis in step 810 is not performed. As another example, in a certain simulation of driving, machine operation, use of force training, etc., the only relevant analysis to be performed may be a safety/decision making analysis in step 809, while the efficiency analysis in step 808 need not be performed. In other similar tests/situations, the server may apply both a safety/decision making analysis in step 809 and an efficiency analysis in step 808 (e.g., to confirm that a driving maneuver or route was completed both safely and efficiently, to confirm that a suspect was subdued safely and quickly, to assure that a manufacturing assembly task was performed safely and efficiently, etc.)

In accordance with certain aspects described herein, the processes used for testing/evaluating a user and determining that a user has qualified for a particular badge (or digital credential) need not include a specific test, designated evaluation, or scored scenario training. Rather, the testing and badging determinations may be performed automatically during the user's normal course of on-the-job performance of tasks. In such embodiments, the testing and credentialing of users may be based on observation of workers during their normal work activities. Cameras and other sensors may be installed and used to detect the completion of tasks and/or certain competencies of the users, and the data from these sensors may be evaluated to automatically determine when the user has qualified for a badge. Thus, on the job testing and badging may be performed entirely transparently to the worker performance of their job duties, and need not require any delay or distraction from job performance, or any designated time or location needed to perform formal testing.

Figure 9A:
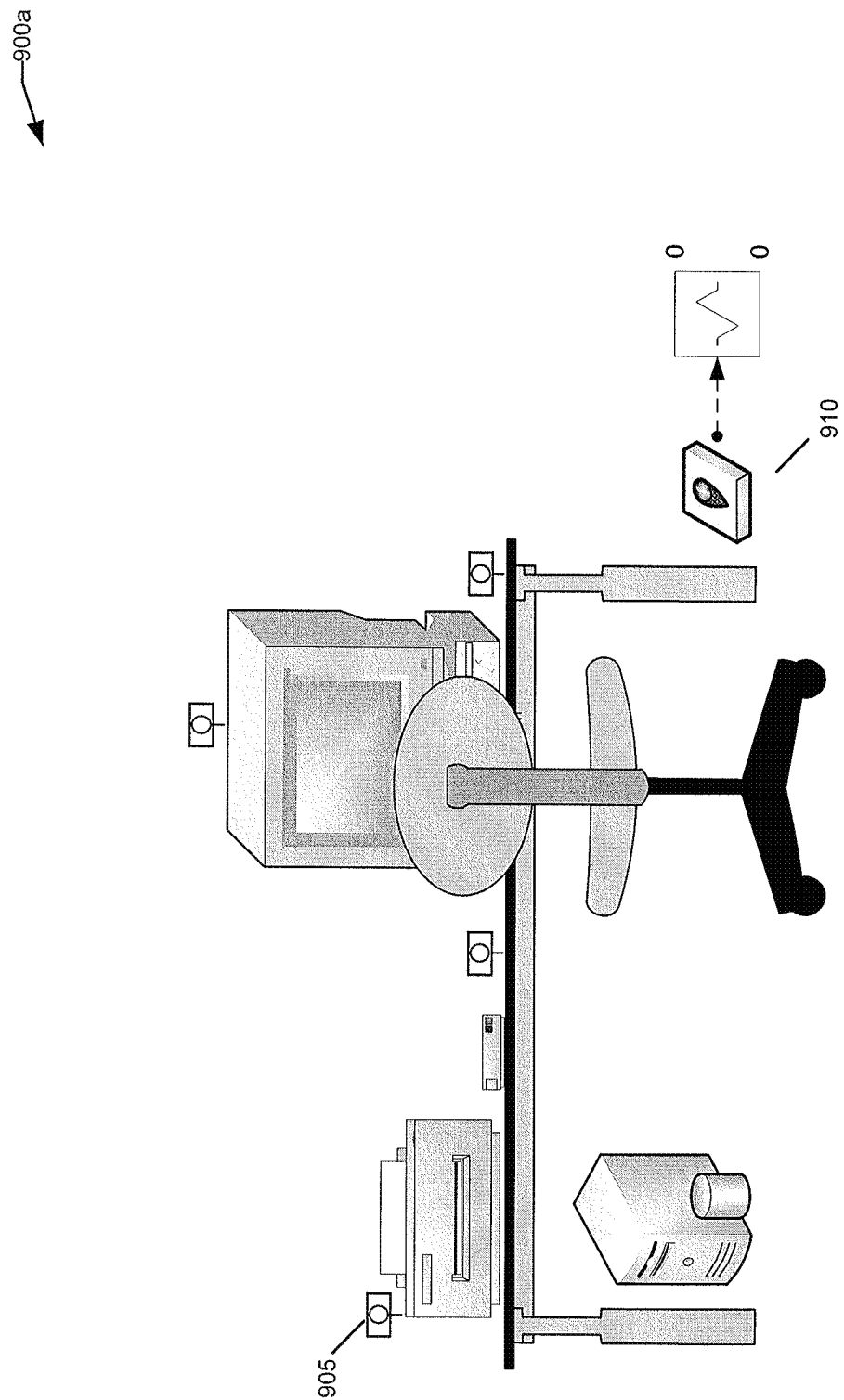
FIG. 9A is a diagram illustrating a computer terminal-based system for sensor-based monitoring, and generation of digital credentials, according to one or more embodiments of the disclosure.

In order to perform automatic and on-the-job testing and credentialing of workers or other users (e.g., students, athletes, etc.), the "work" environment of the user may be monitored with cameras and/or sensors capable of tracking the user's activities and performance. As discussed above with respect to the implementation of physical testing environments (e.g., 700), different types of badges relate to different activities that may be performed in a variety of different work environments. Referring briefly to FIG. 9A, an example work environment 900a is shown for a user completing computer-based tasks. In this example, the work environment 900a may include a basic workstation, server, modem, printer, monitor, keyboard, etc., as well as desk and chair to allow the user to complete normal computer-based work activities. In this example, the user may be data entry specialist, computer programmer or design engineer, call center customer support operator, or may be performing any other computer-based job. In such examples, sensors 905 and 910 may include cameras, network monitoring devices, keystroke loggers, mouse movement monitors, biometric devices and sensors, etc. Additional monitoring devices may be built into specific software programs with which the user is interacting, and may be able to determine the correctness, quality, and efficiency of the user's interaction with the particular software. For example, if a user is interacting with a spreadsheet software application or computer-aided design application to perform a work task, then monitoring features within the software application may be used to determine how quickly the user performed the task, how many attempts it took the user, how correct/accurate was the finished product, etc. In other examples, the monitoring of the user's interaction with a particular software program need not involve any monitoring features within the software itself, but instead may include monitoring at the operating system or hardware layers, or monitoring that is entirely external to the workstation. For example, external cameras 905 and other sensors may capture and analyze the user's interactions with the software application, and thus need not affect the operation of the software at all.

Figure 9B:
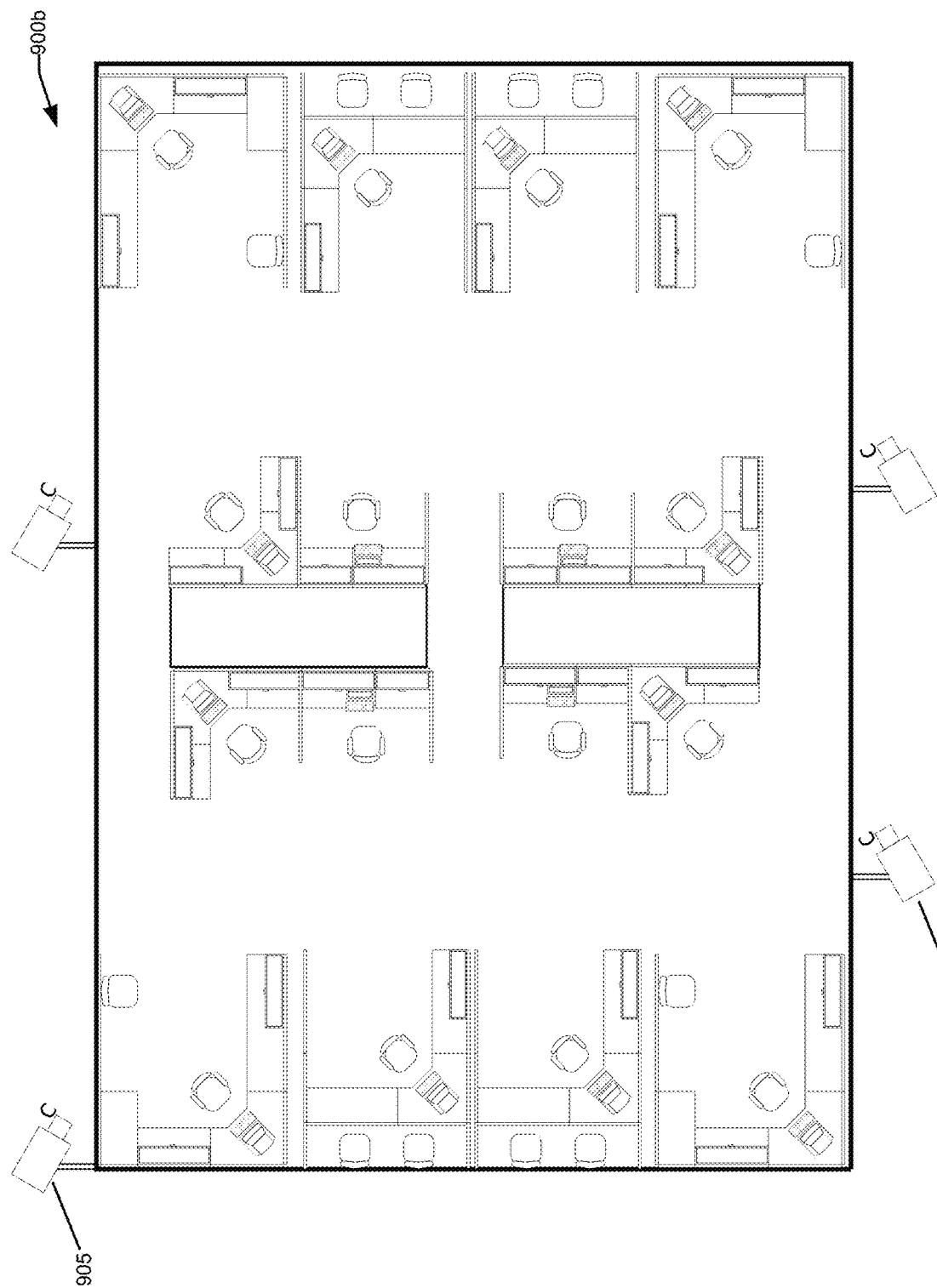
FIG. 9B is a diagram illustrating a physical environment-based system for sensor-based monitoring, and generation of digital credentials, according to one or more embodiments of the disclosure.

Another example work environment is shown in FIG. 9B. In this example work environment 900b, the entire layout of workplace floor is shown and monitored by a series of cameras 905 and/or other sensors. The monitoring in this example may apply to workers who do not perform only computer-based tasks, but whose work requires them to interact with physical objects within their workspace, and/or to move around the work environment 900b to other workspaces. For instance, maintenance workers, office mail delivery workers, construction workers, electricians, plumbers, machine assembly or manufacturing workers, etc., may be monitored with such systems. When monitoring a larger area for the performance of non-computer-based work tasks, in addition to cameras 905, the work environment 900b may include motion sensors, microphones and noise sensors, as wells as movement sensors and/or tracking devices that may be placed on specific physical objects within the environment. By way of example, work environment 900b may correspond to a shop floor, mechanic's garage, or manufacturing assembly plant, and the cameras 905 and other sensors may be used to confirm that workers are complying with safety requirements and/or health codes with respect to their work with machinery or hazardous materials, etc. As another example, work environment 900b may be an office environment, and the cameras 905 and other sensors may be used to confirm that individual workers are working efficiently, in their assigned areas, etc., and that workers without assigned areas (e.g., cleaning, mail delivery, maintenance workers, etc.) are working efficiently and not skipping any portion of the floor 900b.

Figure 10:
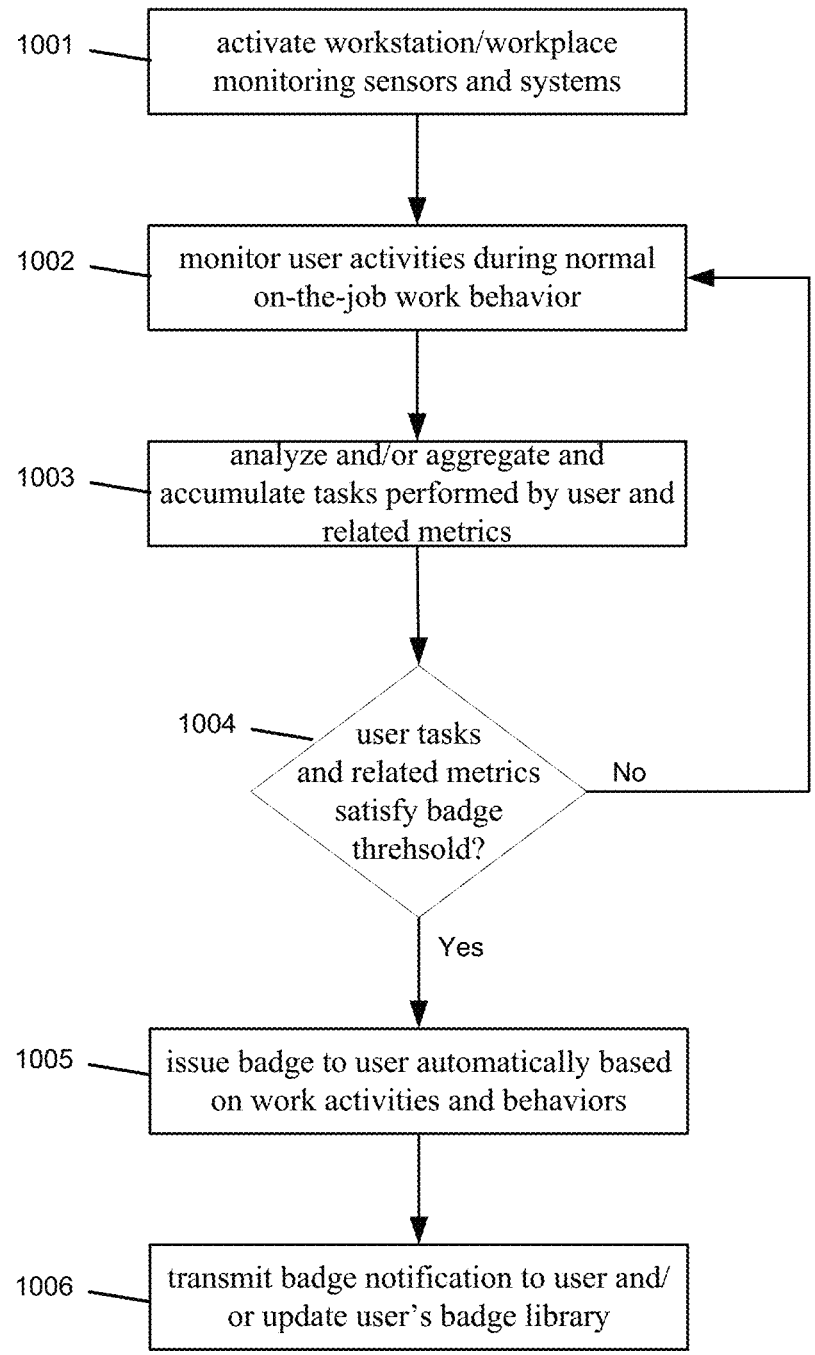
FIG. 10 is a flow diagram illustrating an example process of generating and issuing digital credentials in a sensor-monitored environment, according to one or more embodiments of the disclosure.

Referring now to FIG. 10, a flow diagram is shown illustrating an example process of automatically monitoring work activities and issuing badges via "on-the-job" testing. As described below, the steps in this process may be performed by monitoring and credentialing computing devices operating within various types of work environments 900, such as those described above. For example, each of steps 1001-1006 may be performed by a computer server operating automatically and unassisted (or at the direction of an administrator) within a work environment 900. In other examples, work environments 900 might be configured only to monitor work activities and performance, and then to transmit the results and related observation data regarding various worker to a separate server (e.g., a digital credential platform server 610) for scoring, analysis, and the issuance of badges.

In step 1001, a computer server controlling the on-the-job badging system may activate the cameras, sensors, monitoring software, etc., within the workstation and/or work environment. As discussed above, this activation may include specific monitoring software to detect computer-based tasks, and/or location monitoring devices such as cameras, sensors, biometrics, etc., depending on the type of workers and work environments 900 being monitored. In some cases, an on-the-job testing and credentialing system may be implemented as an "always on" system, in which the workstation/workplace monitoring is constantly recording and analyzing worker activities. Thus, step 1001 may be optional in such embodiments. However, in other cases, workstation/workplace monitoring might only be activated at certain times and not others, for example, only during normal work hours, only on certain specific work days designated for work evaluation, etc. In some embodiments, a system administrator and/or individual workers may activate or de-activate the workstation/workplace monitoring systems within their work environment at any time. Thus, such systems need not be an invasion of privacy for any worker that does not choose for their work to be monitored and evaluated, but workers may choose to turn the monitoring systems on in order to be eligible for evaluation and earning of additional work related badges and credentials.

In step 1002, the workstation/workplace monitoring systems may capture the user's work-related activities and behaviors, including performing various computer-based tasks and non-computer-based tasks as discussed above. In step 1003, the user's working data as collected by the workstation/workplace monitoring systems and sensors may be analyzed by the server, in order to determine in step 1004 whether or not the user is eligible for one or more badges or other credentials (e.g., professional certifications, etc.) based on their on-the job work activities. Certain badges or credentials may be made available to users in response to detecting that the user has successful completed one or more specialized work tasks, thus demonstrating that the user has obtained the particular skill associated with the badge. In some cases, the server and/or the monitoring systems and sensors may also be configured to detect a certain level of efficiency by the user in performing the tasks, and/or may require that the user perform a certain task N number of times before the user is eligible for the badge or credential.

In step 1004, if the system determines that the user is eligible for one or more particular badges (1004:Yes), then in step 1005 the system may either issue the badge directly (e.g., if the workplace server is permitted to be badge issuer), and/or may initiate a communication session with a badging platform 610 and/or badge issuer 630 to request that a new badge is issued for the worker. In such examples, the workplace server may provide the information identifying the worker (e.g., name, employee ID, badge system profile ID, etc.) to a badge platform 610 or issuer 630, along with verification that the worker has completed the requirements to earn a particular badge. In some embodiments, the servers operating at the workplace may be configured to capture evidence (e.g., video evidence, screen captures, facial/identity verification, etc.) and transmit the evidence to the badge-issuing authority, before the badge may be issued.

In step 1006, the worker may be notified that they have received a badge based on their normal on-the-job activities. In some embodiments, the worker may indicate interest in obtaining one or more particular badges, and the workstation/workplace monitoring system may be configured to evaluate the worker with respect to the particular badges or credentials that the worker has expressed interest in. However, in other examples, it may be possible for a worker to receive an issued digital badge without expressing any interest in the badge (or even being aware of such a badge), but solely based on the determination that the worker has achieved the level of skills mastery required for the badge/credential, based on the automated monitoring of the worker within the workplace. In certain cases, a user may be informed that they are eligible for receiving a badge prior to the issuance of the badge in step 1005, and the user may be allowed to accept or reject the badge. Additionally, in some cases, the user may receive status reports (e.g., daily, weekly, etc.) identifying which badges the user is being monitored for, and the user's progress with respect to earning those badges. This data may include indications to the worker that he/she may earn a particular badge after performing a task another N times, or performing the task N amount faster, or performing the task without making any errors or backtracking, etc.

Additional aspects related to the automated tracking of user or worker activities, after the user/worker has been issued a badge or credential, in order to determine how often the user/worker is "using" their badge. Depending on type of badge or credential, post-credentialing monitoring of the user may involve analysis of user's physical work product (e.g., documents produced, parts/items created, etc.), or may be involve observations of the user (e.g., via a workstation/workplace monitoring system). In order to evaluate how often a user is using a particular badge, a data store of badges may be linked to particular skills, work-related, or activities. The user/worker may then be tracked to determine the number of such tasks performed, and/or the quality, efficiency, and/or competence of the user's performing those tasks, in order to determine to what extend the user/worker is "using" the badge.

Figure 11:
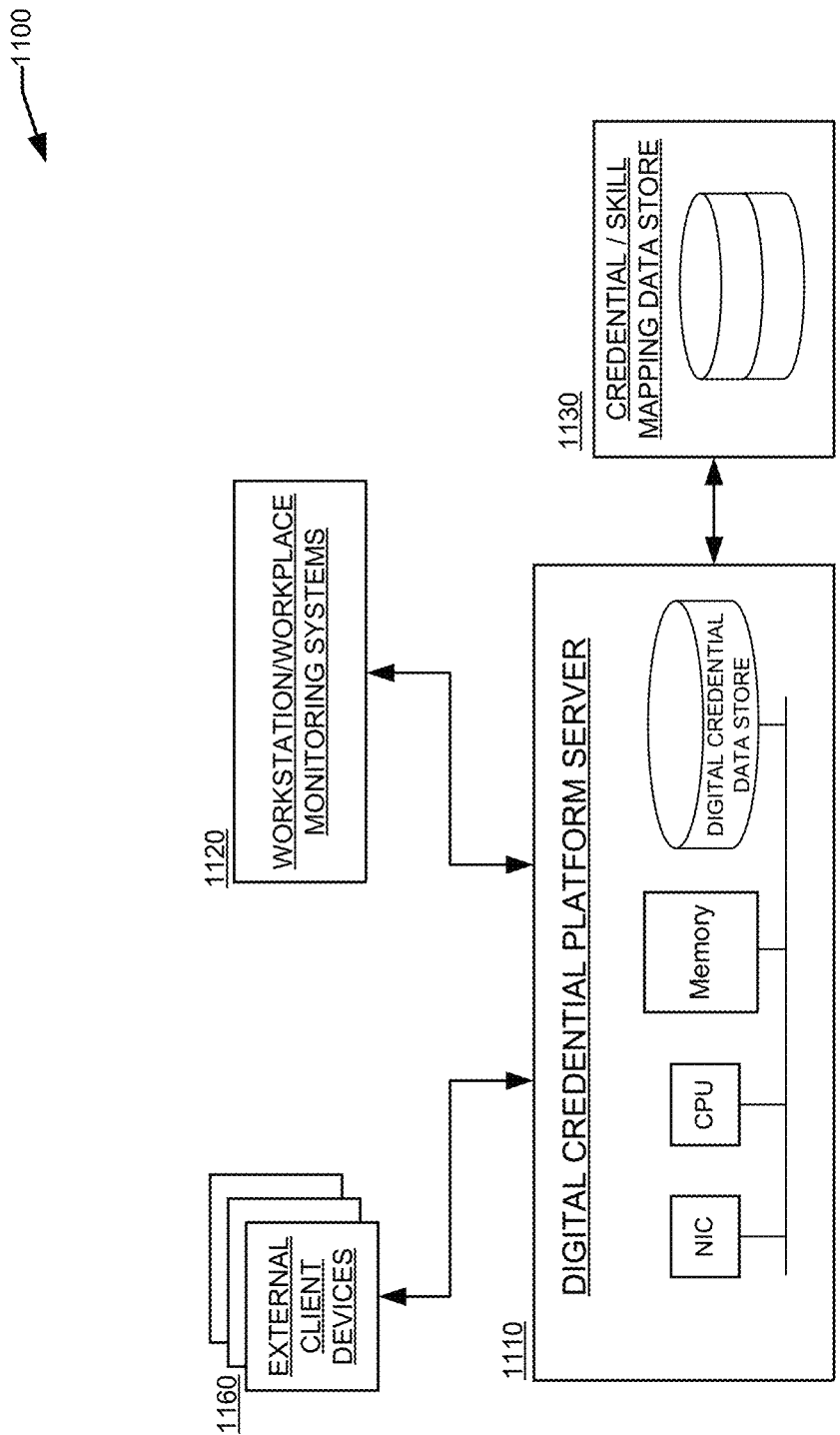
FIG. 11 is a diagram illustrating an example computing environment for analyzing sensor-based activity monitoring within a digital credential system, according to one or more embodiments of the disclosure.

Referring now to FIG. 11, an example computing environment 1100 is shown, including a digital credential platform server 1110, one or more workstation/workplace monitoring systems 1120, and a credential-to-skill mapping data store 1130. In some examples, the digital credential platform server 1110 may be a badging server similar or identical to the server 610 discussed above. Thus, server 1110 may be configured as a badge repository and credentialing system, acting as a clearinghouse for badge owners, issuers, earners, endorsers, etc. Server 1110 may include a digital credential (or badge) data store configured to store badging information such as the details of the particular badges earned by particular users. As noted above, such details may include the date on which a badge was issued to a user, and for certain badges, an expiration date associated with the badge.

In this example, system 1100 also includes a credential-to-skill mapping data store 1120, which may be implemented as a separate external data store and/or may be integrated into the digital credential data store of server 1100. The credential-to-skill mapping data store 1130 may include mappings of one or more tasks or skills associated with each badge type that a user may potentially earn. For example, a badge relating to automotive maintenance for a particular make of car may have associated skills and tasks that include particular maintenance tasks (e.g., tune-ups, part replacements, etc.) for different model cars having the make. As another example, an operating system administrator-related badge may list, within data store 1130, various system administrator tasks and that a user may perform on the particular operating system. In some cases, the skills or tasks associated with a particular badge may correspond to the same set of skills or tasks that a user is required to perform to earn the particular badge, and as discussed below, these skills or tasks may serve as a metric to evaluate how much the user is "using" the badge.

One or more workstation and/or workplace monitoring systems 1120 may provide user monitoring data to the server 1110, to allow the sever 1110 to analyze the user's activities and determine to what extent the user is using the skills and abilities associated with their badges. In some embodiments, the workstation and/or workplace monitoring systems 1120 may be similar or identical to any of the workstation/workplace monitoring systems and sensors discussed above. For example, workplace monitoring systems 1120 may collect records detailing the user's physical work product (e.g., documents produced, modified or accessed by the user, inventory or work order records indicating tasks performed by the user, etc.). Additionally, workplace monitoring systems 1120 may include observation systems (e.g., workplace monitoring systems) including cameras and other sensors to track the user's activities and determine which specific tasks have been performed by the user.

Figure 12:
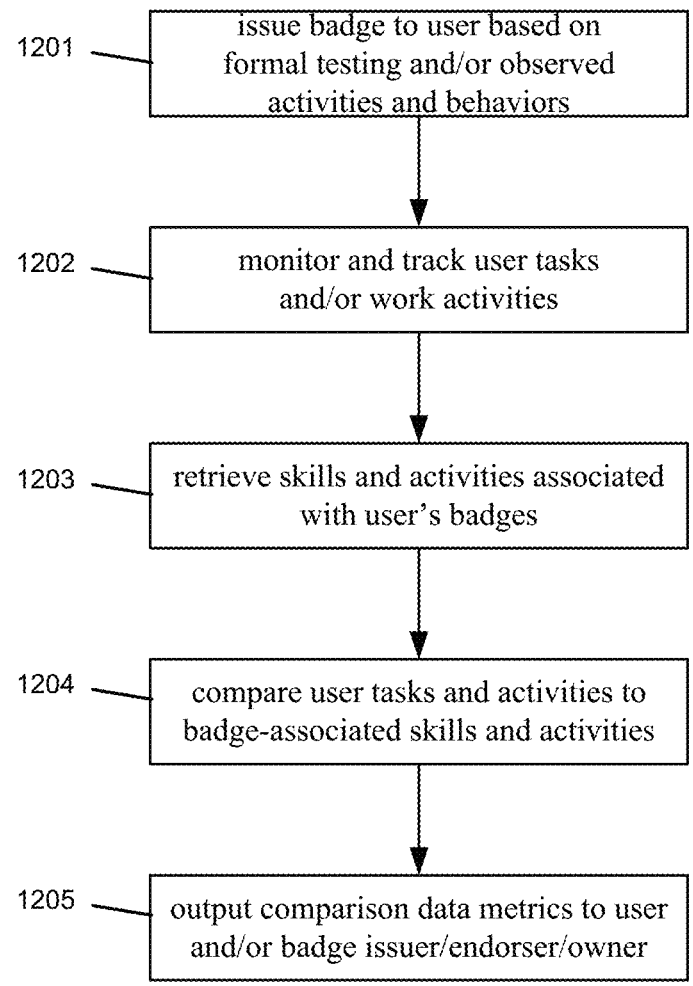
FIG. 12 is a flow diagram illustrating an example process of generating digital credentials and tracking the corresponding activities in a sensor-monitored environment, according to one or more embodiments of the disclosure.

In some embodiments, the monitoring and tracking of post-credentialing activities by the user may be used to analyze and provide badge or credential feedback data to various entities. For example, referring now to FIG. 12, a flow diagram is shown illustrating an example process that may be used to determine whether a user has or has not used the skills associated with a particular badge that they have obtained, and then to aggregate and report that badge usage data to the relevant parties. In step 1201, a particular badge is issued to a user based on the user's successful completion of the badging requirements. As in the various examples discussed above, the badge may be associated with a computer-based skill, non-computer-based skill, or any other set of badging requirements determined by a badge owner or issuer. Additionally, the badge issuance in step 1201 may be the result of formal testing and/or certification processes, or may be based on on-the-job or other observational data collected for the user.

In step 1202, the digital credential server 1110 and/or monitoring systems 1120 may monitor and track the activities of the credentialed user, including, for example, the workplace tasks performed by the user based on analyses of the various monitoring systems/sensor data installed at the user's workstation and/or workplace environment. As described above, determining what activities and tasks the credentialed user has performed, and when, may be performed using a variety of techniques. In some cases, determining what work-related tasks a user has performed, and what other activities they have been engaged in, may be done by analyses of written and electronic documents associated with the user or workplace. For instance, documents such as maintenance requests, work orders, customer tickets, purchase receipts, and the like may be analyzed to determine what skills or tasks the user has completed and when. For instance, a maintenance record listing the user as the assigned technician may be used in determination that the user has performed the specified task/skill at the time listed on the record. In other examples, the user's electronic mail and other electronic documents may be searched and analyzed (e.g., using a keyword analysis and/or trained artificial intelligence) to determine what tasks the user has performed and/or what skills the user has demonstrated during the relevant time periods. In some embodiments, there may be particular advantages in implementing a post-credentialing usage analysis and/or badge valuation process for certain badges/tasks that are more discrete and detectable, for instance, a number of transmissions changed after earning a vehicle transmission certification, a number of particular medical procedures done following a badge credential for the procedure, a number of IT tickets resolved successfully following receiving an advanced IT computer services and computer repair badge, etc. In contrast, for other tasks and skills for which a user may receive a badge, such as leadership, communication skills, advanced C software programming, jujitsu skill levels, and the like, it may be more difficult to quantify if, when, and how often a user is using the particular skill or task associated with the badge.

In step 1203, a set of tasks and/or skills associated with the badges obtained by the specific user may be retrieved using the credential-skill mapping data store 1130, and in step 1204 the retrieved tasks and/or skills may be compared to the tasks and skills that have been performed by the user subsequent to the badges being earned (as determined in step 1202). As an example, the comparison in step 1204 may determine that in the six month since the user was issued a professional certification to perform a particular technical task, the user has performed that task on a weekly basis. Alternatively, for a different badge issued to the user directed to expertise in a particular software program, the comparison in step 1204 may determine that the user has used that software program only once since receiving the badge two years ago. In this case, the system may conclude that the professional certification issued six months ago to the user has been of greater usefulness than the software badge issued two years ago (allowing for the possibility of career changes, prestige-driven badges rather than functional badges, etc.).

In step 1205, data from the comparison of step 1204, i.e., data indicating the post-credentialing usage by the user of the badge-associated skills or tasks, may be aggregated and analyzed, and then transmitted to one or more of the relevant system components. In various embodiments, any of several different components and roles associated with the credentialing platform 1110 may request and receive this information for their associated badges and/or associated users. For instance, badge owners and/or badge issuers may request and receive from the platform server 1110 data regarding the post-issuance usage of the badges they own or have issued. In other cases, badge endorsers may request and receive from the platform server 1110 data regarding the post-issuance usage of the badges they have endorsed. Badge earners, the users themselves also may request reports from the platform server 1110 quantifying the post-credentialing usage (which may be expressed in terms of time, value, and/or dollar amounts) associated with their previously earned badges. Employers and other organizations also may request such reports for their employees or organization members, in order to determine which badges have been the most used and most useful to the organization.

Figure 13:
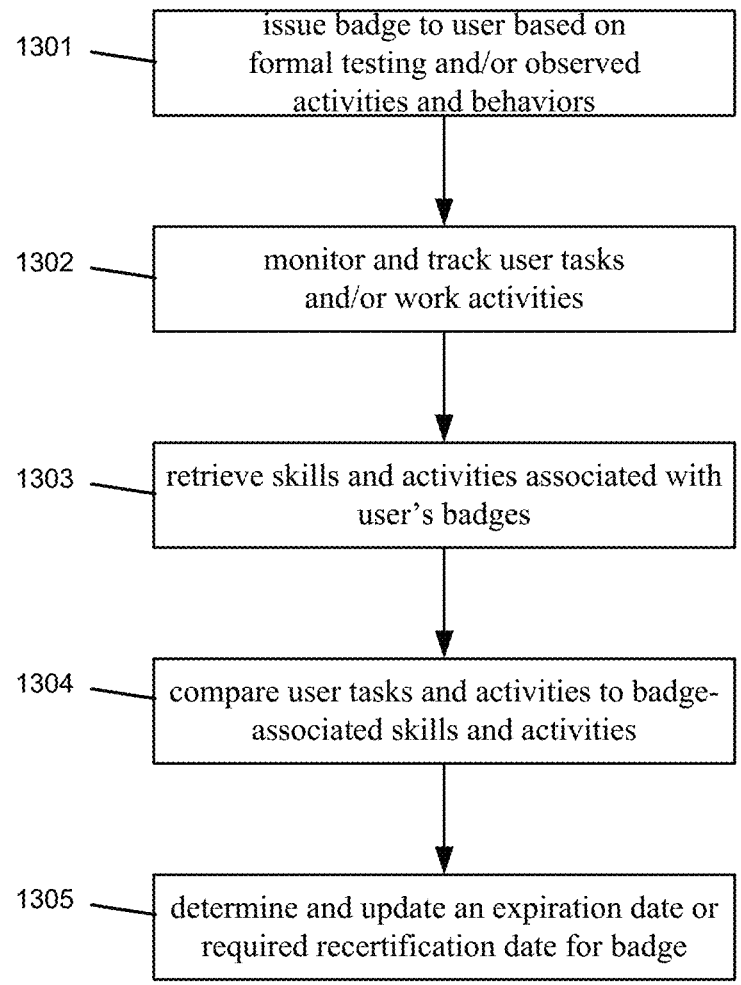
FIG. 13 is a flow diagram illustrating an example process of analyzing activities in a sensor-monitored environment to determine digital credential expiration and/or recertification times, according to one or more embodiments of the disclosure.

Referring now to FIG. 13, another flow diagram is shown illustrating an related process involving determine whether a user has or has not used the skills associated with a particular badge that they have obtained, and then adjusting an expiration or re-certification date associated with the badge based on the user's usage of the badge skills. The steps in this example may be similar or identical to the corresponding steps in FIG. 12, and in some embodiments, the analyses and transmission of the post-credentialing usage described in step 1205 may be performed in conjunction with the setting of an expiration or re-certification date for the badge as discussed below.

Steps 1301-1304 may correspond to steps 1201-1204 in some cases, and may be performed using similar or identical techniques to those discussed above. For example, in step 1301 a platform server 1110 and/or badge issuer may issue a badge associated with one or more skills or tasks to a particular user, recording the badge issuance data within the digital credential data store. In step 1302, the post-issuance activities of the particular user may be monitored, including monitoring of the user's work-related activities and tasks performed/completed, in order to determine the particular tasks and activities with which the user has been engaged following issuance of the badge. In step 1303, the skills, activities, and tasks associated with the user's badge(s) are retrieved, and in step 1304 are compared to the post-issuance user tasks and activities determined for the user in step 1302. Finally, in step 1305, based on the comparison in step 1304, the platform server 1110 may determine that an expiration date and/or recertification date associated with the user's badge should be adjusted based on the user's post-issuance activities. As an example, if the system determines in step 1305 that a user who received a badge corresponding to a forklift operator's license or commercial truck driving license three years ago, but has infrequently (or not at all) driven a forklift or a commercial truck since receiving their badge, then the system may determine that the user's license should expire at the earliest possible time (e.g., the expiration time as of when the badge was first issued). In contrast, if the system determines in step 1305 that the same user has frequently and consistently driven a forklift or a commercial truck ever since receiving their badge, and also that the user has a high-safety rating and/or high safety compliance scores, then the system may determine that the user's license may be extended. In such cases, the platform server 1110 may determine a new extended expiration or recertification time for the badge, update the user's badge record within the digital credential data store, and transmit notifications to the affected entities (e.g., the user, employer, badge issuer, badge owner, etc.) providing the new expiration date. In other examples, rather than changing the expiration date or recertification date of a badge (or eliminating the expiration altogether), the platform server 1110 may in other examples determine a new recertification course or procedure for the user, such as simple refresher course to allow the user to recertify quick than the longer complete recertification course used by other users with less post-credentialing badge usage.

In accordance with some aspects described herein, software systems including analytics and/or artificial intelligence may be used to assess various different badging, certification, and skills verification systems. For example, in some embodiments, specialized software may be implemented to evaluate the performance of a variety of physical testing environments (e.g., 700) that certify user skills and/or issue badges. Similar software may be used to evaluate automated on-the-job testing and credentialing systems, such as those discussed above in reference to FIGS. 9A-9B and 10, including workstation/workplace monitoring systems and sensors that may be used for on-the-job badging, real-world testing and credentialing scenarios, as well post-credential usage monitoring systems.

Figure 14:
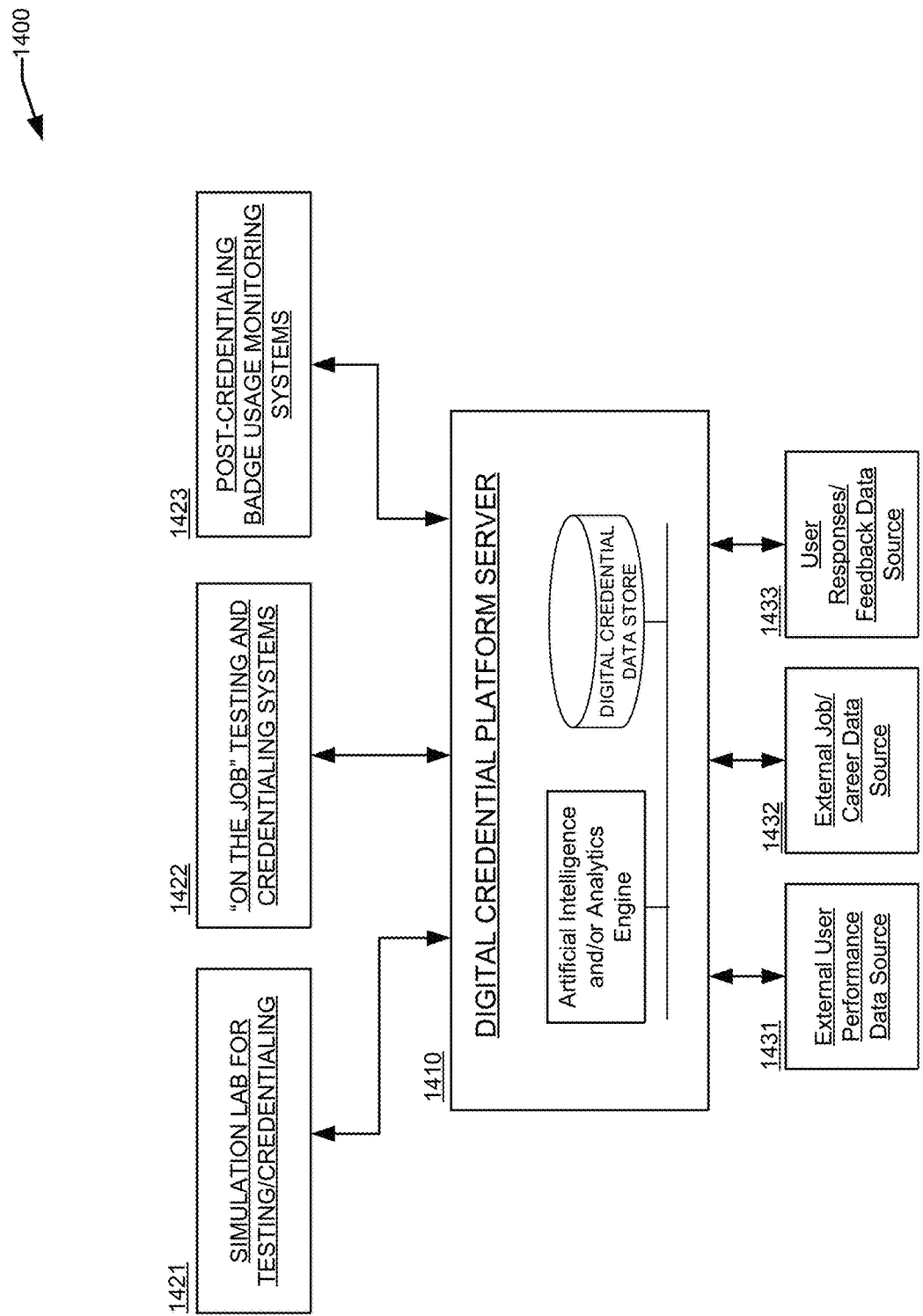
FIG. 14 is a diagram illustrating an example computing environment for generating and analyzing digital credentials using received sensor monitoring data, according to one or more embodiments of the disclosure.

Referring now to FIG. 14, an example computing environment 1400 is shown, including a digital credential platform server 1410, in communication with one or more testing/credentialing systems 1421-1423, and one or more external data sources 1431-1433. In some examples, the digital credential platform server 1410 may be a badging server similar or identical to the server 610 discussed above. Thus, server 1410 may be configured as a badge repository and credentialing system, acting as a clearinghouse for badge owners, issuers, earners, endorsers, etc. Server 1410 may include a digital credential (or badge) data store configured to store badging information such as the details of the particular badges earned by particular users. As noted above, such details may identify the badge issuer and/or other testing/credential authorities responsible for administering testing or simulation scenarios as part of the badging process, and/or for pre-badge or post-badge monitoring of workstations/workplaces to detect and analyze user tasks performance and user skills/abilities.

In this example, the platform server 1410 may receive data from three testing/credentialing systems 1421-1423. The simulation lab system 1421 may correspond to a simulation lab or other physical testing environment. As discussed above, simulation labs, as an alternative to or in conjunction with formal testing systems, may provide the testing infrastructure for verifying compliance with requirements for any number of badges and certifications. Additionally, platform server 1410 may receive data from one or more on the job testing and credentialing systems. As discussed above, in some embodiments, on-the-job monitoring of user tasks and activities may be used instead of any formal testing procedure or simulation lab. On-the-job credentialing systems 1422 may include workstation/workplace monitoring systems and sensors to record and analyze the user's on-the-job performance, and may issue badges in some cases without the need for any separate formal testing procedure. Additionally, post-credential systems 1423 may be configured to monitor users following the issuance of a badge, including tracking task performance data, skills usage, and the like, and comparing the data to the skills/tasks associated with the user's badges. The data received from systems 1421-1423 may include data identified the user's that were tested, credentialed, and/or monitored by the respective systems, the testing/monitoring processes and equipment used, and the particular test/simulation/monitoring conditions or any other associated variables.

Within the platform server 1410, an analytics engine and/or artificial intelligence components may be used to analyze the data from systems 1421-1423, retrieve additional data from external data sources 1431-1433, and evaluate the testing/credentialing systems 1421-1423 based on the data. In some cases, the evaluation engine may rely on analytics data from multiple systems, such as training an artificial intelligence or analytic system using badging data and subsequent user behavior. For example, the evaluation engine may retrieve external user performance data from data source 1231, including data such as the user's subsequent test scores, other badges obtained, improvements (or declines) in user performance of certain badge-related tasks or abilities, before and after the issuance of a badge from one of the systems 1421-1423. Additionally, the engine may retrieve external job data and/or career data for particular users who have received badges from one of the testing/credentialing systems 1421-1423. Such job/career data may include current occupation and details (company, salary, etc.), previous positions held, and the like. Further, the engine may retrieve direct or indirect user feedback regarding the testing/credentialing systems 1421-1423. Such data may include, for example, explicit user feedback such as survey responses, or number/percentage of returning customer to a particular testing/credentialing system 1421-1423. Additional user feedback data may include user behavioral cues during or after the particular tests, monitoring, or simulations given to the user at the testing/credentialing system 1421-1423.

Based on the above data, the analytics engine and/or artificial intelligence components within the platform server 1410 may be configured to analyze and evaluate each of the testing/credentialing system 1421-1423, both on their own and in comparison to one another. For example, the evaluation engine may determine that credentialed users who were issued badges based on a particular training virtual reality or augmented reality training program at a simulation lab 1421, may be underperforming or may lose their badge-related skills more quickly than users who were issued badged at a second simulation lab 1421 using different virtual reality or augmented reality training programs. In this case, certain techniques used by the second simulation lab 1421 (e.g., the equipment, the testing procedures, the number of repetitions, etc.) which are different from those used at the first simulation lab, may be determined to be the cause of the improved performance of the second simulation lab 1421. The evaluation engine may perform similar analyses to compare the effectiveness of multiple on-the-job testing and credentialing systems 1422, and multiple post-credentialing badge usage monitoring systems 1423, including comparing different types of testing and credentialing systems (e.g., comparing user success rates following virtual reality testing to standard written testing to on-the-job testing, etc.). In these embodiments, the successful/unsuccessful output rates used in the analytics and/or artificial intelligence may be based on subsequent user performance data, job/career data, user feedback data, or any combination of user post-badge observation data.

Following the analysis, the platform server 1410 may revise testing/credentialing procedures, for example, by requiring certain best practices to be implemented by certain testing/credentialing systems 1421-1423. Additionally, in some cases, the platform server 1410 may revise previously issued digital credentials that are stored in the data store to indicate a relative strength or weakness of a credentials based on the analysis, change the expiration date or recertification date of the badge, etc.

Additional aspects described herein relate to capturing and using "evidence" data in connection with user testing and credentialing systems, on-the-job evaluation and badging systems, and/or post-credential monitoring systems. For example, within any automated badging/certification/verification system, evidence of the user's performance may be extracted and saved, for example, in a badge server along with an associated issued badge, or as part of a separate user portfolio of evidence. Evidence data may include, for example, audio and video of the user during a live simulation, or during a virtual reality or augment reality simulation, audio and keystroke data from the user during the testing processing, the user's reaction time and/or decision-making data during a split-second simulated scenario or relevant real-life event (e.g., a workplace accident, etc.), and/or any other sensor or biometric data collected during testing, credentialing, and/or monitoring. As discussed below, evidence data associated with a user may be saved with the user's badge and/or into a separate portfolio of evidence, which may be available to the user for review, and also may be provided upon request to potential employers for review during a review or hiring process. Such evidence data also may be applied to updated badge credentialing requirements, so that in some cases a user may simply resubmit their evidence portfolio instead of being required to recertify their badge when the test or credentialing standards are updated.

Figure 15:
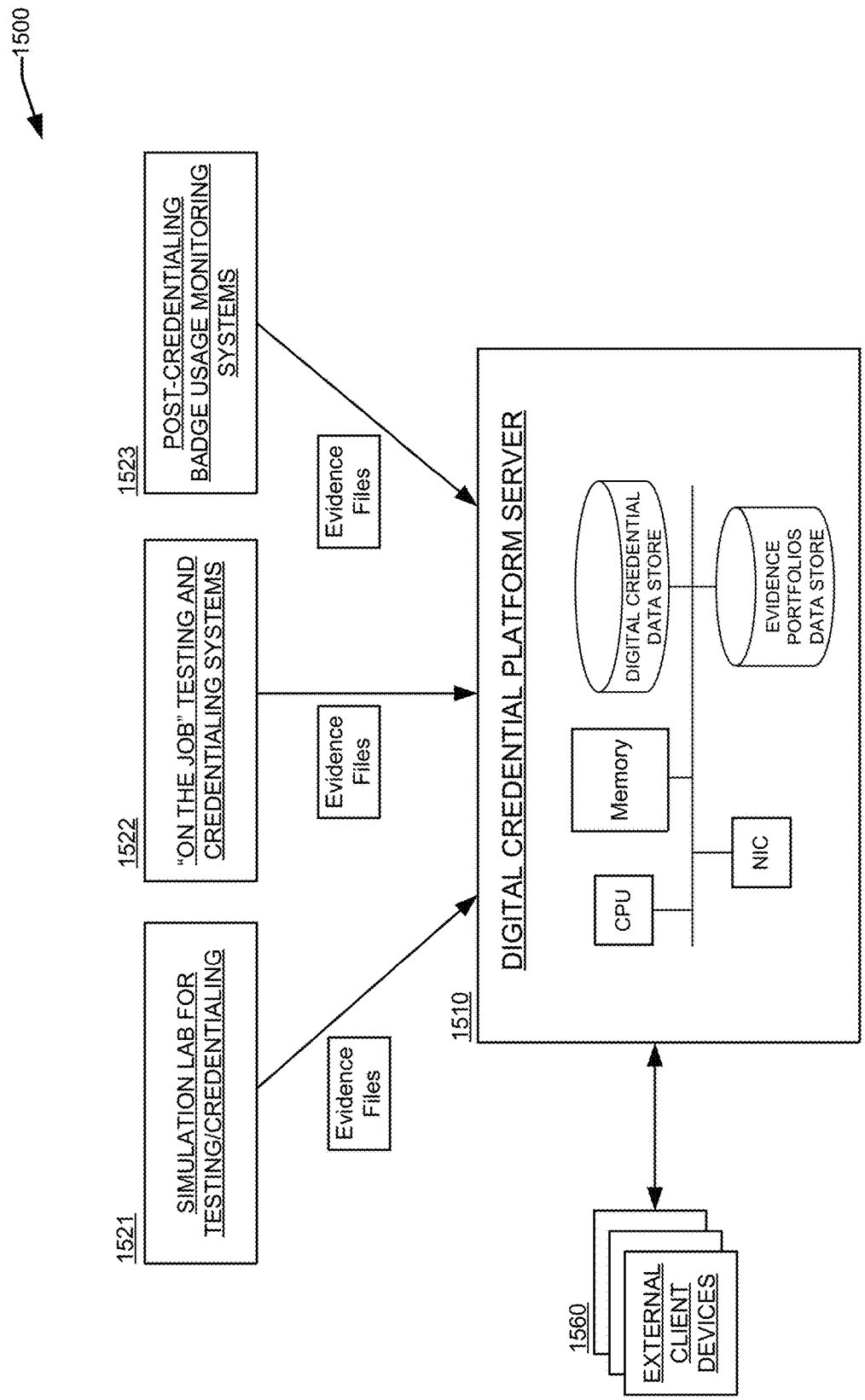
FIG. 15 is a diagram illustrating an example computing environment for generating and analyzing digital credentials using received data.

Referring now to FIG. 15, an example computing environment is shown including a digital credential platform server 1510 in communication with a plurality of testing, credentialing, and/or monitoring systems 1521-1523, and one or more external client devices 1560. In some examples, the digital credential platform server 1510 may be a badging server similar or identical to the server 610 discussed above. Thus, server 1510 may be configured as a badge repository and credentialing system, acting as a clearinghouse for badge owners, issuers, earners, endorsers, etc. Server 1510 may include a digital credential (or badge) data store configured to store badging information such as the details of the particular badges earned by particular users. As noted above, such details may identify the badge issuer and/or other testing/credential authorities responsible for administering testing or simulation scenarios as part of the badging process, and/or for pre-badge or post-badge monitoring of workstations/workplaces to detect and analyze user tasks performance and user skills/abilities In this example, the platform server 1510 may receive data from three testing/credentialing systems 1521-1523. Similar to the above examples, the simulation lab system 1521 may correspond to a simulation lab or other physical testing environment, an on-the-job credentialing systems 1522 may include workstation/workplace monitoring systems and sensors to record and analyze the user's on-the-job performance, and may issue badges in some cases without the need for any separate formal testing procedure; and post-credential monitoring systems 1523 may be configured to monitor users following the issuance of a badge, including tracking task performance data, skills usage, and the like, and comparing the data to the skills/tasks associated with the user's badges.

In some embodiments, one or more systems 1421-1423 which perform user testing, credentialing, and/or monitoring, such as those systems discussed above, may capture and transmit "evidence data" of the user during a test, simulation, or during an on-the-job monitoring process. Evidence data may include, for example, video and/or audio of the user during a test, simulation (e.g., live, VR, or AR), collected by the sensors of a physical testing environment 700. Additional evidence data may include user reaction time data, decision-making data, facial expression and body language data, keystroke and mouse movement data, and/or user biometric data. The evidence data may correspond to a time period just before, during, and just after a test, simulation, or a task or activity performed during on-the-job monitoring.

As shown in this example, the various evidence data collected by systems 1521-1523 may be transmitted to the platform server 1510 and stored in an evidence portfolio data store. The evidence data collected by the testing, credentialing, and/or user monitoring systems may be associated with a particular user (or users) and with a particular badge (or badges) that the user is in the process of earning or using (e.g., for post-credentialing monitoring). Thus, the evidence data may provide documented proof that the user actually completed the badging requirements, along with additional contextual evidence showing how the user performed during the testing, simulation, or monitoring.

Figure 16:
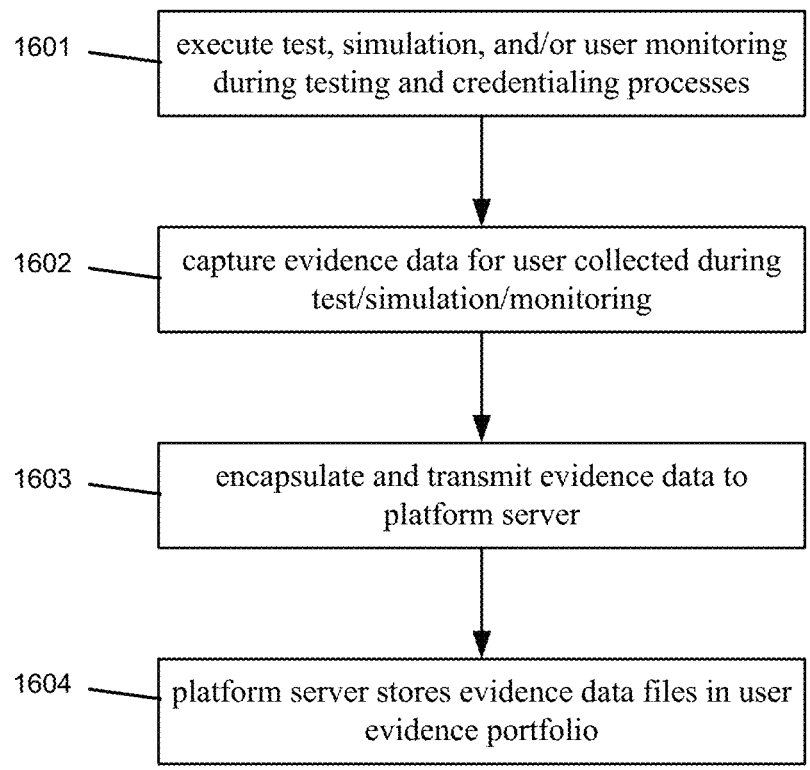
FIG. 16 is a flow diagram illustrating a process for collecting and preserving evidence data related to a user and a badge.

Referring now to FIG. 16, a flow diagram is shown illustrating an example process by which a testing system, simulator, credentialing systems, workstation/workplace monitoring system, and the like, may collect and preserve evidence data related to a user and a badge. In step 1601, a testing, credentialing, and/or monitoring system such as those described above may execute a test, simulation, or user monitoring process for a particular user in connection with a badge that the user is seeking or has already obtained. The particular types of tests may include, for example, live simulations and/or virtual or augmented reality simulations executed within a physical testing environment 700. In other examples, the testing in step 1601 may correspond to an on-the-job credentialing system that monitors and evaluates a user's workplace tasks and activities, or to a post-credentialing user monitoring system configured to determine whether the user is using their previously issued badges. In step 1602, during any of these testing, simulation, or monitoring processes, the system 1521-1523 may capture evidence data relating to the user. As noted above, evidence data may include audio or video of the user, user reaction time data, decision-making data, facial expression data, body language data, the user's keystrokes and mouse movement data, particular software interaction data, and/or the user's biometric data. In step 1603, the evidence data may be encapsulated and transmitted to the platform server 1510 for storage within the user's evidence portfolio, and in step 1604 the platform server 1510 may store the evidence data files with data records associated with the user and the particular badge(s) to which the evidence applies. In other embodiments, certain systems 1521-1523 may retain and store user evidence data locally, rather than the evidence data being stored in a central repository. Additionally, when the evidence data is transmitted, it may be compressed and edited as needed, and/or encrypted in order to assure data security and user privacy.

Figure 17A:
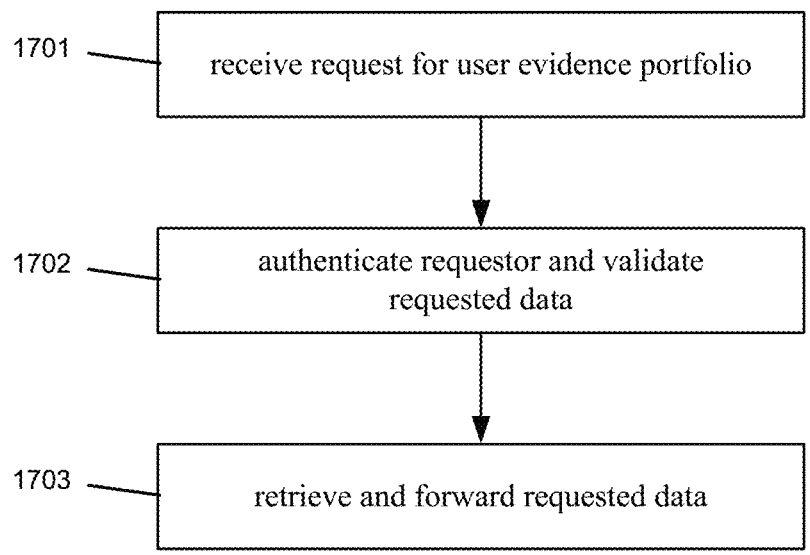
FIGS. 17A and 17B are flow diagrams illustrating example processes by which evidence data may be retrieved and/or accessed from a platform server or other data repository.
Figure 17B:
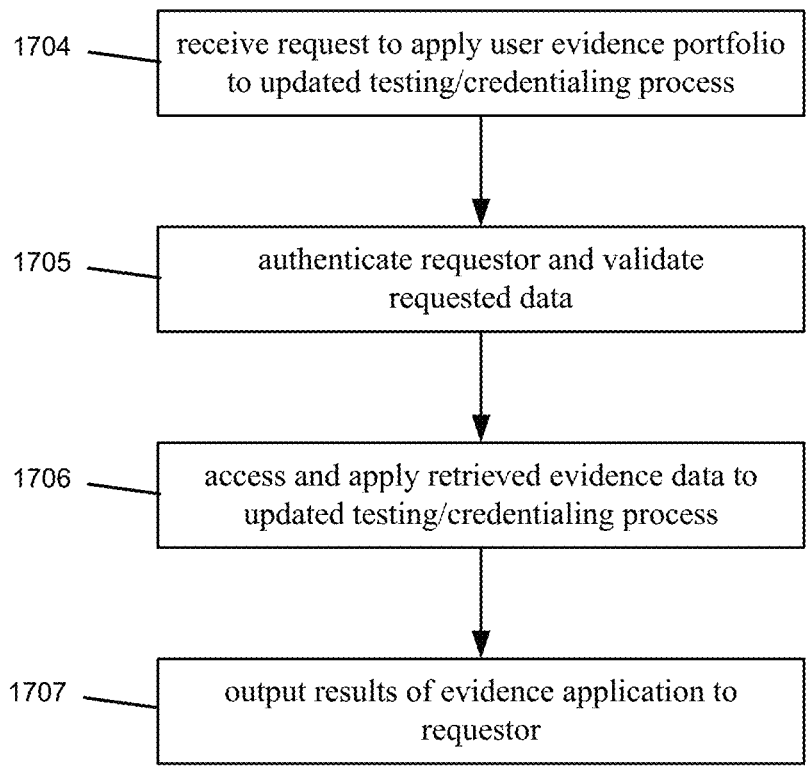

Referring now to FIGS. 17A and 17B, two additional flow diagrams are shown illustrating example processes by which evidence data may be retrieved and/or accessed from a platform server 1510 or other data repository. As noted above, individual evidence data files stored by the platform server 1510 may be associated with a particular user and/or with a particular badge or credential earned (or in process of earning) by the user. Thus, in some embodiments, evidence data may be stored and made available to certain authorized entities. For instance, in step 1701 of FIG. 17A, the platform server 1510 may receive a request for some or all of the user's evidence portfolio. In step 1702, the platform server 1510 may perform authorization/authentication on the request to determine (1) whether the requestor is authorized to access the user's evidence data, and/or (2) whether the requested evidence is current and valid. One or both of these determinations may require explicit authorization from the user himself or herself, in order to (1) prevent any unwanted parties from accessing the user's evidence data, and (2) to prevent any old and obsolete from being accessed, even by authorized parties. Thus, step 1702 may include verifying the requestor's identity or role and comparing to an access control list or other permissions data associated with the evidence. In some cases, step 1702 may include a real-time request sent by the platform server 1510 to a client device associated with the user, to allow the user the option to allow or reject the request. Additionally, the request in step 1701 may specify one or more particular users and/or one or more particular badges for which the associated evidence is to be retrieved, and thus authorization in step 1702 may be granted or denied for evidence relating to each possible combination of users and badges. In step 1703, assuming that the requestor has been granted access to the requested evidence data, the corresponding evidence data files may be retrieved and forwarded to the requestor.

In some examples, the request in step 1701 may be from the user himself/herself, who wants to review and study the evidence from his/her previous tests, simulations, and monitoring data. In other examples, the request in step 1701 may be from a current or potential employer, who has been authorized by the user to retrieve and view the user's evidence data associated with all work-relevant badges, as part of a hiring process or review process. The user's evidence data may verify to the employer or potential employer that the user actually completed the badge requirements, and also may allow the employer or potential employer to observe the user's behaviors, responses, reactions first-hand, thus allowing them to evaluate the user's reaction time, efficiency, mental state, decision-making, etc., and other difficult to quantify characteristics. In still other examples, the user may authorize a badge issuer or badge owner to view the user's evidence files related to the badges issued and owned by those entities. Finally, users may make some or all of their evidence data publicly available (e.g., on a file-by-file basis) and/or may actively post their evidence data as a multimedia file or data records within a digital credential profile page of the user that is maintained and published by the platform server 1510.

In some embodiments, in addition to (or instead of) providing evidence data in response to requests, the platform server 1510 may provide the functionality to receive updated tests, badging requirement, credentialing data, etc., and to apply a user's previously stored evidence to the new testing or credentialing requirements. For instance, in step 1704 of FIG. 17B, the platform server 1510 may receive a request to apply previously stored evidence data within a user's portfolio to an updated testing/credentialing process. For example, testing or credentialing authorities (e.g., a badge owners or issuers, employers, etc.) may periodically update badging requirements in order to improve the quality of the badge testing, to comply with new best industry practices, to make a badge more restrictive by increasing the required scores or efficiency, etc. Additionally, certain testing or credentialing authorities may implement multiple different levels of the same badge, in which users are subjected to the same test, same simulation, same monitoring processes, etc., but different scoring ranges may equate to different levels of the badge that may be earned by the user. In these scenarios, whenever badge requirements are updated, or if a new badge level is made available, it may be possible to apply the user's previously collected evidence data to the new badge requirements or badge level, rather than requiring the user to retake the test, simulation, or monitoring process. As an example, a set of new requirements for particular badge may be similar to the previous set of requirement, with the addition of a newly imposed time limit by which the test or simulated scenario must be completed. In other example, new badge requirements or badge levels may raise the minimum performance level during a test or simulation to a higher level, and/or may require additional steps or procedures during the test or simulation that were not required in the previous version of the badge requirements. In these cases, rather than require the user to retest/recertify to earn the updated badge, the platform server 1510 may provide the service of receiving the updated badge requirements or new badge levels, and automatically evaluating the new badge requirements/levels using the user's evidence data that was collected with earning the previous version of the badge. Thus, in step 1705, the requestor may be authenticated and the requested data may be validated, and in step 1705 the user's evidence data may be applied the updated testing/credentialing process. Referring to these same badge requirements changes discussed above, the evaluation in step 1706 may include automated analysis of the user's evidence data to determine whether the user complied with the newly imposed time limit, the new minimum performance level, and/or performed the additional new steps or procedures during the user's previous badge testing. If so, the badging authority may allow the user to upgrade their badge automatically without having to retake the test or simulation, etc. If not, the user may be informed that they are required to retake the test or simulation (or in some cases they may receive a lower badge level). Either way, in step 1707, the results of the evidence analysis and application to the new credentialing requirements may be output to the requestor. Another potential advantage in certain embodiments may include the protection of the user's evidence data itself. For instance, in the above example, the platform server 1510 might perform the analysis and application of the user's previously stored evidence data to the new testing requirement, without ever allowing any other entity access to the evidence data. In other examples, the platform server 1510 may perform the analysis and/or may provide the actual evidence data files to the requestor device, with the sufficient authorization from the user.

Additional aspects described herein relate to capturing and using user biometric data, physical user cues, and the like, in connection with user testing and credentialing systems, on-the-job evaluation and badging systems, and/or post-credential monitoring systems. For example, within any automated badging/certification/verification system, data identifying particular physical user cues and/or user biometric data may be collected during testing/simulation/monitoring processes and saved, for example, in a badge server along with an associated issued badge and/or the associated user. Physical user cues may include, for example, facial expressions, user reactions and/or noises made by the user during testing/simulations, user body language, eye movement, and any other user behavior or reaction detectable via cameras and external sensors. Additionally or alternatively, various types of user biometric data also may be collected during the testing, simulation, and/or monitoring processes performed on the user. Such biometric data may include, for instance, the user's temperature, heartrate, blood pressure, respiration, skin conductivity, and brainwave activity, and/or any known types of biometric data that may collected during testing, credentialing, and/or monitoring processes.

As discussed in more detail below, the user's physical cues and/or biometric data may be collected and saved within a badge server, and associated with the user, one or more particular badges, and/or with the particular testing/simulation/monitoring processes during which the data was originally detected. Once collected, the data may be used to authenticate the testing, simulation, and/or monitoring processes, to confirm the user's identity and to prevent errors or fraudulent activities by users. The data may be saved with the user's badge and/or into a separate portfolio of evidence, which may be available to the user for review, and also may be provided upon request to potential employers for review during a review or hiring process. Such evidence data also may be applied to updated badge credentialing requirements, so that in some cases a user may simply resubmit their evidence portfolio instead of being required to recertify their badge when the test or credentialing standards are updated. In certain embodiments, the user's physical cues and/or biometric data also may be analyzed to determine the user's emotional states and reactions during the testing, simulation, and/or monitoring. Additionally or alternatively, the physical cues and biometric data may be detected for several users and analyzed collectively to provide feedback regarding the badge testing processes, simulations, monitoring, physical testing environments, etc.

Figure 18A:
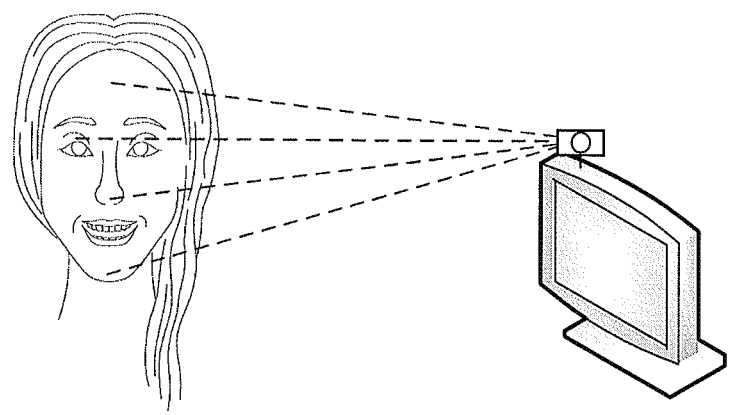
FIGS. 18A and 18B depict example facial recognition and analysis functionality that may be performed in connection with a user testing/credentialing process.
Figure 18B:
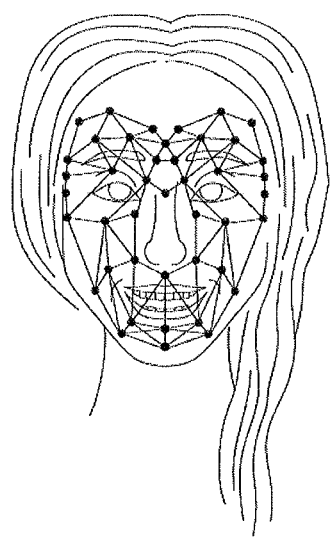

Referring now to FIGS. 18A-18B, examples are shown illustrating facial recognition and analysis functionality that may be performed in connection with a user testing/credentialing process (live or simulation), or with user on-the-job credentialing or monitoring processes. In this example, one or more cameras may be configured to capture the user's facial features and expressions at different points during the testing/credentialing/monitoring processes. For tests performed within a simulation lab-type physical testing environment, a number of designated cameras may capture not only the user's face but also the user's body from several different angles. Thus, certain physical testing environments may be capable not only of capturing facial images of the user, but also detecting detailed facial expressions at different times during the test/simulation, and potentially eye movement patterns, body language, and the like.

In other embodiments, such as for certain on-the-job credentialing or monitoring systems, or for formal testing/credentialing when sophisticated high-tech physical testing environments are not used, the physical cue data and/or biometrics data collected may be limited by the cameras and sensors available. In some cases, a laptop camera or webcam installed at the user's workstation may be use to capture facial images and/or to recognize facial expressions at different times during the testing/monitoring. However, such cameras may or may not have the resolution and image capture capabilities to perform advanced facial expression monitoring, eye movement, and/or body language detection. In other examples, such as on-the-job credentialing and monitoring scenarios, facial images might only be detectable using lower-quality security cameras or the like that are configured to monitor an entire floor or workspace. In such examples, the facial images may be still be useful for certain purposes (e.g., confirmation of user identification), but potential may be unsuitable for facial expression analysis, eye movement analysis, and the like.

Additionally or alternatively, physical testing environments (e.g., simulation labs) and/or workstation or workplace monitoring systems may include various biometric sensors configured to detect biometric data of the user at different times during the test/simulation. As noted above, such biometric data may include the user's temperature, heartrate, blood pressure, respiration, skin conductivity, and brainwave activity, and/or any known types of biometric data. Thus, the biometric metric may be detected and captured via a combination of external sensors, wearable sensors, and/or implanted sensors in some cases. For on-the-job credentialing and monitoring, mobile wearable sensors such as heartrate monitors, step trackers, and the like, may be used when more advanced wearable sensors (e.g., blood pressure, respiration, skin conductivity, brainwave activity, etc.) are not practical.

Figure 19:
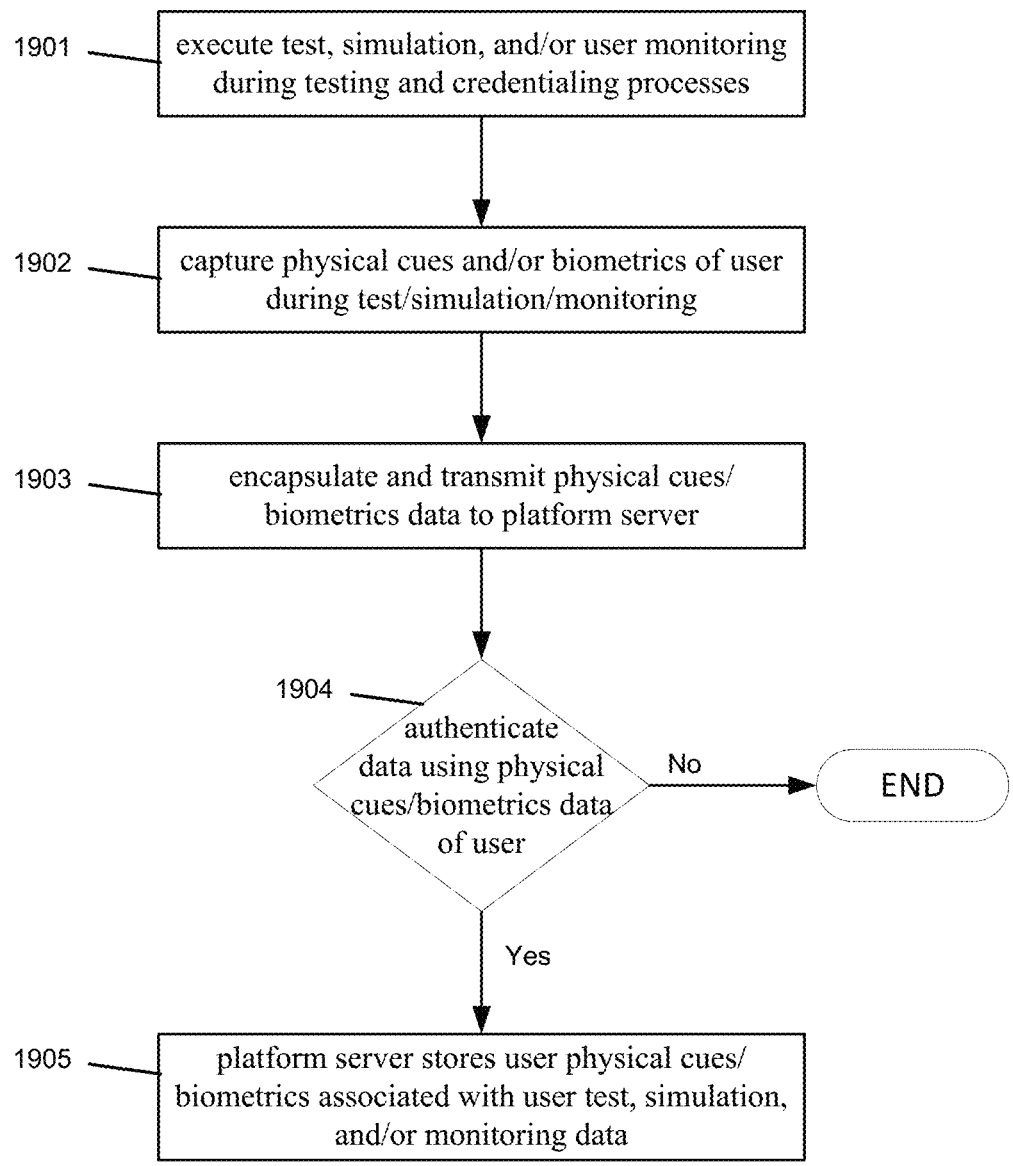
FIG. 19 is a flow diagram depicting a process of collecting physical cue data and/or biometric data for a user during user testing, credentialing, or monitoring processes.

Referring now to FIG. 19, a flow diagram is shown illustrating an express process of collecting physical cue data and/or biometric data for a user during a user testing, credentialing, or monitoring processes, and using the physical cue and biometrics to authenticate the user's identity and the associated data. The process shown in this example may be implemented within any of the testing/credentialing systems, simulators, workstation or workplace monitoring systems, and the like described herein. In step 1901, a testing, credentialing, and/or monitoring system such as those described above may execute a test, simulation, or user monitoring process for a particular user in connection with a badge that the user is seeking or has already obtained. The particular types of tests may include, for example, live simulations and/or virtual or augmented reality simulations executed within a physical testing environment 700. In other examples, the testing in step 1901 may correspond to an on-the-job credentialing system that monitors and evaluates a user's workplace tasks and activities, or to a post-credentialing user monitoring system configured to determine whether the user is using their previously issued badges. In step 1902, during any of these testing, simulation, or monitoring processes, one or more of the user monitoring devices described above, including cameras, microphones, motion sensors, tracking devices, and/or user biometrics sensors, may capture physical cues from the user and/or biometric data of the user during the testing, simulation, or monitoring processes. Such physical cues may include particular facial expressions, user reactions and/or noises made by the user during testing/simulations/monitoring, as well as user body language and eye movements. In step 1903, the physical cue and user biometric data may be encapsulated and transmitted to the the platform server 1510. In other embodiments, certain systems (e.g., 1521-1523) may retain and store user's physical cues and biometrics data locally, rather than the evidence data being stored in a central repository. Regardless of storage location, the physical cues and biometrics data of the user may be associated with particular test questions and/or particular time stamps during a testing or simulation. Additionally, when the data is transmitted, it may be compressed and edited as needed, and/or encrypted in order to assure data security and user privacy.

In some embodiments, the platform server 1510 may use the physical cues and/or biometrics data collected for the user as part of an authentication process in step 1904. For example, during any testing/credentialing process (e.g., written testing, computer-based testing, simulation lab testing, etc.) the user's facial images, physical cues, and/or biometrics may be compared against previously stored corresponding data (e.g., user images, physical cue patterns, biometrics, etc.) in order to verify that the correct user is taking the test/simulation. Additionally, the user's physical cues and biometrics may provide an additional level of authentication, by comparing the observed physical cues and biometrics at particular times during the test or simulation to expected physical cues and biometrics, based on what is happening during the test or simulation at that particular time. For instance, a simulation may be designed to present a challenging and stressful situation to the user at a particular timestamp or within a sequence of tasks the user is performed. In step 1904, the server may compare the user's observed physical cues and biometrics to the physical cues and biometrics that would be expected for the challenging and stressful situation, in order to confirm that the data is valid and/or that the user did not expect this situation in advance (e.g., indicating cheating). In step 1905, the platform serving 1510 having validated the user's identity and the authenticity of the user's physical cues and biometrics, may store the testing, credentialing, monitoring data in the digital credential data store as valid data. In some embodiments, the image data, facial cues, and/or biometrics data also may be retained and stored by the platform server for future analysis.

In some embodiments, the data relating to the user's physical cues and biometrics collected during a test, simulation, or during on-the-job monitoring, may be further evaluated to identify the user's emotional states at different times. For instance, certain simulations may be specifically designed to invoke certain emotional states (e.g., anger, boredom, frustration, surprise, etc.), and the user's level of performance while experiencing those emotional states may be particularly important for certain testing/credentialing processes. Thus, the data collected during the test, simulation, or monitoring in step 1901 may be used not only for user identification/authentication, but also may be analyzed to (1) determine the user's emotional state at different times during the test, simulation, or monitoring, (2) compare that emotional state to an expected emotional state based on what the user is experiencing, and (3) evaluate the user's reactions, levels of skills performance during different emotional states.

Additionally, in some embodiments, the physical cues, biometrics data, and/or emotional states detected for multiple users may be aggregated for the same tests, simulations, monitoring environments, etc. The aggregated data for tests may be used to revise current tests and simulations, design new tests and simulations, and for training users how to respond to particular scenarios and situations (e.g., workplace accidents).

As described above, badging and/or credentialing systems may be used for the creation, validation, tracking and usage of badges earned by users. Badges may correspond to professional certifications, verification of skills and abilities, and the like. Additionally, certain aspects of the disclosure relate to badges/credentials that may be earned by and issued to users based on the detection of specific personality traits within the users, and/or for combinations of personality traits, etc. In some embodiments, in order to determine personality traits and award badges, credentialing systems may analyze the user's existing data (e.g., social graph, profile, language used in emails, etc.). In other embodiments, specific personality tests may be administered (e.g., using a written testing environment, simulation lab or other physical environment, and/or on-the-job monitoring processes). For example, users may take a test/simulation within a specially-designed virtual reality or augmented reality simulation environment, in order to identify specific personality traits of the user. Such personality traits may include, for example, self-consciousness, curiosity, modesty, achievement-oriented, optimistic, etc., each of which may be tested separately and quantified based on the user's test scores/simulation performance. In various embodiments, potential uses may include optimal team-building by employers, by matching and complementing personality traits of different team members with each other and with supervisors.

Figure 20:
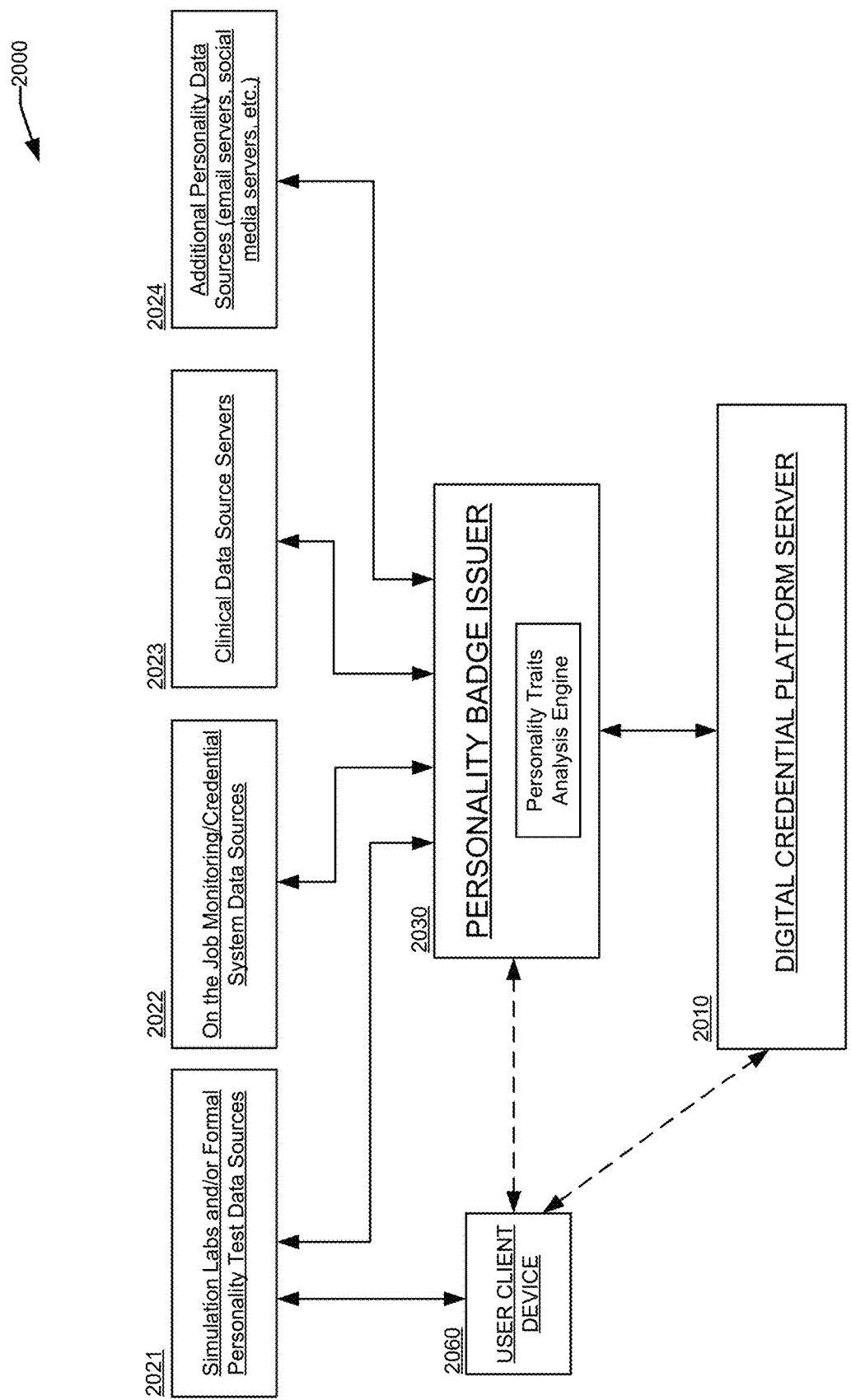
FIG. 20 is a diagram illustrating an example computing environment including a digital credential platform server in communication with a personality badge issuer.

Referring now to FIG. 20, an example computing environment 2000 is shown, including a digital credential platform server 2010, in communication with a personality badge issuer 2030. In some examples, the digital credential platform server 2010 may be a badging server similar or identical to the server 610 discussed above. Thus, server 2010 may be configured as a badge repository and credentialing system, acting as a clearinghouse for badge owners, issuers, earners, endorsers, etc. Server 2010 may include a digital credential (or badge) data store configured to store badging information such as the details of the particular badges earned by particular users. As noted above, such details may identify the badge issuer and/or other testing/credential authorities responsible for administering testing or simulation scenarios as part of the badging process, and/or for pre-badge or post-badge monitoring of workstations/workplaces to detect and analyze user tasks performance and user skills/abilities.

In this example, the badge server 2010 may be configured to support personality-based badges using the same or similar infrastructure as regular education-based badges, skills-based badges, and professional credentials, etc. Thus, one or more personality badges issuers 2030, along with personality badge owners which may be the same as badges issuers 2030 or may be separate entities, may be configured to determine user eligibility for personality badges and to issue personality badges. In some cases, a user may interact directly with a personality badge owner and/or badge issuer 2030, via a client device 2060, to request (or apply for) a particular personality badge. In other cases, the process of issuing a personality-based badge to a user may be initiated by a different entity, such as an authorized individual at the user's school (e.g., a teacher or counselor), a medical professional (e.g., the user's doctor or therapist, etc.), or the user's employer, etc. In various embodiments, personality-based badges may be "earned" by users that qualify for the badge, based on the results of personality tests and/or analysis of other personality data. Examples of potential types of personality-based badges that may be supported by the system 2000 include, for instance, conscientiousness, curiosity, modesty, achievement-oriented, optimism, integrity, honesty, loyalty, responsibility, humility, compassion, fairness, courageousness, self-awareness, generosity, perseverance, politeness, kindness, lovingness, reliability, and self-disciplined, among others. Further, for each different personality trait, badges may be earned for the personality trait or its opposite (e.g., honesty or deceitfulness, etc.), for any combination of traits, and badges also may be earned for different levels of these personality traits (e.g., classified into low/medium/high levels, or quantified onto a scale 1-10 or 1-100, or as a percentile of the general population, etc.).

As shown in this example, in order to determine when a user is eligible for or has earned a personality-based badge, the badge issuer 2030 may receive personality-related data for a user from a variety of data sources, including a formal testing data sources 2021, on-the-job monitoring and/or credentialing systems 2022, external clinical data sources 2023, and other external data sources 2024 that may store personality-related information. Formal testing data sources 2021 may include, for instance, educational facilities, testing centers and/or secure websites configured to administer personality tests to users. In some embodiments, formal testing location 2021 may include a simulation lab physical environment with live and/or simulated tests (e.g., virtual reality, augmented reality, etc.) designed to measure particular personality traits of the user. In some cases, a user may interact directly with a formal testing data source 2021 via a client device 2060. On-the-job monitoring and/or credentialing systems 2022 may include similar or identical systems to those described above, which may monitor and evaluate the user's actions while working, studying, and/or during normal daily interactions. External clinical data sources 2023 may include doctor's offices, therapists, etc., which may provide (when authorized, and transmitted securely) previous clinical diagnoses of the user. Finally, the additional data sources 2024 may include any other data source with relevant personality-related data may be retrieved and analyzed to identify personality traits of the user with a sufficiently high degree of confidence. For instance, additional data sources 2024 may include email servers and documents stores from which the user's documents and emails may be retrieved and analyzed to determined communication styles and personality traits. Data sources 2024 also may include financial servers (e.g., to obtain the user's bank statements), educational record servers (e.g., to obtain the user's grades, transcripts, disciplinary issues), governmental servers (e.g., to obtain the user's criminal record, etc.), all of which may be analyzed in conjunction with the other data sources 2021-2024 to identify personality traits of the user.

Personality-based badges issued by the issuer 2030 may be stored within the badge platform server 2010, where they may be stored with and/or associated with the particular user and the user's portfolio of other badges. The server 2010 also may be configured to track the valid time and/or expiration date of personality-based badges, which may be performed different than skills-based badges and the like. For instance, in some embodiments, an education-based badge for the completion of a class, or a skills-based badge for demonstration of the skill may be assigned expiration dates after which the user may be required to retest or recertify to prove that the user's knowledge or skill is current. In contrast, while certain personality-based badges might expire in a similar manner after a time threshold, other types of personality-based badges may be maintained indefinitely until some affirmatively proofs that the personality-based badge is no longer applicable to the user. For instance, a user who has "earned" a negative personality-based badge cannot simply wait for the negative badge to expire, but may have to affirmatively retest to prove that the negative badge should be removed. Finally, platform server 2010 may be configured to receive and process requests from different entities for a user's personality-based badges, and thus may authenticate such requests to protect the security and confidentiality of personality-based badges.

Figure 21:
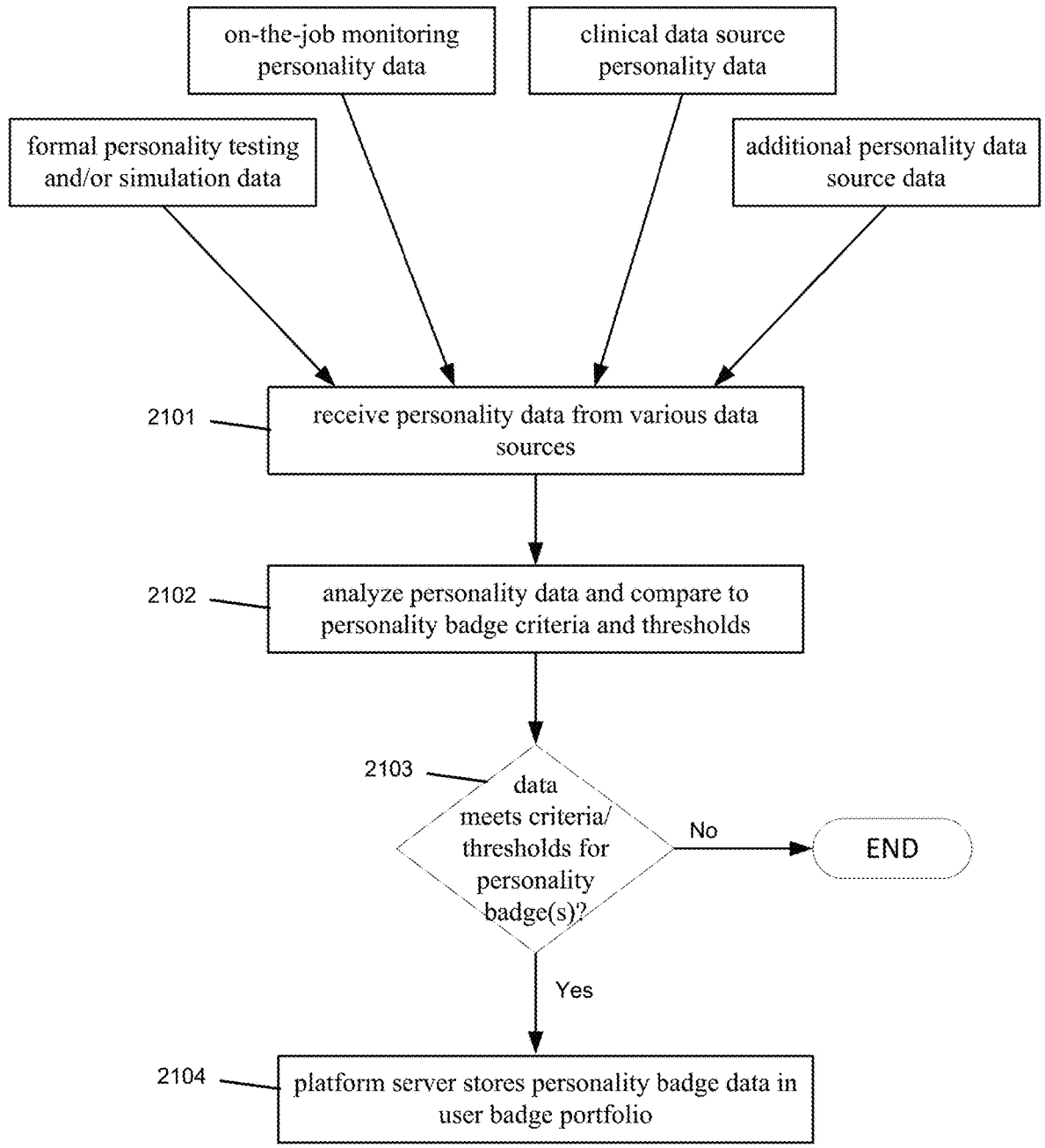
FIG. 21 is a flow diagram illustrating an example process by which a badge issuer may receive personality data relating to a user and may issue personality-based digital credentials or badges to the user.

Referring now to FIG. 21, an example flow diagram is shown illustrating an example process by which a badge issuer 2030 may receive personality data relating to a user and may issue personality-based based to the user. In step 2101, in response to a request from a particular user or a related entity (e.g., teacher, employer, doctor, etc.), a badge issuer system 2030 may retrieve personality data from one or more available data sources 2021-2024. As noted above, the personality-related data retrieved in step 2101 may include clinical assessments of the user transmitted securely from a doctor, counselor, therapist, etc., as well as formal personality test document, personality simulation (e.g., live, VR, or AR), on-the-job or live user tracking and monitoring data, and/or data from other data sources such as the user's emails, documents, social media and/or web activities, etc. In step 2102, the badge issuer may analyze the received personality and evaluate the user with respect to a plurality of different personality traits and/or combination of traits to determine if the user is eligible for one or more personality-based badges. In various embodiments, step 2102 may include a variety of algorithms to analyze and score personality data, and comparisons of the personality scores to different thresholds. In step 2103, if the user's personality data meets the criteria for one or more personality-related badges (2103:Yes), then in step 2104 the badge issuer may issue the badges to the user and (upon acceptance from the user) transmit the badge data to the platform server 2010 for storage in the user's badge portfolio.

Figure 22:
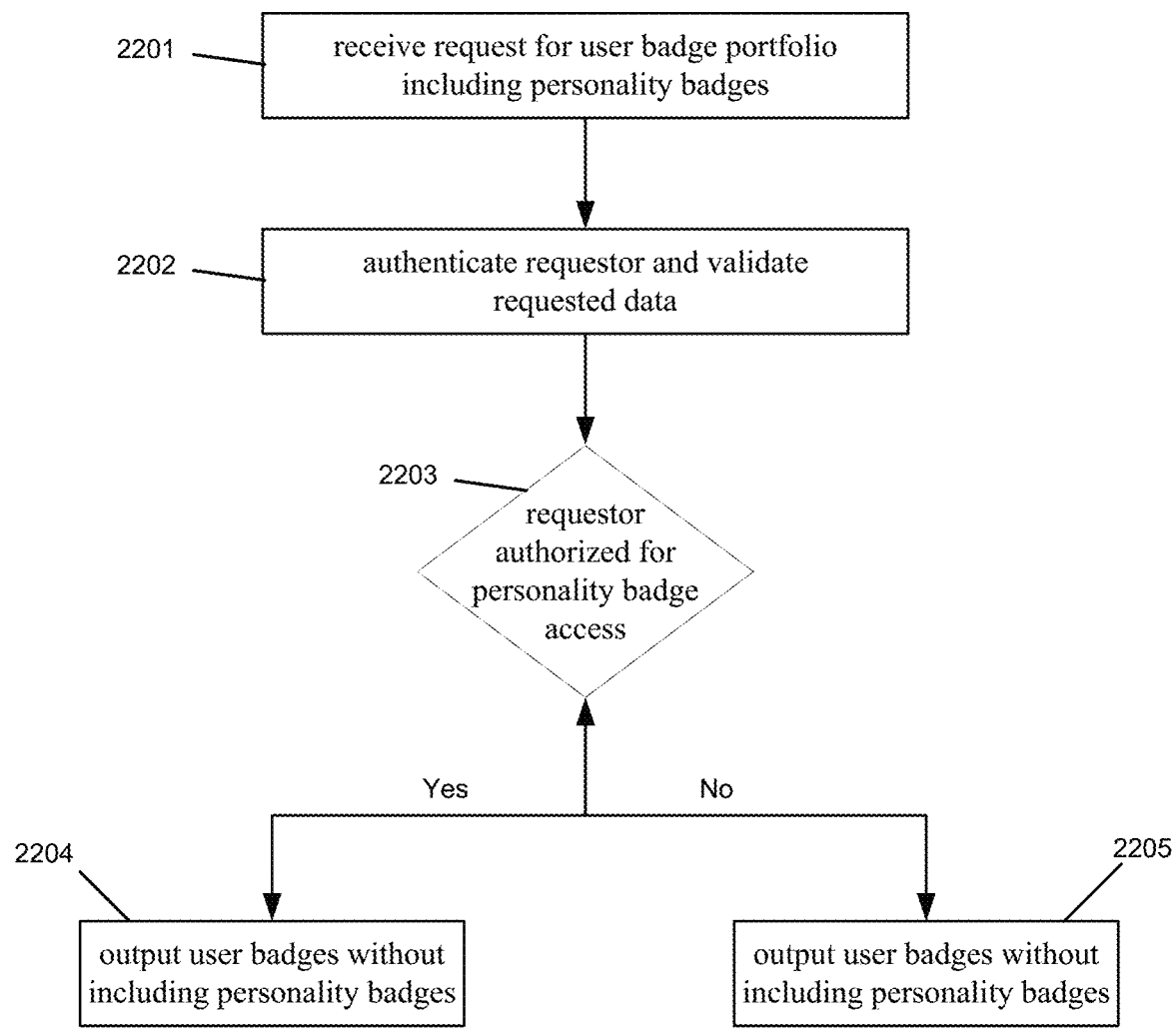
FIG. 22 is a flow diagram illustrating an example process by which a badge platform server may receive and serve requests for personality-badge data for specified users.

Referring now to FIG. 22, another flow diagram is shown illustrating an example process by which a badge platform server 2010 may receive and serve requests for personality-badge data for specified users. For instance, in step 2201, the platform server 2010 may receive a request for some or all of the user's badge portfolio, or specifically for the user's personality badges. In step 2202, the platform server 2010 may perform authorization/authentication techniques on the request to determine whether the requestor is authorized to access the user's personality-based badges. In some embodiments, authorization to retrieve/view the user's personality badges may require explicit authorization from the user himself or herself, in order to prevent any unwanted parties from accessing the user's confidential personality data. Thus, step 2202 may include verifying the requestor's identity or role and comparing to an access control list or other permissions data associated with the user's personality badges. In some cases, step 2202 may include a real-time request sent by the platform server 2010 to a client device 2060 associated with the user, to allow the user the option to allow or reject the request. Additionally, the request in step 2201 may specify one or more particular users and/or one or more particular badges to be retrieved, and thus authorization in step 2202 may be granted or denied separately for each particular users and/or badges. In step 2203, if the requestor has been granted access to the requested personality badge data of the user (2203:Yes), the platform server 2010 may retrieve and output the requested personality badge data to the requestor. In other cases, if the request is step 2201 is not authorized (2203:No), then the platform server 2010 may deny the request and no provide any request personality badge data to the requestor.

In some examples, the request in step 2201 may be from the user himself/herself, who wants to review his/her current personality-based badges, personality test results, and/or other personality-related data (e.g., document-based data, simulations, monitoring data, etc.). In other examples, the request in step 2201 may be from a current or potential employer, who has been authorized by the user to retrieve and view the user's personality-based badges as part of a hiring process or review process. The user's personality-based badge data may verify to the employer or potential employer particular personality traits that the user has or does not have, and also may allow the employer or potential employer to review the user's behaviors, responses, reactions, etc., during personality simulations, monitoring, etc. In still other examples, the user may authorize a badge issuer or badge owner to review the user's personality-based badges, for badges issued and owned by those entities. Finally, users may make some or all of their personality-based badge data publicly available (e.g., on a file-by-file basis) and/or may actively post their personality badges within a social media page and/or a digital credential profile page of the user that is maintained and published by the platform server 2010.

In accordance with certain aspects described herein, badges/credentials may be earned by and issued to users for specific DNA traits and/or health-based traits, or combinations of traits. In such embodiments, DNA-based and health-based badges may be determined, issued, and stored using the same or similar infrastructure as education-based badges, skills-based badges, professional credential badges, and/or personality-based badges, described above. Examples of health-based badges may include, for instance, a badge for low blood pressure, low resting heart rate, low BMI, a threshold number of steps-per-day, a high level of general fitness, nutrition and diet-based badges, and/or a variety of different exercise achievements or milestones, etc. Examples of DNA-based badges may include, for example, a badges corresponding to a high likelihood of longevity, low risk of certain diseases, carrier (or not a carrier) of certain inherited conditions, etc.

In some embodiments, Applicants to certain jobs or workers in certain careers may be required to have certain health-based and/or DNA-based badges, or may choose to earn these badges voluntarily to add them to their badge portfolio. Although such data might not be relevant for many jobs, it may be used for certain specialized or critical positions (e.g., a company CEO, president or high-ranking military, sperm/egg donor, etc.), where data such as an unlikelihood of longevity, or the probability of developing Alzhemer's or Parkinson's Disease, carriers of certain inherited conditions, and like, may be relevant. Additionally, many users may wish to obtain and/or display these badges voluntarily.

Figure 23:
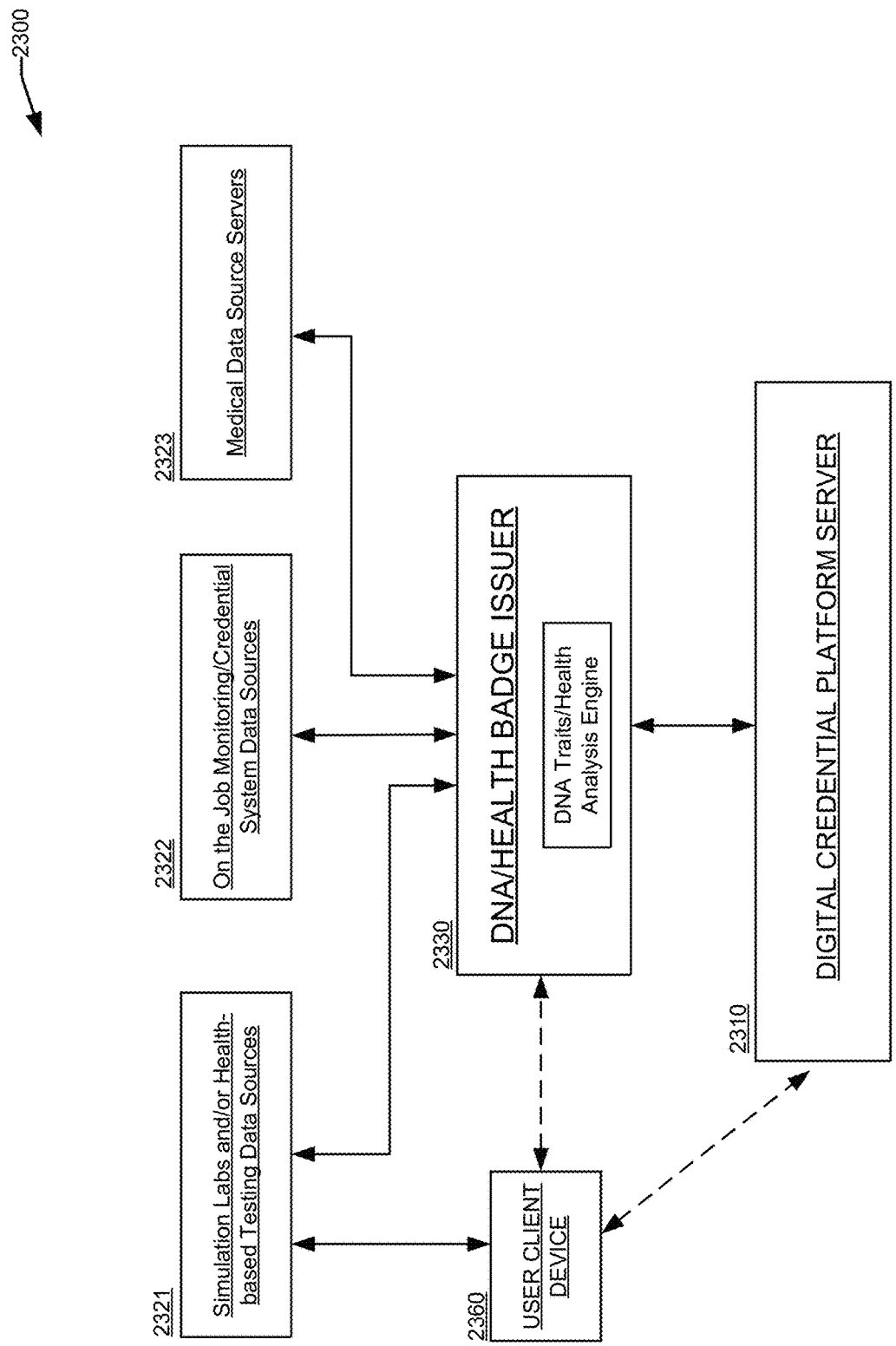
FIG. 23 is a diagram illustrating an example computing environment including a digital credential platform server in communication with a DNA-based or health-based badge issuer.

Referring now to FIG. 23, an example computing environment 2300 is shown, including a digital credential platform server 2310, in communication with a DNA-based or health-based badge issuer 2330. In some examples, badging digital credential platform server 2310 may be a badging server similar or identical to the server 610 discussed above. Thus, server 2310 may be configured as a badge repository and credentialing system, acting as a clearinghouse for badge owners, issuers, earners, endorsers, etc. Server 2310 may include a digital credential (or badge) data store configured to store badging information such as the details of the particular badges earned by particular users. As noted above, such details may identify the badge issuer and/or other testing/credential authorities responsible for administering testing or simulation scenarios as part of the badging process, and/or for pre-badge or post-badge monitoring of workstations/workplaces to detect and analyze user tasks performance and user skills/abilities.

In this example, the badge server 2310 may be configured to support DNA-based badges and/or health-based and fitness-based badges using the same or similar infrastructure as regular education-based badges, skills-based badges, and professional credentials, personality badges etc. Thus, one or more DNA/Health badges issuers 2330, along with DNA/health badge owners which may be the same as badges issuers 2330 or may be separate entities, may be configured to determine user eligibility for DNA-based and health or fitness-based badges, and to issue these badges. In some cases, a user may interact directly with a health or DNA-based badge owner and/or badge issuer 2330, via a client device 2360, to request (or apply for) a particular DNA badge or health/fitness badge. In other cases, the process of issuing a DNA or health/fitness badge to a user may be initiated by a different entity, such as an authorized individual at the user's school (e.g., a teacher or counselor), a medical professional (e.g., the user's doctor or therapist, etc.), or the user's employer, etc. In various embodiments, DNA-based badges and health or fitness-based badges may be "earned" by users that qualify for the badge, based on the results of medical exams, DNA tests/analyses, health and fitness data (e.g., surveys, test results, simulations, monitoring/tracking, etc.). Examples of potential types of DNA-based badges that may be supported by the system 2300 include, for instance, badges for a high likelihood of longevity, low risk of certain diseases, carrier (or not a carrier) of certain inherited conditions, presence or absences of certain genes. Examples of potential types of health-based or fitness based badges, that may be supported by the system 2300 include, for instance, badges for low blood pressure low cholesterol, low resting heart rate, low BMI, walking/running a threshold number of steps-per-day, consuming over or under a threshold number of calories per day, different milestones for general levels of fitness, different exercise-based achievements, and/or any nutrition-based or diet-based badges. For each different type of DNA-based characteristic and/or health or fitness characteristic, badges may be earned for the characteristic or (e.g., carrier or not a carrier, etc.), for any combination of characteristics, and badges also may be earned for different levels of these characteristics (e.g., classified into low/medium/high levels, or quantified onto a scale 1-10 or 1-100, or as a percentile of the general population, etc.).

As shown in this example, in order to determine when a user is eligible for or has earned a DNA-based or health or fitness-based badge, the badge issuer 2330 may receive DNA data and/or health or fitness data for a user from a variety of data sources, including testing data sources 2321, on-the-job monitoring and/or credentialing systems 2322, and/or medical data sources 2323. Formal testing data sources 2321 may include, for instance, educational facilities, doctor's offices, testing centers, and the like, that are configured to administer DNA tests or health/fitness tests to users. In some embodiments, a testing location 2321 may include a simulation lab physical environment with live and/or simulated tests health and fitness tests (e.g., virtual reality, augmented reality, etc.). On-the-job monitoring and/or credentialing systems 2322 may include similar or identical systems to those described above, which may monitor and evaluate the user's actions while working, studying, and/or during normal daily interactions. Such sources 2322 may provide movement data, step tracking data, etc. Medical data sources 2323 may include doctor's offices, DNA test labs, etc., which may provide (when authorized, and transmitted securely) DNA results and/or medical diagnoses of the user.

DNA-based badges, as well as health-based, fitness-based, diet-based badges, etc., issued by the issuer 2330 may be stored within the badge platform server 2310, where they may be stored with and/or associated with the particular user and the user's portfolio of other badges. The server 2310 also may be configured to track the valid time and/or expiration date of these badges, using similar or identical techniques to those described above. Finally, platform server 2310 may be configured to receive and process requests from different entities for a user's CNA-based badges and/or health or fitness-based badges, and thus may authenticate such requests to protect the security and confidentiality of these badges. Thus, computing environment 2300 may support various processes by which the badge issuer 2330 may receive user DNA data, user health and fitness data, etc., and may issue DNA badges and/or health/fitness badges to the user, using similar or identical techniques to those described above for issuing personality badges in FIG. 21. Additionally, computing environment 2300 may support various processes by which the badge platform server 2310 may receive and serve requests for DNA badges and/or health-fitness badges for specified users, using similar or identical techniques to those described above for issuing personality badges in FIG. 22.

Additional aspects described herein relate to certification, verification, and security pf badges issued by different badge issuers. In order to address the problem of too many badges which are from anonymous/unverified badge owners and issuers, a central certification platform or service may be created to register badges, and to analyze and verify skills associated with different badges. Thus, an unknown and anonymous badge issuer could not simply be able to issue new badges claiming to be quality certification of skills A, B, C. Rather, the certification platform/service may verify non-subjectively that badges correspond to the skills that they purport to test.

Figure 24:
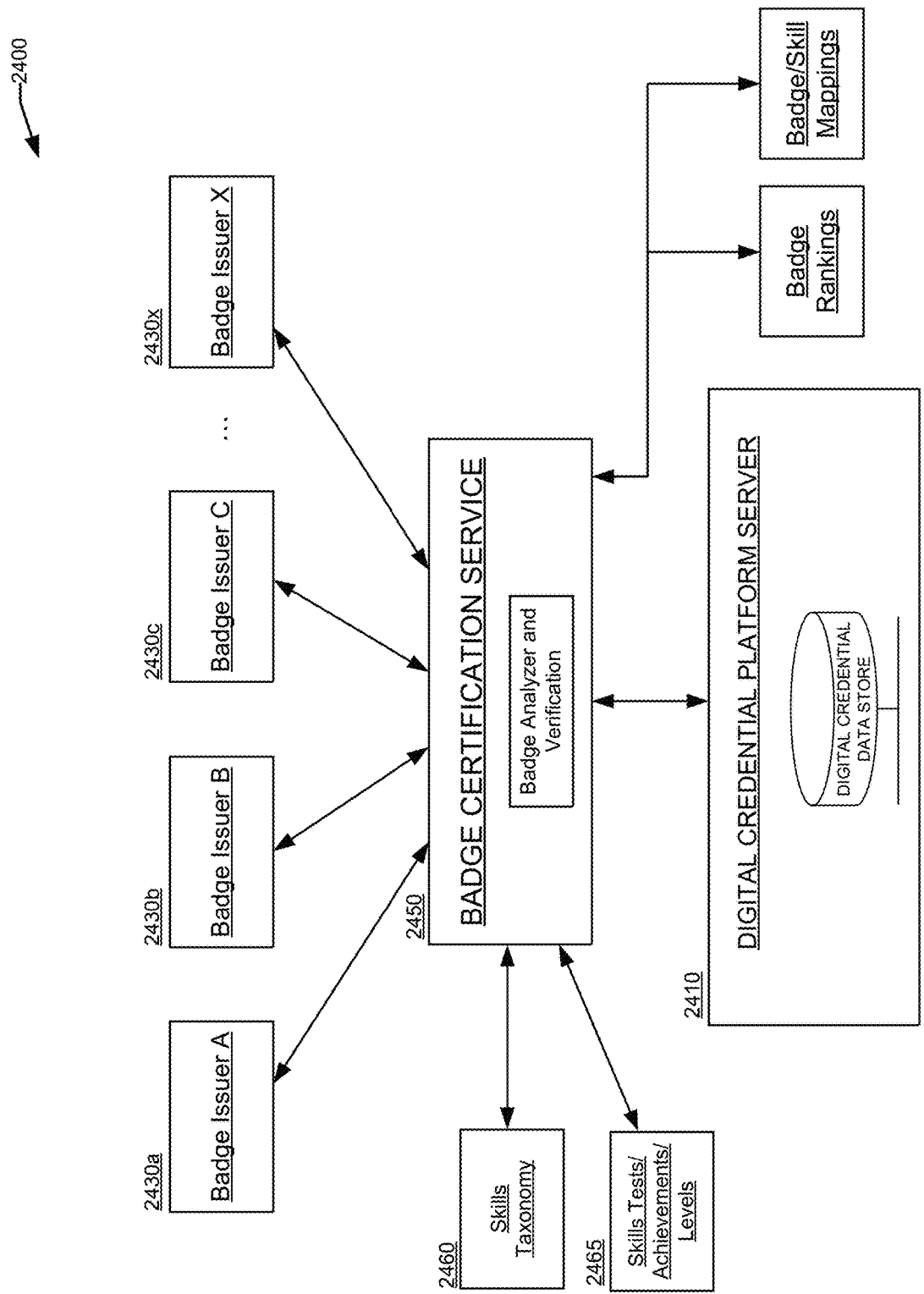
FIG. 24 is a diagram illustrating an example computing environment including a digital credential platform server, a badge certification service, and multiple badge issuers.

Referring now to FIG. 24, an example computing environment is shown including a digital credential platform server 2410, a badge certification service 2450, and multiple badge issuers 2430a-x. In this example, the badge certification service 2450 may receive and analyze badge-related data, such as the badge qualifications, from each badge issuer 2430, in order to certify the badge before allowing each badge to be stored in the platform server 2410. In some cases, the badge certification service 2450 may use a universal taxonomy of skills 2460 and corresponding skills tests, achievements, and levels 2465, in order to evaluate the qualifications of each badge. These badge qualifications may be mapped to different nodes of the skills taxonomy 2460, and may be compared to the baseline tests, achievements, and levels for that skill in database 2465. Thus, database 2460 and/or 2465 may include an objective set of testable skills or other metrics that may be used to evaluate badges, rather than just trusting the badge issuer 2430 that a particular badge is a good indicator of the skills listed within the badge.

Figure 25:
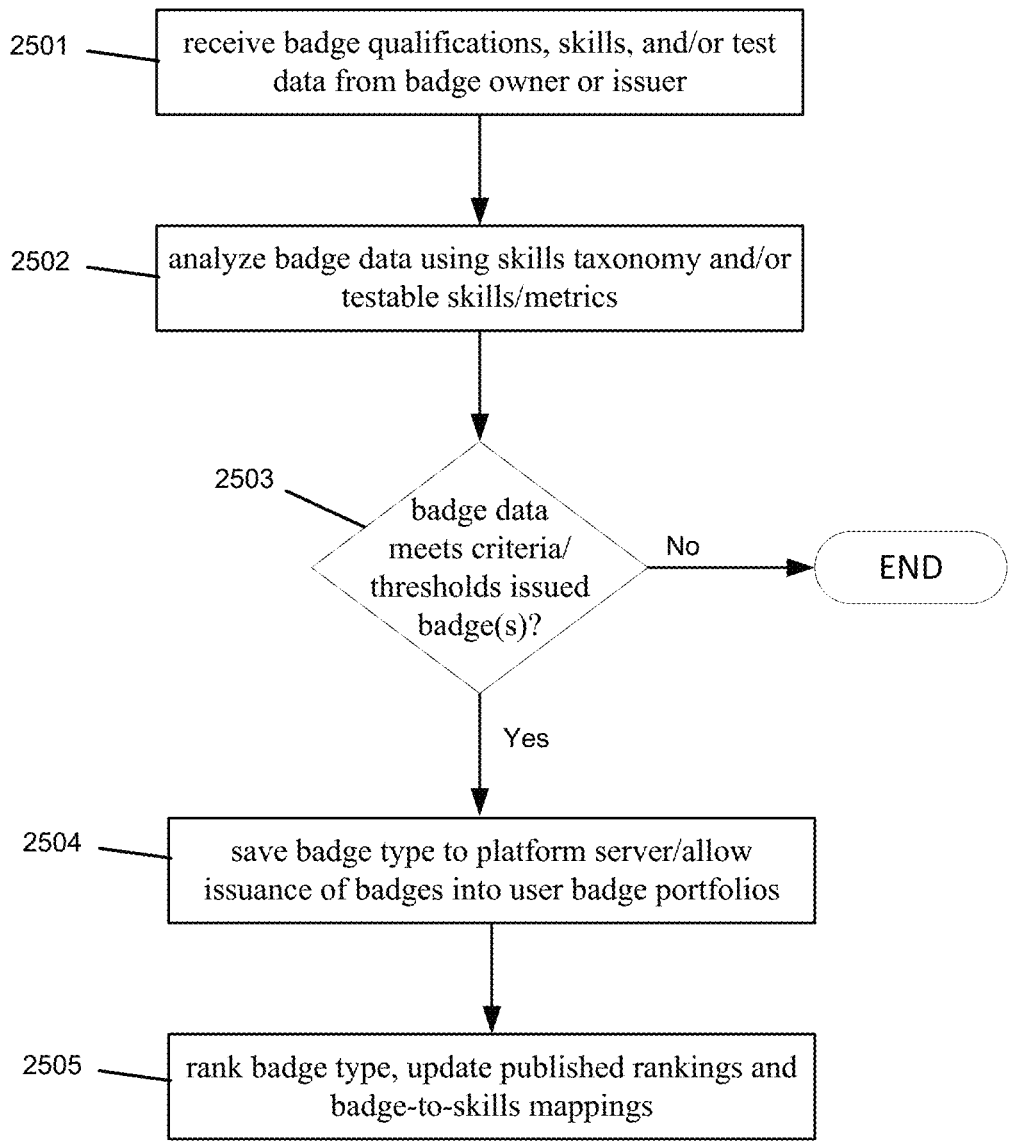
FIG. 25 is a flow diagram illustrating a process for certifying and registering badges within a badging platform, and verifying the associated skills of a badge.

Referring now to FIG. 25, a flow diagram is shown illustrating a process for certifying and registering badges within a badging platform, and verifying the associated skills of a badge. In step 2501, the badge certification service 2450 may receive new badge type data from a badge issuer. The badge type data may include the description and skills of the new badge type that the badge issuer 2430 plans to be begin issuing to users. In some embodiments, the badge type data may include the specific qualifications and tests that will be required for users to obtain the badge, include written tests, simulation descriptions and/or software, on-the-job monitoring software and criteria, and any other qualifications of the new badge. In step 2502, the badge certification service 2450 may analyze the new badge type data, description, purported skills, qualifications, etc., in order to determine whether or not the badge type will be supported by the platform server 2410. In some cases, the service 2450 may use software, one or more artificial intelligence (AI) systems, and/or human testing of the badging qualifications and/or processes of a new badge from a badge issuer 2430, so that badge issuers cannot list skills associated with a new badge type unless each of those skills has been verified. Additionally, in some cases, the analysis in step 2502 may depend on endorsement data, user feedback data, and/or statistical data associated with badge earners (e.g., hiring rates for badge earners, income change based on badge earning, etc.). In step 2503, if badge certification service 2450 determines that the badge qualifications/processes from the badge issuer to not meet minimum basic skills thresholds for the purported skills (2503:No), then the service 2450 may not permit the new badge type from the issuer 2430. However, if the analysis of the badge qualifications and processes determines that the new badge type does meet the necessary skills thresholds for the purported skills (2503:Yes), then the service 2450 may import the new badge type into the platform server 2410, and allow new badges of the type to be issued to users in step 2504. Additionally, data from these analyses in step 2502-2503 also may be used to produce a mapping of badges to skills (and vice versa), badge issuers to skills (and vice versa), and to rank the quality of badges, badge owners, and badge issuers. Thus, in step 2505, based on the analysis of the badge processes and qualifications, the badge certification service 2450 may add the newly certified/registered badge to published lists of badge ranking and badge-to-skill mappings, that may be searchable to potential badge earners and others interested in verifying the legitimacy and qualify of particular badges.

In certain embodiments, the various badging and/or digital credentialing systems described herein may be implemented using blockchain technology rather than using a central data store to store badges/digital credentials. For example, a distributed network of badge owners, badge issuers, badge earners, and others may collaborate via a badging network to verify and maintain a badge blockchain, in which each earned/issued badge is represented as a single block in the block in the blockchain.

Figure 26:
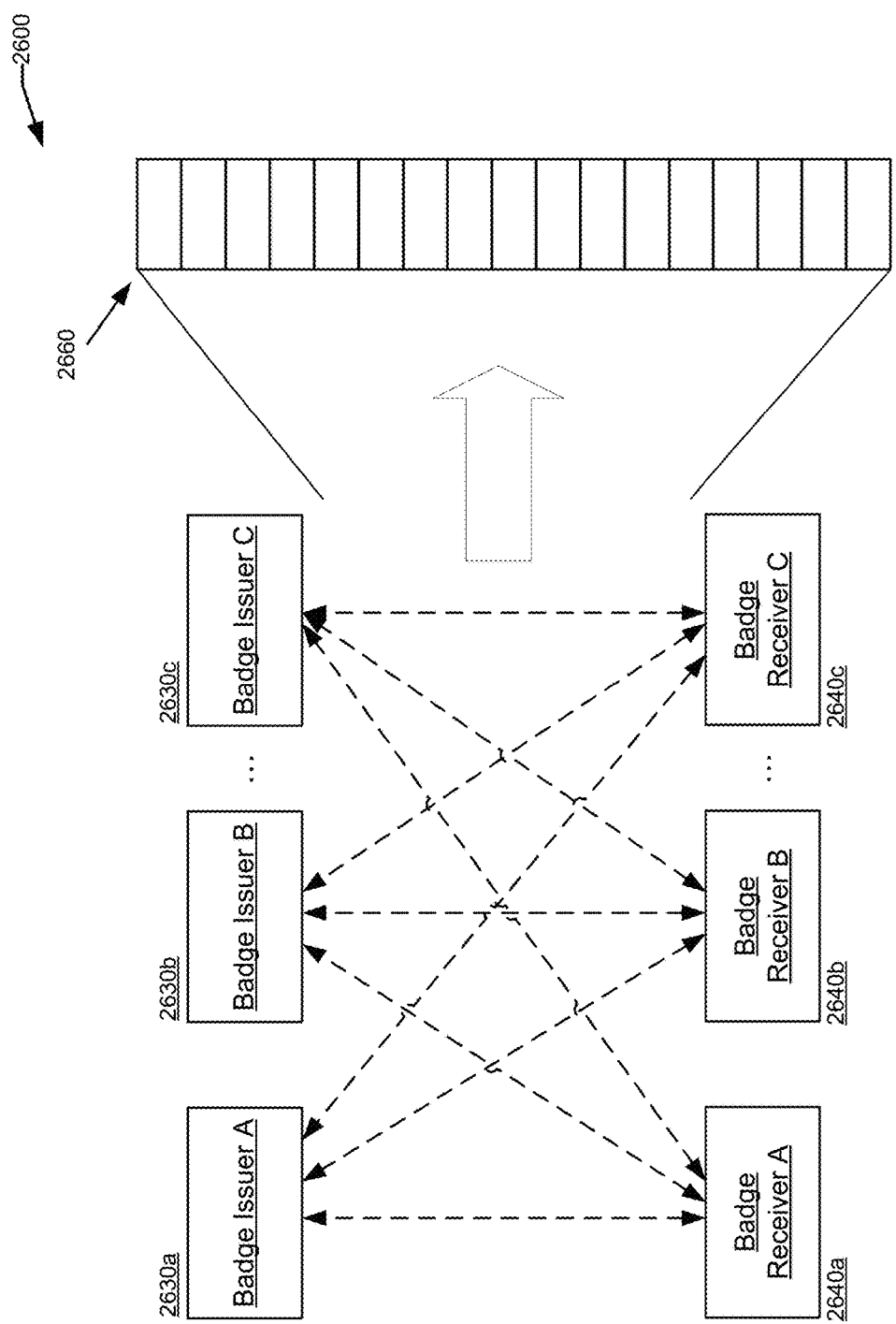
FIG. 26 is a diagram illustrating an example computing environment implemented to create and manage a blockchain record of issued badges.

For example, referring now to FIG. 26, an example computer network 2600 is shown implemented to create and manage a blockchain record of issued badges. As shown in this example, the network 2600 may include a plurality of badge issuers 2630 and a plurality of badge receivers 2640. In other cases, additional participating entities within the network 2600 may include badge owners and badge endorsers, as well as other client devices and related entities such as individual user clients, systems associates with schools or educational institutions (who may access the blockchain to add and track the badges of their associated students), and systems associated associates with employers or other organizations (who may access the blockchain to add and track the badges of their associated employees/members), and the like.

As shown in this example, the issued badge data within the blockchain may be distributed across the network nodes 2630 and 2640, without having any central data store storing the badge issuance data and without having multiple copies of the data. The issued badge data stored within the blockchain 2660 may exist as a shared and continually reconciled database distributed across the network nodes 2630 and 2640. Thus, the blockchain 2660 storing issued badges need not be stored in any single location, and the badge records it keeps are publically available to all, and easily verifiable. Further, because no centralized version of the issued badge data exists, there is no location to for hacker to compromise or corrupt. That is, the blockchain 2660 of issued badges is not controlled by any single entity (e.g., there is no digital credential platform server 610 necessary) and has no single point of failure.

Although only a few badge issuer computers 2630 and badge earner computers are shown in this example, it should be understood that that thousands or even millions of badge issuers 2630 and/or badge earner 2640 may be included as network nodes in some embodiments. The network 2600 may reconcile in N minute intervals, so that each network node will effectively check-in with the others and record the latest transactions (e.g., issued badges) periodically. Each node computer 2630 and/or 2640 connected to the blockchain network 2600 may use a client that performs the task of validating and relaying badge issuance transactions, and retrieves periodic updates of the blockchain 2660, which may be automatically downloaded initially whenever a new node computer 2630 and/or 2640 joins the blockchain network 2600.

The security of the blockchain 2660 may use encryption technology, including public and private keys based on the addresses of the node computer 2630 and/or 2640 within the blockchain network 2600. A particular node may use its private key to store an issued/earned badge onto the blockchain 2660, and it will be recorded as belonging to that particular node.

Figure 27:
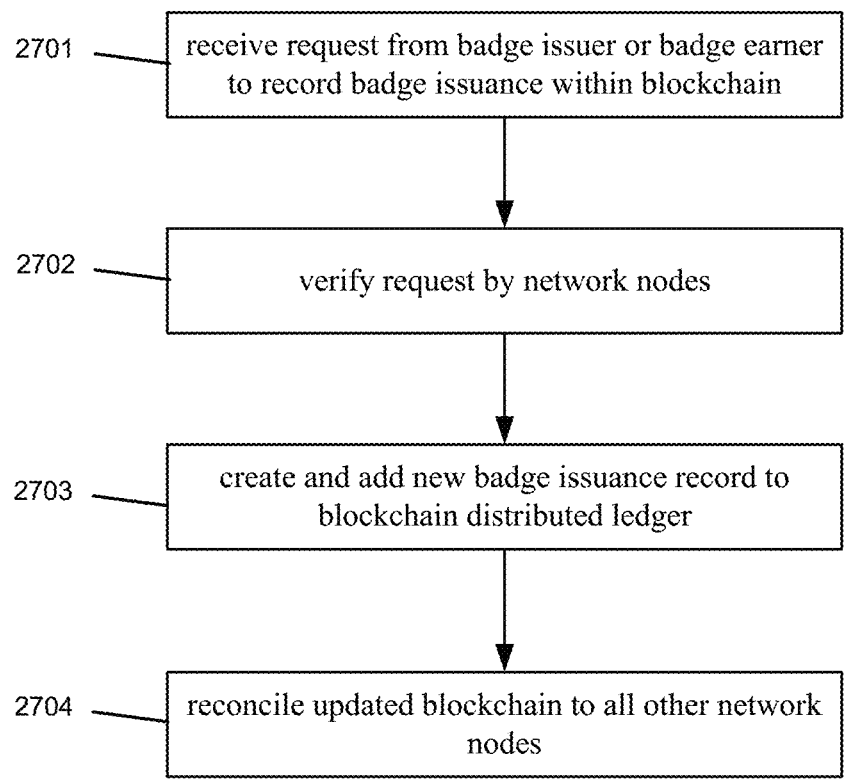
FIG. 27 is a flow diagram illustrating a process for adding new badges to a blockchain database and reconciling the updated blockchain to other network nodes.

Referring now to FIG. 27, a flow diagram is shown illustrating a process for adding new badges to a blockchain database 2660 and reconciling the updated blockchain to other network nodes. In step 2701, an individual node computer within the blockchain network 2600, such as badge issuer 2630 or badge earner 2640, may record the existence of a new badge issued by a particular issuer to a particular earner. In step 2702, the blockchain network 2600 may verify the transaction request, not through a central authority, but on a decentralized user-to-user basis, based on the private key of the requesting node. In step 2703, the requesting node may create the new issued badge instance and add the new badge issuance data onto the distributed ledge of the blockchain database 2660. Then, in step 2704, in accordance with the blockchain reconciliation schedule, the updates to the blockchain database 2660 may be provided to each of the blockchain nodes 2630 and/or 2640, so that these nodes may update their individual ledger.

Certain aspects of the disclosure include implementing a gradual badge degradation process, rather than a simple binary badge status (i.e., expired or not expired). For instance, after Badge ABC is issued to a user (e.g., badge certifying the user's level of achievement or mastery in the corresponding ABC skills), the user's skills in this area may begin to degrade if they are not used regularly. As discussed above, badges may have expiration dates for this reason, so that a user must periodically retest/recertify to update their badge, or must demonstrate in some other way that the user's badge skills remain current (e.g., on the job monitoring/credentialing system). However, in some embodiments, rather than implementing a simple expiration date to represent the current status of a badge, a badge-specific "half-live" corresponding to a badge skill degradation function may be used to determine a current badge status level or strength. As discussed below, such half-lives may be different for different types of badges, as different degradation functions may be used, and thus some badges may degrade slower than others or in a different degradation pattern than others. Additionally, some badges might never degrade or might degrade only very slowly.

Figure 28A:
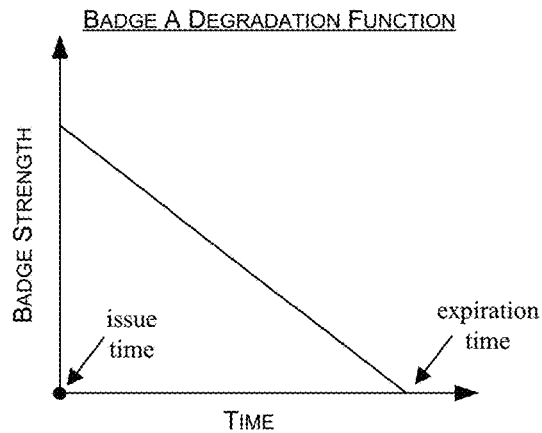
FIGS. 28A-28F depict example charts representing different degradation functions for a badge.
Figure 28B:
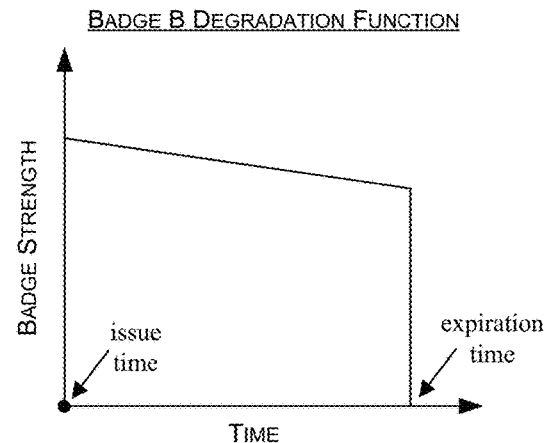
Figure 28C:
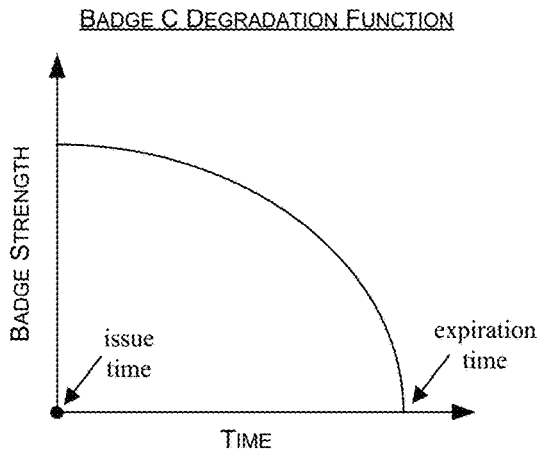
Figure 28D:
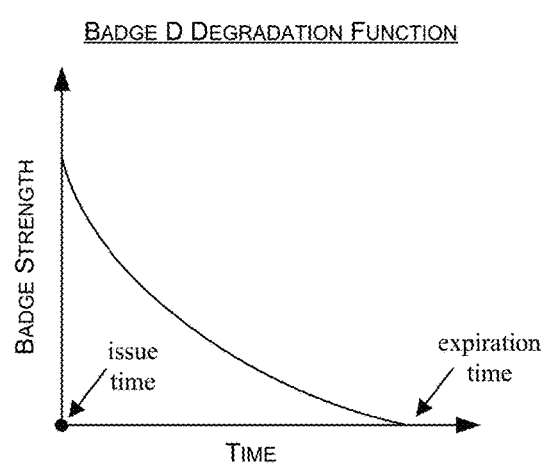
Figure 28E:
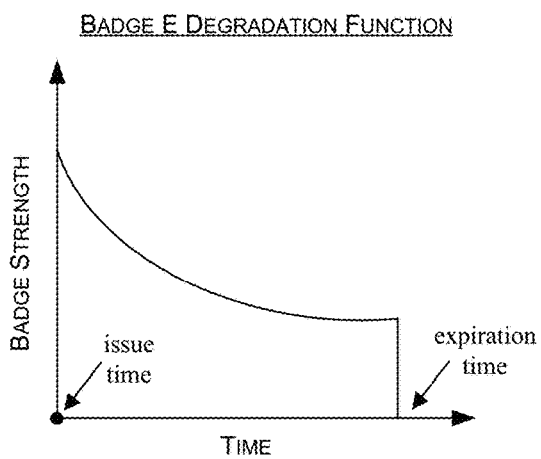
Figure 28F:
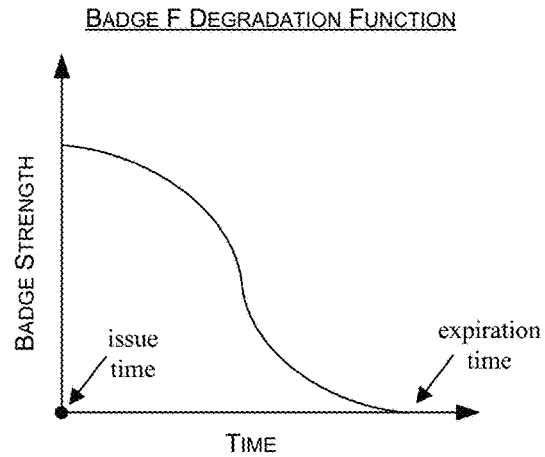

Referring now to FIGS. 28A-F, six example charts are shown representing different degradation functions for a badge. As shown in these examples, a user's skills associated with a earning a badge may be assumed to degrade in a linear fashion, and thus the badge strength (or badge level, etc.) may be calculated as a linear function until its expiration date (FIG. 28A), or may degrade at a slower linear rate until the badge is deemed to be expired even though the user has retained some skills (FIG. 28B). The other examples (FIGS. 28C-28F), illustrate different examples of degradation functions that may be applied to different types of badges.

By using a badge degradation function/chart rather than a simple expiration date, a badging computing environment (e.g., infrastructure and systems 600), various components of the badging infrastructure may support additional searching/matching features and more robust customization of the system for badge earner, employers, badge issuers, and other users. For example, rather than jobs/occupations have different badge requirements (or preferred badges), they may have badge strength (or badge level requirements). For instance, a particular job may require that applicants have earned Badge ABC, and also that this badge has a current status level or strength of at least 80%. Thus, Badge ABC may be deemed to be important to the particular job, and any applicants who have not earned this badge recently (or have not refreshed or practiced the badge skills recently) may need to do so before applying for the job. The job may require a second badge, Badge DEF, but might only require that Badge to have a current status level or strength greater than 0% (i.e., not expired), meaning that although some familiarity with the Badge DEF skills is required for the job, even older and less practiced experience in those skills is sufficient.

Additionally, in some embodiments, the current status or strength of a badge may be used to determine what testing is required for the user to update or recertify their badge back to a newly issued (i.e., 100% strength) badge. Thus, the badge platform server may select a re-certification course or process (e.g., formal testing, simulations, written tests, etc.) that depend on current status of the badge's degradation. If a user's badge is still at 65%, a quicker and customized refresher course may be used to boost the user back to 100%, whereas if the user's badge is down to 5% then the user may be required to re-take the entire certification process again.

Figure 29:
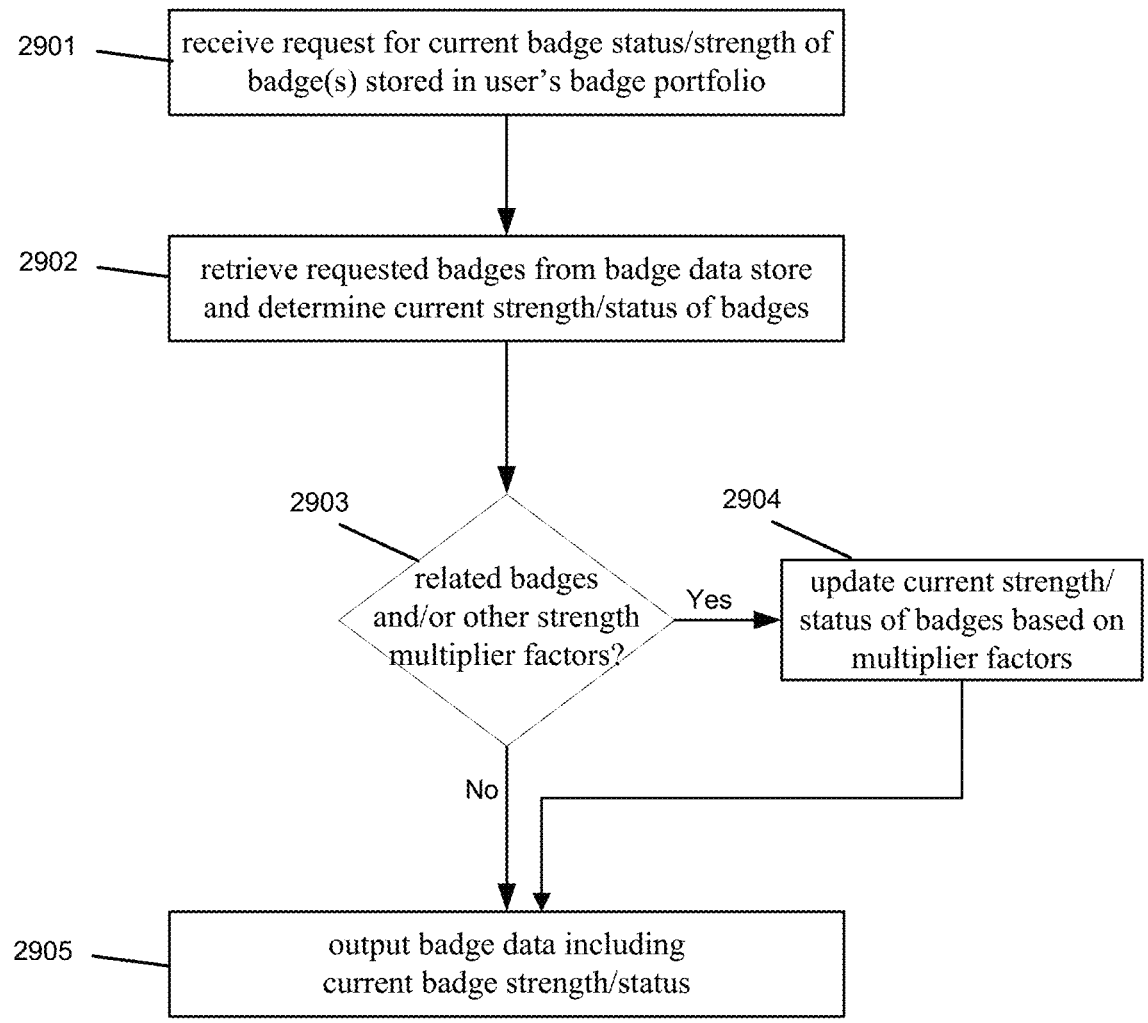
FIG. 29 is a flow diagram illustrating a process for computing and outputting a badge's current status/strength level.

Referring now to FIG. 29, a flow diagram is shown illustrating a process for computing and outputting a badge's current status/strength level. In some embodiments, this process may be performed by a digital credential platform server (e.g., 610, etc.) in response to requests from various clients within the badging network (e.g., badge earners, issuers, employers or educational institutions, etc.). In step 2901, the platform server 610 responsible for storing/maintaining the digital credential data store may receive a request for badge details of a user. In some examples, the request in step 2901 may be from the user himself/herself, who wants to review his/her current badges and badge strengths/statuses, etc. In other examples, the request in step 2901 may be from a current or potential employer, who has been authorized by the user to retrieve and view the user's current badges and badge status as part of a hiring process or review process. In other examples, a badge issuer or badge owner may be authorized to access and review the user's current badge statuses, for badges issued and owned by those entities, in order to recommend recertification or refresher courses, etc. Finally, users may make some or all of their badge status data publicly available (e.g., on a badge by badge basis, or for their entire badge portfolio) and/or may actively post their badge strength/status data within a social media page and/or a digital credential profile page of the user that is maintained and published by the platform server 610.

In step 2902, the platform server 610 may retrieve the user's requested badges and may calculate a current badge status or strength value associated with each badge. As discussed above, while certain badges may simply have a status of expired or active, other badges may have an associated status/strength value that can be calculated using a degradation function. Different degradation functions may apply to different badges types and/or to different users. Thus, the same badge issued to different users may have different half-lives and may degrade at different rates and in different patterns based on a variety of factors. Thus, in step 2902, the platform server 610 may retrieve the degradation function associated with the particular instance of the issued badge to the user, and may calculate the current badge strength/status using the degradation function and the current time/issued time/expiration time.

Additionally, in some embodiments, the half-life of a badge and/or the particular badge strength/status may be affected by the user's other badges and other factors. For example, if the user has earned other complementary badges, badges having overlapping skill sets, related badges from the same issuer, etc., then the platform server may modify the degradation function so that the user's badge degrades more slowly, and/or may apply a badge strength addition factor or multiplier factor. Additionally, the badge degradation rate also be affected by the user's current job/skills, observational data collected from an on-the-job monitoring/credentialing system, an analysis of the user's other related documents (e.g., emails, social media posts, documents, company records, web history, etc.). In step 2903, if the platform server 610 determines that any of these factors applies, then in step 2904 it may modify the current badge status/strength accordingly (e.g., by adding to the status/strength value or multiplying by a determine multiplier factor). Otherwise, if no additional related badges are found in the user's portfolio, and/or if no skills usage data is found relevant to the badge is found by the platform server 610, then the status or strength values determined for each badge are not modified.

In step 2905, the user's requested badge data, including the status or strength values that have determined or computed for each of the requested badges, may be provided in response to the request. As noted above, this more specific and granular badge data that includes a current badge strength/status level may be used to improve the matching of a user's current skill set to associated jobs/occupations, to demonstrate up to date skills during a job hiring or job review process, to suggest a refresher/recertification course for certain users with certain skills, and as a selling point for marketing of related/overlapping badges to reinforce skill sets, etc.

Certain aspects of the invention provide support for storing, maintaining, and serving requests for "resumes" of badge earners/badge receivers. A user's resume may include the collection of badges that user has earned, and which still have an active status, including any or all of the various badge types and examples discussed above. Thus, a user's resume and badge portfolio may include education-based and skills-based badges, professional credentials, personality badges, DNA-based badges, health-based or fitness-based badges, etc. In addition to storing a listing of badges that the user has earned, in some embodiments a user's resume also may include data (or links to data) including the badge details (e.g., badge description, skills, owner, etc.) and issuance details (e.g., issue date, issuer, test center and type of testing process (e.g., written testing, live simulation, augmented reality or virtual reality simulation, etc.), issue location, etc.). Certain user badge resumes also may include current status of the user's badge portfolio, along with evidence data files and/or user authentication data identifying the user authentication techniques/processes associated with the earned badge.

Figures 30A, 30B:
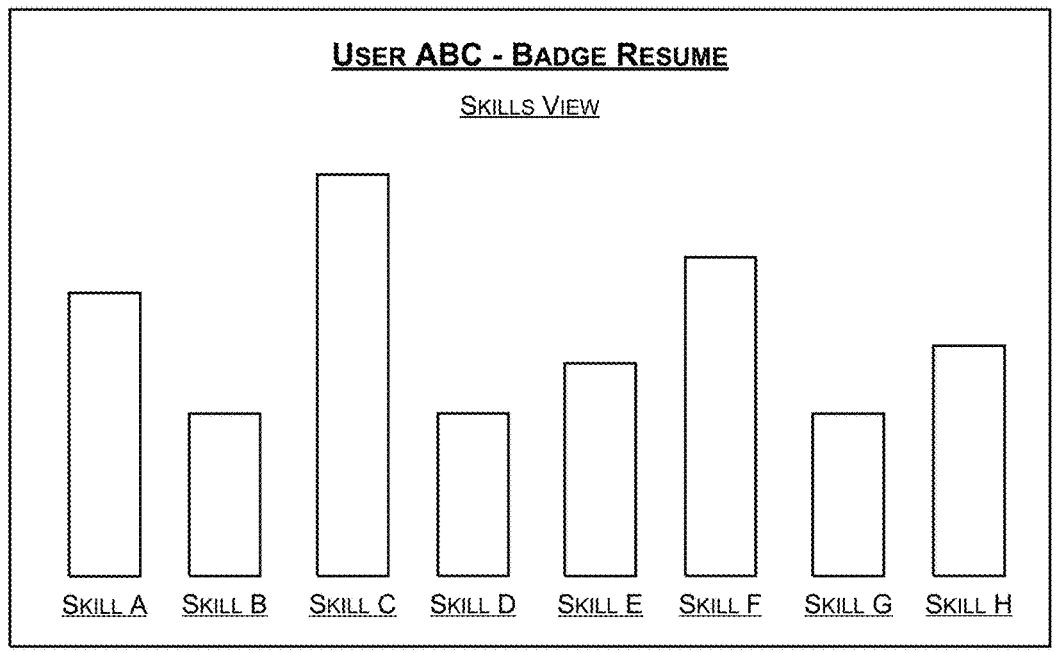
FIGS. 30A and 30B are screenshots depicting examples of different user interface views for displaying a user's badge resume.

In various embodiments, a user's badge resume may include the user's badge portfolio, associated badge data, and/or various user interview views by which the user's resume data may be presented. For example, referring now to FIGS. 30A and 30B, two examples are shown of different user interface views for displaying a user's badge resume. In FIG. 30A, a badge list view 3000a is shown, in which the user interface may present the following data for each currently active badge issued to the user: (1) the badge data (e.g., badge title, description, endorsements, badge owner, etc.), (2) the associated skills listing for each badge, (3) the current status of each badge, which may simply include a status listing of expired or active or a badge status/strength value calculated using a badge-specific and user-specific degradation function, (4) the badge issuer or issuing authority, (5) (optional) links to badge evidence data files providing documented proof that the user actually completed the badging requirements, and (6) data (and/or links) identifying the authentication techniques and processes used by the user when testing/earning the badge (e.g., remote web-based login credentials, biometric authentication during in-person testing (e.g., formal written testing, live simulation or VR/AR simulation, etc.), photo identification and/or signature provided during in-person testing, DNA provided during in-person testing, facial recognition during in-person testing, retinal scan during in-person testing, etc.). With support for all of these various authentication techniques during the badging/testing processes, it may be possible for individuals from different countries and continents, learning skills from unknown schools or data sources, and/or without any government identification documents or formal proof of identity, to nonetheless prove to a potential employer or other resume recipient that the user legitimately and authentically earned the badges on their resume (e.g., based on evidence files and using authentication methods such as facial recognition, biometric data, DNA data, etc.).

In step FIG. 30B, a corresponding skills view 3000b is shown, in which each skill associated with one or more of the badges listed in view 3000a may be aggregated/summed and quantified into a bar graph or other output display. For example, if the user has earned multiple badges and/or profession certifications that are each associated with the skill of "forensic accounting," then a "forensic accounting" skill value may be determined for each badges/certifications (e.g., based on the intensity of badging course/certification, the course level (e.g., intro, intermediate, advance, etc.), the length of the course, how much the course on the skill of the forensic accounting versus other related skills, etc.). Then, the forensic accounting" skill value for each of the badges may be summed and presented in the skills view 3000b.

Badge resume data and views may be designed and customized in a number of ways. For example, users may design or select their preferred badge resume views in order to highlight their strengths and achievements for potential employers. The underlying badge resume data, as well as the badge view user interfaces, may be stored in a central server location (e.g., a digital credential platform server 610), which may receive and respond to requests for badge resumes of various users. In other cases, badge resume data, resume user interface views, underlying evidence and authentication data, etc., may be exported and stored by the individual user. For instance, users may have the functionality to download their badge resume data and user interface views onto a local client computer and/or portable storage (e.g., CD, flash drive, etc.) to allow their resume to be carried to a job interview or shared with others at a networking event, etc.

Figure 31:
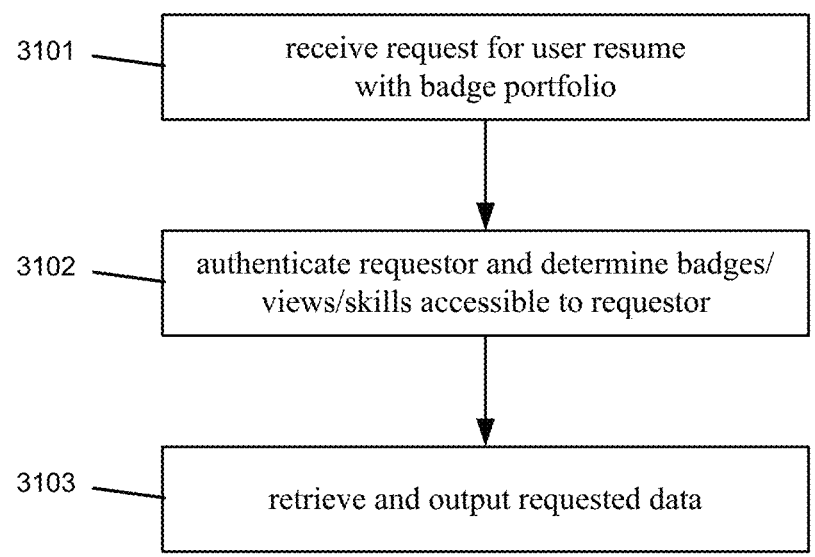
FIG. 31 is a flow diagram depicting a process for receiving and serving requests for a user's badge resume data.

Additionally, each badge listed within a user's badge resume may have associated permissions that govern which users may request and receive the particular badge. For instance, a user may authorize certain other users/groups to retrieve and view the user's badges relating to a particular technical field but not other fields, or may authorize certain users/roles to view the user's education-based and professional skills-based badges but not the user's personality badges or DNA badges, or vice versa. In additional to access permissions on individual badges, separate sets of access permission may be set and enforced for the data associated with the badge (e.g., evidence files, user authentication methods, etc.) and for particular user interface views (e.g., allowing potential employers or other users/roles to see certain views but not others). Thus, referring now to FIG. 31, a flow diagram is shown for receiving and serving requests for a user's badge resume data. In step 3101, a platform server 610 may receive a request for some or all of a particular user's badge resume. In step 3102, the platform server 610 may perform authorization/authentication on the request to determine which badges of the user, as well as related data associated those badges, and/or which resume views the requestor is authorized to access and view for the requested user. In some cases, such determinations may require explicit authorization from the user himself or herself for the requestor to retrieve and view the user's badge resume, in order to prevent any unwanted parties from accessing the user's badge resume. Thus, step 3102 may include verifying the requestor's identity or role and comparing to an access control list or other permissions data associated with individual badges, associated badge evidence or authentication data, and/or specific badge resume views. In some cases, step 3102 may include a real-time request sent by the platform server 610 to a client device associated with the user, to allow the user the option to allow or reject the request for their badge resume. In step 3103, assuming that the requestor has been granted access to some or all of the user's bade resume data, the authorized badge resume view(s), including the user's badge portfolio listing and/or associated badge data may be retrieved and forwarded to the requestor. If the requestor is authorized to access only some of the user's badges, or some of the user's resume views, then the badge data/user interface views retrieved and output in step 3103 may correspond to the subset of the user's full badge resume that the requestor is authorized to view.

In some examples, the request in step 3101 may be from the user himself/herself, who wants to review their badge resume. In other examples, the request in step 3101 may be from a current or potential employer, who has been authorized by the user to retrieve and view the user's badge resume and all work-relevant badges, as part of a hiring process or review process. The user's badge resume may allow the employer or potential employer to quickly view the user's badge portfolio and skills metrics, along with the current status and recent usage data for their badge skills. Additionally, the employer or potential employer may be permitted to view evidence data and/or the user's authentication process data, to verify that the user actually completed the badge requirements, and also may allow the employer or potential employer to observe the user's behaviors, responses, reactions first-hand, thus allowing them to evaluate the user's reaction time, efficiency, mental state, decision-making, etc., and other difficult to quantify characteristics. In still other examples, users may make some or all of their badge resume publicly available (e.g., on a badge-by-badge basis) and/or may actively post their badge resumes as multimedia files or data records within a digital credential profile page of the user that is maintained and published by the platform server 610.

As discussed above, in various embodiments the systems used to govern the creation of new badge types, the issuance of new badges, storing of badges and associated badge data, managing badge endorsements, and the like, may be implemented via a centralized badge platform comprising one or more computer servers. In some cases, the badge platform may be implemented using web servers and/or via web services solutions (e.g., SOAP, REST, etc.), and such systems may be cloud-based, distributed, etc. Access to the data and functionality of the badge platform servers may be enabled via network interfaces and various network communication techniques, including secure protocols, data encryption, and the like.

Figure 32:
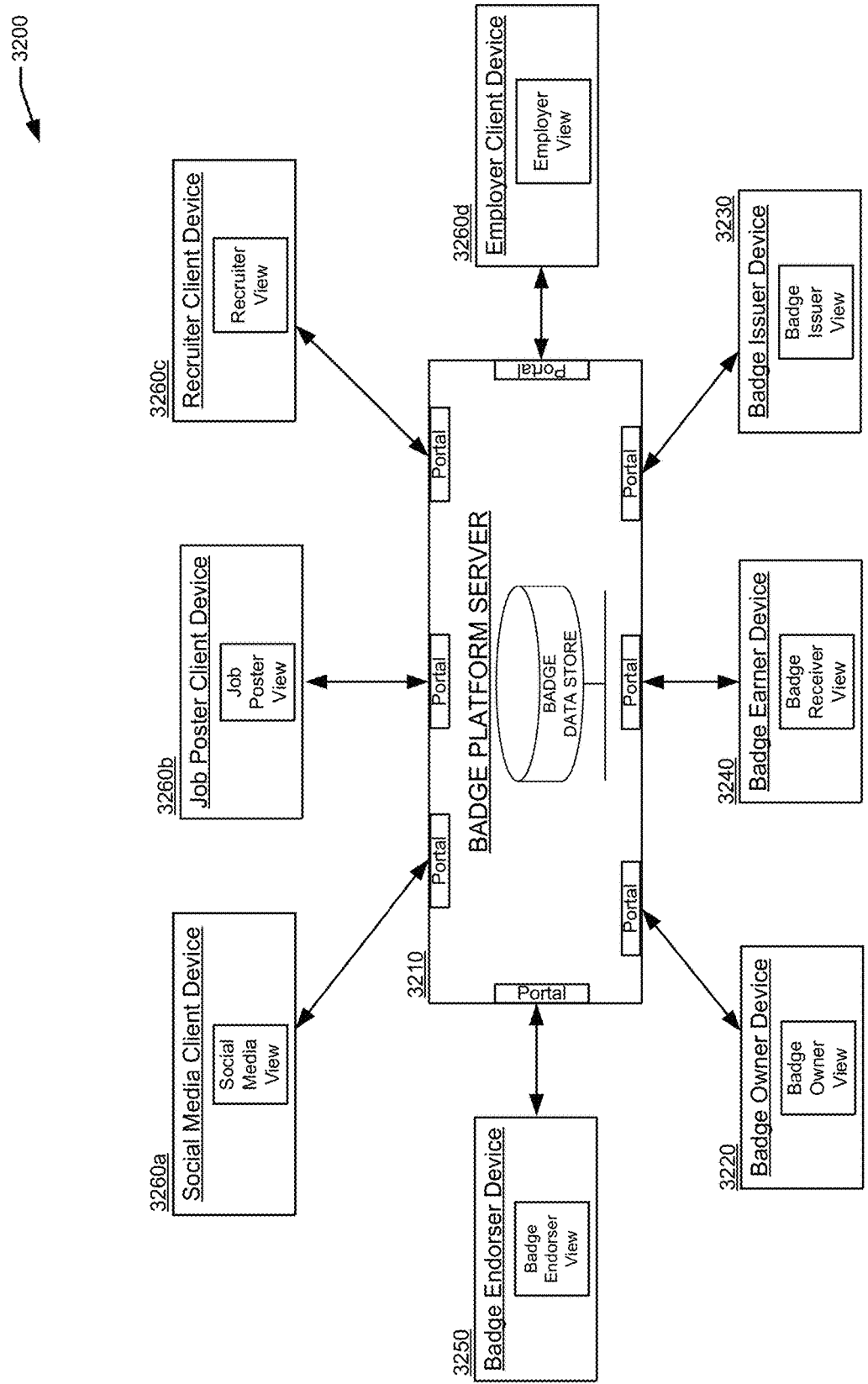
FIG. 32 is a diagram illustrating an example computing environment including an example of badge storage and management system supporting a number of different types of badge-related functionality and requests from various client types.

Referring now to FIG. 32, a block diagram is shown illustrating an example of a badge storage and management system 3200 supporting a number of different types of badge-related functionality and requests from various client types. The badge platform server 3210 may include one or more badging servers similar or identical to the server 610 discussed above. Thus, server 3210 may be configured as a badge repository and credentialing system, supporting interfaces for badge owners, issuers, earners, endorsers, and various other external client devices. As shown, server 3210 may include a badge data store configured to store badging data, such as the details of the particular badges earned by/issued to particular users, as well as other badge-related information (e.g., relationships between badges, badges and skills, badge evidence, job listing data, etc.). In some embodiments, badge platform server 3210 may be implemented by one or more web-based servers and accessible via web-based communication protocols.

As shown in this example, the badge platform server 3210 may support separate access portals and/or provide separate functionality to several different types (or roles) of client devices. For example, badge platform server 3210 may provide functionality to support interactions from badge owners 3220 (e.g., to define and create new types of badges, etc.), badge issuers 3230 (e.g., to issue new badges of a particular type to users who have completed the necessary courses, tests, or other badge requirements, etc.), badge earners/receivers 3240 (e.g., to review and accept badges that have been issued to the earner, and to review and customer the user's badge portfolio, etc.), and badge endorsers 3250 (e.g., to review and provide endorsements to different badge types and/or instances of issued badges to users, etc.). Additionally, badge platform server 3210 may support additional functionality associated with various different types of users seeking different types and/or views of information from the badging system. For instance, the badge platform server 3210 may support separate access portals and/or client functionality directed to social media clients 3260a (e.g., providing badge portfolio views, sharing badges, endorsement functionality, badge-related notifications, etc.), job poster clients 3260b (e.g., creating and importing job listing data into the system, associating job listings or occupations with badges, skills, and/or other badge-related data, etc.), recruiter clients 3260c (e.g., creating and importing job data and/or candidate data into the system, associating candidates with job listings or occupations, and vice versa, etc.), and employer clients 3260d (e.g., viewing organizational badge-related statistics, skills, performing industry analysis and competitive research, etc.).

Figure 33:
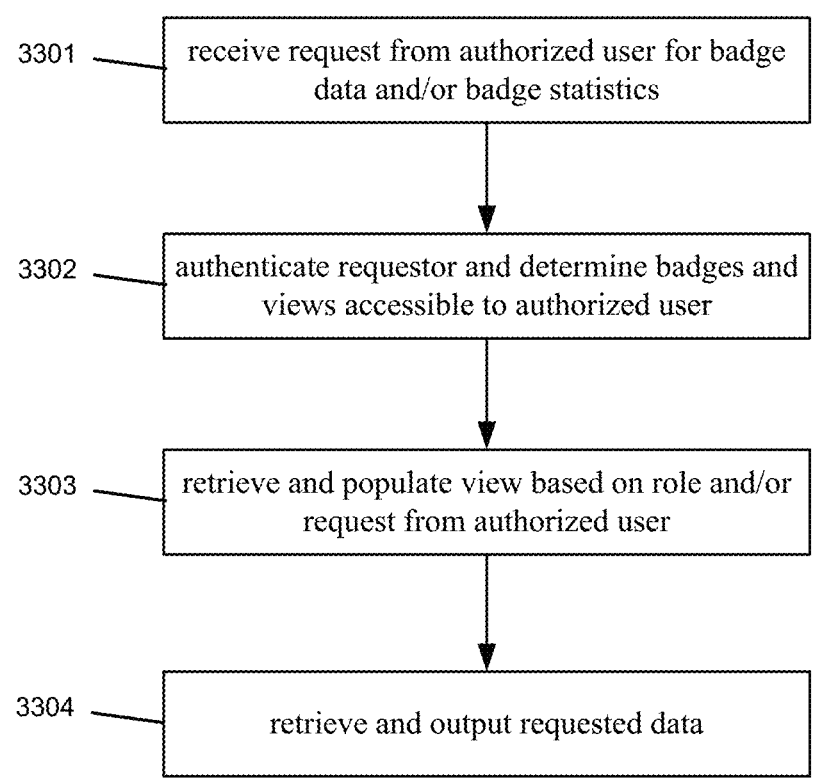
FIG. 33 is a flow diagram depicting a general process for client interaction with a badging/credentialing system.

As shown in this example, a badge platform 3210 may serve different types of clients/requires via different portals. In various embodiments, portals may represent different points of client access to the system 3210, such as different domains, URLs, web services and/or API functions. In some cases, the system 3210 may have a single central point of access (e.g., web-based, service-based, or client application), that may provide access to the different types of client functionality offered after the user is authenticated and/or logged-in. For example, referring now to FIG. 33, a flow diagram is shown providing a general outline for a client interaction with a badging/credentialing system. Thus, in some embodiments, this process may be performed by badge platform server 3210, in response to requests any of the various client types within the badging network described above (e.g., badge earners, issuers, employers, recruiters, etc.). In step 3301, the badge server 3210 responsible for storing/maintaining the badge data store and providing the associated badge-related functionality may receive a request from one of user devices 3220 to 3260. In some examples, the request in step 3301 may be from the a badge earner himself/herself, who wants to review his/her current portfolio of badges, and badge statuses, and other associated badge data, etc. In other examples, the request in step 3301 may be from a badge issuer 3230, badge owner 3220, a current or potential employer of a badge earner 3260, a recruiter 3260, or other third-party.

In step 3302, the badge platform 3210 may authenticate the request received in step 3301 including determining the user type (or role) and access permissions associated with the requesting user (and/or requesting device or access network). In some cases, the request data may indicate the user's role (e.g., based on the URL or access point to which the request was directed, or based on a selection from the user of a particular view to retrieve). For authentication, the badge platform 3210 may validate the requestor's username and password or other credentials provided with the request, to determine whether or not the requestor is an authorized user within the badge network. In some cases, the characteristics of the user's device 3220-3260 and/or characteristics of the access network from which the requestor is communicating also may be used to determine the requestor's level of access. In addition, to determining whether or not the requestor may access the badge platform 3210 at all, step 3302 may further include determining which particular badge data (e.g., user data, badge portfolios, other associated badge data) that the requestor has access to. For instance, an individual entity such as a badge earner or badge issuer may be granted permissions to access their own earned/issued badges, but not badges earned or issued by other private entities. Other entities such as employers, schools, recruiters, etc., may be granted access to the badges and badge portfolios of a specific set of badge owners, issuers, earners that are associated with the entity (e.g., employees, students, or members of the organization) or which have expressly granted permissions to the requestor. Finally, in step 3302, the badge platform 3210 may determine which system features that the requestor is permitted to access. Such features may include a subset of the available user interview views, data analysis features and tools, etc.

In step 3303, the based on the authentication and the requestor's access permissions determined in step 3302, and based on the data/views requested by the requestor, the badge platform 3210 may retrieve and populate one or more views and/or other badge-related features, and in step 3304 may transmit the requested views back to the requestor's device. Several example views and badge-related features are described in the following sections.

As noted above, in some embodiments a badge storage/management network 3200 and/or badge platform server 3210 may be configured to provide features, functionality, and user interface views specific to badge earners. Badge earners (or receivers) 3240 may generally interact with the badge platform server 3210 to accept badges, view and edit their badge portfolio, share badges, etc. Additional badge features may be provided for badge earners looking for new jobs, new careers, and/or new badges to acquire. In some embodiments, badge earners may input or upload their current badges, along with additional qualifications (e.g., educational, skill sets, etc.), and the badge platform server 3210 may determine and provide a list of current job listings (and/or occupations in general) for which the badge earner is qualified. Badge earners also may interact with the badge platform server 3210, to input a job or list of jobs that they have interest in, and may receive from the server 3210 a list of badges, qualifications, and/or skill sets that the badge earner may need to obtain to be qualified for the selected jobs/occupations. As another example, a badge earner may input a particular badge that they are considering earning, and the badge platform server 3210 may output a set of new job options/listings that may potentially become available to the badge earner after earning the selected badge, along with related data such as expected changes in salary, career arc, etc., if the badge earner obtains the badge. These features may be based on artificial intelligence and/or analytics processes performed by the badge platform server 3210, based on source data including job listing databases, job-skills requirements data, and data from other badge earners/job seekers, etc.

Referring now to FIG. 34, an example user interface screen (e.g., a web page or application display screen) is shown representing a badge earner view 3400 that illustrates various features that may be available to authorized badge earners via the badge platform server 3210. As shown in this example, after logging-in to the badge earner user interface 3400, the badge earner may be provided several possible data screens and features related to the user's badge portfolio. Initially, the user may view their badge portfolio (e.g., via the "Badge View" tab), which may include a badge listing of the user's active badge and links to badge-related data such as evidence files and authentication data (e.g., signature files collected during testing, biometric data, etc.). While viewing their badge portfolio, the user interface 3400 may provide badge earner with buttons/links to add or approve a new badge to the portfolio, share badges, remove badges, and/or to download or export a portion or all of the user's badge portfolio to a local computer 3240 or portable storage device.

In various embodiments, other features provided via the badge issuer view 3400 user interface may include an aggregated skills profile for the badge earner (e.g., via the "Skills View" tab) based on the user's earned badges, the badge-skills associations, and other user data acquired by the system related to the badge earner (e.g., badge strength data, on-the-job monitoring data, educational data and other credentials, etc.). Additionally, a job listing tool may be provided in some embodiments, providing the badge earner a set of recommended current job listings (e.g., via the "Job Listings" tab) based on the badge earner's current badge portfolio, skills, and other profile data (e.g., geographic location, career data, current salary, and/or customized parameters provided by the user). The badge platform server

3210 also may provide a set of suggested badges (e.g., via the "Suggested Badges" tab) based on the user's current badge portfolio, current skill sets, employer and current job position, etc. For example, badge suggestions may be based on peer-recommendations of badges in the user's technical field, such as a continuation on to a more advanced badge in an area where the user has already earned a beginner level badge. Additional suggestions may be based on analyses of other badge earner's portfolios having similar or overlapping badges/skills, or badges preferred by the badge earner's current or prospective employers, job market data, etc. In some embodiments, a badge analyzer or badge planner tool may be provided to badge earners (e.g., via the "Badge Planner" tab) that allow the badge earner to particular badge that is not in their portfolio, and the badge platform server 3210 may analyze the effects that additional badge will have the earner's portfolio if the earner were to obtain the badge. The effects may include an updated skills view, additional job listings for which the earner would be eligible, expected changes in salary, job promotion rate, lifetime earnings, etc. Additionally, in some embodiments, the badge platform server 3210 may provide a career planning/mapping tool (e.g., via the "Career Mapping" tab) that allows the user to chart the results of the user's different possible badging scenarios (e.g., letting badges expired, maintaining badges, earning new badges, etc.), and to view the results in terms of short-term and long-term career options. Thus, a career planning/mapping tool may provide a badge curriculum and time table that the badge earner may follow over the next year, five years, ten years, etc., to allow the badge earner to be qualified for their dream job. The career planning/mapping tool may also allow the earner to explore alternative scenarios where they earn different badges at different times, to see the career effect of those decisions. Finally, the career planning/mapping tool may optimize certain career paths for the user by selecting the optimal route in terms of badge cost, time commitment, overall time, and by distinguishing critical badges versus superfluous badges with respect to the user's career aspirations.

As noted above, in some embodiments a badge storage/management network 3200 and/or badge platform server 3210 may be configured to provide features, functionality, and user interface views specific to employers. Employers may have associations with multiple badge earners, including current employees and/or prospective employees such as interview candidates that have granted the employer access to some or all of the their badge portfolio data. Employers may generally interact with the badge platform server 3210 to review the badge portfolios and/or aggregated badge/skill statistics for their employees, review badge portfolios and skills of potential employees, review industry data, perform competitive analyses against badge-related data of other employers, create job postings, discover badges to help better train their workforce, and the like.

Referring now to FIG. 35, another example user interface screen (e.g., a web page or application display screen) is shown representing an employer view 3500 that illustrates various features that may be available to authorized employers that have logged into the badge platform server 3210. As shown in this example, employers may interact with the user interface of the employer view 3500 to review several possible data screens and access badge-related features and tools applicable to the employer's current workforce or business as a whole. In some cases, the employer view 3500 may include a customizable display of the aggregated badge statistics for the employer's workforce (e.g., via the "Badge Stats" tab), which may include an aggregated listing of the badges of the employer's employee, along with related data such as the percentage of employees having each badge, the percentage of employees who have positions that require the badge (rather those who have chosen to earn the badge voluntarily), the salary difference (versus median salary) of badge earners, the average employee level of badge earners, the average review score of badge earners, and the average age of the badge earners. Although in this example the user has selected to review the badge listing for the entire workforce of the employer, in other examples the user may analyze the badge portfolios of individual employees, departments, divisions, product units, office locations, employee levels, and/or any combination of these variables in order to analyze the badge data of a particular subset of the employer's workforce.

In various embodiments, other features provided via the employer view 3500 user interface may include an aggregated skills profile for the employer's workforce (e.g., via the "Skills Stats" tab) based on the earned badges of the employer's workforce, the badge-skills associations, and other workforce data acquired by the system. The employer view 3500 also may provide competitive analysis tools (e.g., via the "Industry Comparison" tab) that allows the employer to compare badge statistics and/or skill statistics of their workforce to other employers in the same industry, and also to compare employment-related metrics such as salaries, benefits, employee satisfaction data, employee retention data, growth data, profitability data, current job listings, and other employer data. Using such data, correlations may be established between particular companies, skills, badges, and company metrics. Additionally, the employer view 3500 may allow the user to create new job postings that will be stored by the badge platform server 3210 (e.g., via the "Job Postings" tab), and/or to review and edit the employer's current job postings. In some embodiments, a customizable candidate search tool also may be provided (e.g., via the "Candidate Search" tab) to allow the employer to proactive identify potential candidates to fill current or upcoming job postings. A candidate search tool may allow the employer to input job descriptions, qualifications, badges/skills, and/or other job-related data (e.g., salary range, geographic location, other skills or traits, etc.), and the badge platform server 3210 may execute a search for corresponding candidates. Additionally, the employer view 3500 in some embodiments may provide a team analyzer and/or team builder tool (e.g., via the "Team Builder" tab) that analyzes a small to medium size work group based on overall skill sets, complementary skills and other abilities/traits (e.g., using personality, emotion, temperament, DNA-based, and/or health-based badge data, etc.), and uses the analysis to evaluate existing teams and to design new teams of collaborative workers based on the data.

As noted above, in some embodiments a badge storage/management network 3200 and/or badge platform server 3210 may be configured to provide features, functionality, and user interface views specific to recruiters. Recruiters may receive authorization to access badge earner portfolios and job listing data from the badge platform server 3210, and may use the data to perform candidate searches based on job listings, job searches based on candidate profiles, and other related recruiter tasks. In some cases, individual recruiter users may first receive authorization to access the badge data store, job listing database, etc., from individual badge earners, employers on behalf of their companies or employees, educational institutions, badge owners or issuers, etc. Various recruiter features may be supported by the badge platform server 3210 to allow a recruiter to input job listing data and find candidates based on the listings, or to search on behalf of a candidate and look for suitable job for the candidate.

Referring now to FIG. 36, another example user interface screen (e.g., a web page or application display screen) is shown representing a recruiter view 3600 that illustrates various features that may be available to authorized recruiters that have logged into the badge platform server 3210. As shown in this example, recruiter analyze job listing data and badge earner portfolio data to attempt to find candidates that match job listings and vice versa. As shown in example user interface 3600, a recruiter view may include a candidate search tool (e.g., accessible via the "Candidate Search" tab) that allows the recruiter to input a job listing identifier and/or a set of job-related criteria, and then to execute a search within the badge data store for qualified candidates with badges/skills that match the position description and skills of the job listing. A related job search tools (e.g., accessible via the "Position Search" tab) may perform a similar analysis that allows the recruiter to input a badge earner identifier, badge portfolio and/or other candidate information, and then to execute a search within an internal or external job listing database for jobs having descriptions, associated badges and/or skills that match the candidate (badge earner) input. For both a candidate search tool and a job search tool, various additional matching analyses and criteria may be includes, for example, geographic regions/locations of the job posting and/or the candidate, expected salary ranges for the job posting and/or the candidate, candidate seniority, career arc, etc. Further, in some embodiments, both job postings and/or candidates may input a customizable list of priorities which can compared to statistics/metrics stored by the badging network 3200 when determining a matching job or matching candidate. For instance, job seekers may provide preferences to recruiters relating to employee satisfaction stability, and/or growth of the hiring companies. Similarly, job posters may provide candidate preferences to recruiters relating to personality types, stress management, personal interaction skills, career arc/career goals of potential candidates, and the like.

As noted above, in some embodiments a badge storage/management network 3200 and/or badge platform server 3210 may be configured to provide features, functionality, and user interface views specific to badge owners and/or badge issuers. Badge owners and/or issuers may interact with the badge platform server 3210 to design, create, and manage different badge types, may issue (and/or revoke) badges of particular types to users, etc. Additionally, in certain badging systems, the platform server 3210 may support functionality to allow badge owners and issuers to evaluate their current badge offerings, review badging statistic, change their badge offerings, discontinue badges, and the like. For example, owners and/or issuers may analyze their owned/issued badges based on demand data for badges and/or skills that the platform server 3210 may compile based on job listings, badge earner portfolio analyses, and market data. In some embodiments, badge owner and/or issuers may be allowed to tailor and group the skills sets of their different badge offerings to modify, customize, and market their badges more effectively to employers and individual badge consumers. Badge owners/issues also may be provided the functionality to examine trends for particular badges and/or particular skills, and also to bundle badges into packages, or to separate out individual badges, based on various analyses of badge data, skills data, job candidate data, job listing data, market data, etc.

Figure 37:
FIG. 37 depicts an example user interface illustrating a badge issuer view that illustrates various features that may be available to badge owners and/or issuers via the badge platform server.

Referring now to FIG. 37, an example user interface screen (e.g., a web page or application display screen) is shown representing a badge issuer view 3700 that illustrates various features that may be available to badge owners and/or issuers via the badge platform server 3210. As shown in this example, after logging-in to the badge issuer view 3700, the badge issuer may be provided several possible data screens and features related to the badges owned by and/or issued by that issuer. Initially, the user may view their issued badge statistics (e.g., via the "Issued Badges" tab), which may include a badge listing of each badge type that the issuer issues, as well as various statistics and issuance metrics such as the number of issued badges of the based type, the percentage of those badges that are still active, the recent trend is badge issuances for that type, the skills associated with the badge type, the issuer's rank among other issuers of the same badge type, etc. While viewing their badge issuance metrics, the user interface 3700 may provide badge issuer with buttons/links to initiate a new issuance of the badge type and/or to revoke a previously issued badge.

In various embodiments, other features provided via the badge issuer view 3700 may include a full description of the issuer's badge-related offerings (e.g., via the "Badge Offerings" tab), which may include all badge types offered, descriptions, skills, offered bundle, packages, associated prices, offering locations for courses, testing, etc. Additionally, skills-based analysis of the issuer's badges and other offerings may be provided (e.g., via the "Badge-Skills Mapping" tab) to allow issuer view aggregated lists of skills associated with its issued badges, and also to design badges and/or badge bundles that focus on particular skills or include multiple complimentary skills within the same bundle. In some embodiments, the badge issuer view 3700 also may include a tool allowing the badge issuer to find job data, both for current jobs and/or job listings, associated with the badge types and bundles the issuer issues (e.g., via the "Badge-Jobs Mapping" tab). A job mapping tool may provide data indicating which of the issuers badges are most highly in demand based on the current job postings in a jobs database.

Certain aspects described herein relate to an automatic recruiting engine and corresponding functionality that may analyze available data within a badging platform and determine matches between individuals (e.g., badge earners) and potential employers. For example, in some embodiments, an automatic recruiting engine may perform some or all of the tasks of a professional recruiter, and may take the place of a recruiter role or a job seeker role by proactively performing matching analyses between available/potential job listings and potential candidates for those jobs. The automatic recruiting engine and/or associated badging platform may provide notifications to users (e.g., badge earners) of job listings for which the user is qualified, and/or notifications to employers that may be looking candidates having a specific skill set and/or matching a specific profile. In certain embodiments, automatic recruiting engine may also include functionality to provide badge earners with suggestions of particular badges that may expand their job prospects, based on analyses of the current job market/job listings and the user's badge portfolio and other qualifications. An advanced skills-based or badge-based matching analysis may be performed, but in certain examples the analysis may include additional factors such as age, seniority, worker career arc, personal candidate data, location, salary expectations, etc.

Figure 38:
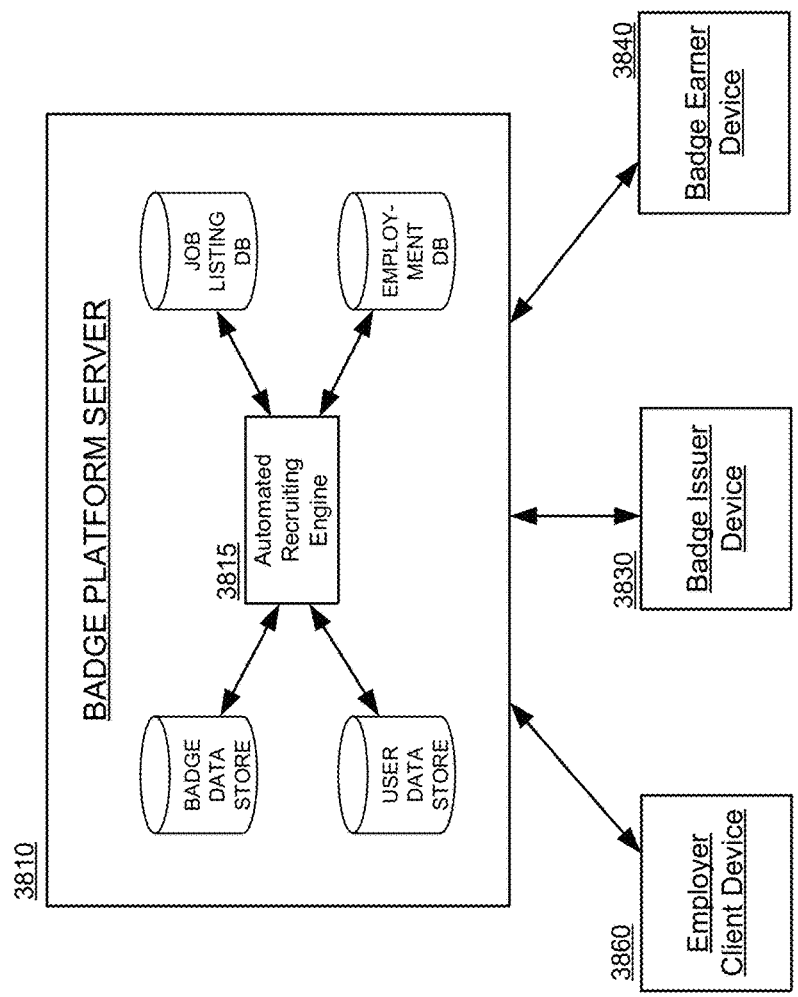
FIG. 38 is a diagram illustrating an example computing environment including a badge platform server in communication with employer client devices, badge issuer devices, and/or bade earner devices.

Referring now to FIG. 38, an example computing environment 3800 is shown, including a badge platform server

3810, in communication with employer client devices 3860, badge issuer devices 3830, and/or bade earner devices 3840. In some examples, the badge platform server 3810 may be a badging server similar or identical to the digital credential server 610 discussed above. Thus, server 3810 may be configured as a badge repository and credentialing system, acting as a clearinghouse for badge owners, issuers, earners, endorsers, etc. As shown in this example, server 3810 may include an automated recruiting engine 3815 configured to perform, among other tasks, an automated matching analysis between potential employees and jobs/employers. In some embodiments, the recruiting engine 3815 may retrieve and analyze worker-related and/or job related data from various data stores, which are shown as internal data stores or database in this example but may be implemented as external data sources in other cases. For instance, badge data stores may be configured to store badging information such as the details of the particular badges earned by particular users (e.g., badge portfolios), including any combination of the badge data and associated data discussed above. Additionally, a user data store may store various user data for users who have earned badges stored within the badge data store. Such user data may include demographic data, employment and educational data, other qualifications, current employment details, current salary and salary preferences, current hours/lifestyle and hours/lifestyle preferences, current work satisfaction, current work location and work location preferences, etc. Additionally, a job listing database may include recent/current jobs postings from various employers. Jobs postings in this database may include a variety of job description data, qualification requirements, and other factors, include data such as job title, job description, required badges, required skills, required educational qualifications, required abilities/traits, job location, job hours/days commitment, job salary or range, company information, and the like. Additionally, in some embodiments data from an employment database also may be used in the matching analyses performed, including data relating to the jobs/positions currently held by workers at different companies. Such employment data may include, for a company's current workforce, current positions held, salaries, locations, job descriptions, skills, requirements, qualifications, technologies used, current job satisfaction level, etc.

In this example, the badge platform server 3810 may receive such data from various external data sources, including employer devices 3860, badge issuer devices 3830, and badge earner devices 3840, as well as other external data sources including job data, employment market data, technical/skills data, etc. As discussed below in more detail, the automated recruiting engine 3815 within server 3810 may use various matching algorithms, analytics engines, and/or artificial intelligence components to analyze the data and identify potential matches between workers and jobs/companies.

Figure 39:
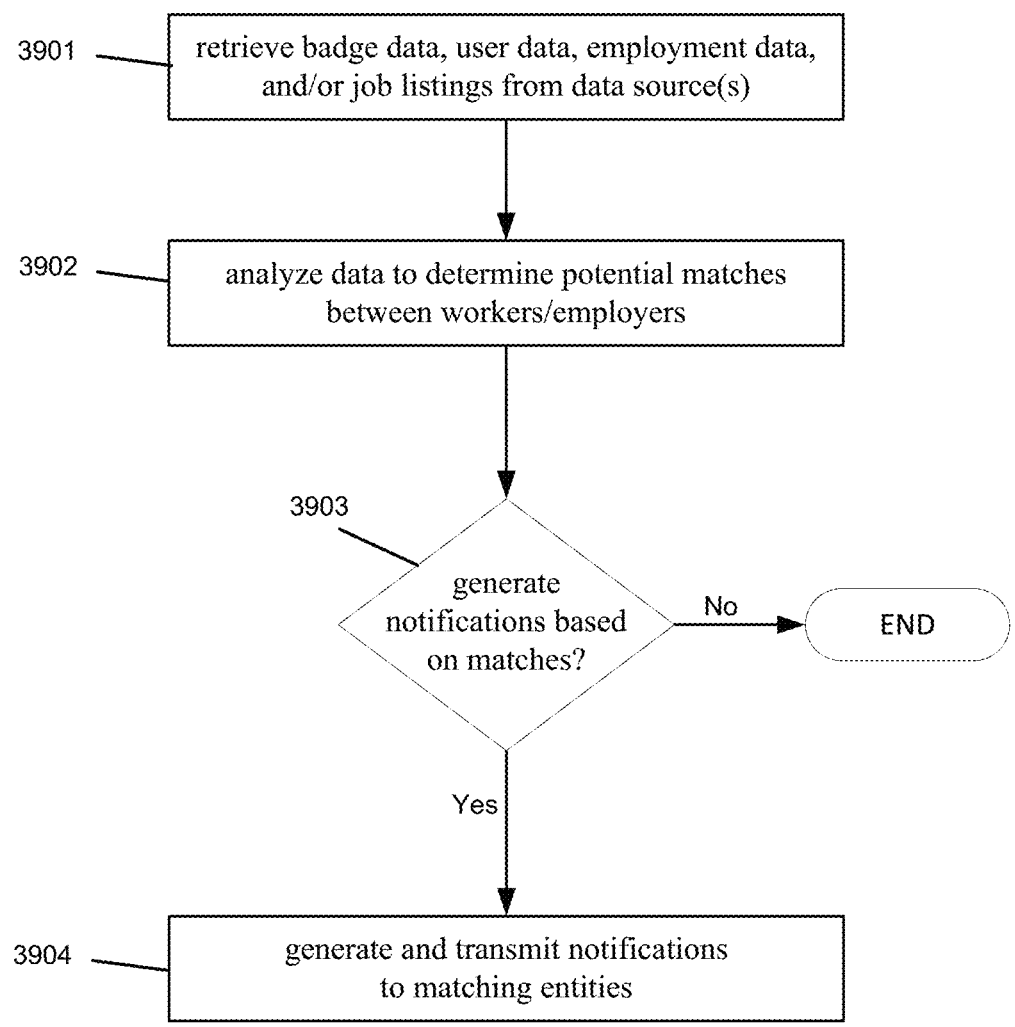
FIG. 39 is a flow diagram illustrating an example process of analyzing worker/employee data, and job/company data, in order to determine potential matches that may be suggested to one or both parties.

Referring now to FIG. 39, a flow diagram shown illustrating an example process of analyzing worker/employee data, and job/company data, in order to determine potential matches that may be suggested to one or both parties. Thus, in some embodiments, this process may be performed by badge platform server 3810, using an automated recruiting engine 3815 to retrieve and analyze data in order to determine possible matches. In step 3901, the recruiting engine 3815 may retrieve badge data, user data, employment data, and/or job listing data relating to one or more employers and users within the badging network 3800. The data retrieved in step 3901 may include any or all of the data from the various data sources discussed above. In step 3902, the recruiting engine 3815 may analyze the data retrieved in step 3901 to determine one or more potential matches between workers and jobs. As noted above, the analysis in step 3902 may use data matching algorithms, analytics engines, and/or artificial intelligence components to analyze the data and identify potential matches between workers and jobs. In some cases, the analysis in step 3902 may be limited to only job seekers, while in other cases the analysis may include currently employed workers (e.g., so the recruiting engine may potentially suggest a new job or career change). Additionally, in some cases, the analysis in step 3902 may be limited to only existing job postings from employers, while in other cases the analysis may match a worker to an employer even if that employer has is not currently hiring. The matching in step 3902 may be based on any combination of the user data, badge/skills data, job data, and employment data discussed above. For instance, the recruiting engine 3815 may even include data points such as the satisfaction level of a current employee which may be determined based on employee surveys or other direct feedback, or inferred based on job seeking/web-browsing behavior, a decline in performance, and/or recently acquiring new badges or other qualifications which may indicate an intention to change jobs or careers. Additional factors such as salary matching, location matching, career arc projections, lifestyle matching (e.g., hours, stress, dress code, corporate culture), also may be used along with badge and skills matching, to determine candidates for jobs/companies and vice versa. In step 3903, the automated recruiting engine 3815 may determine whether or not to transmit notifications based on the worker-to-job/company matches identified in step 3902. In some cases, the determination of whether to transmit a notification may be based on the strength of the match (e.g., a high correlation between the worker characteristics and job listing characteristics greater than a similarly threshold would trigger notifications). The determination also may be based on whether or not the individual user and/or employer has requested or subscribed for such notifications, including any specific criteria provided by the worker (e.g., only notify me of my top 3 matches per week, only notify me of jobs in California, only notify me of jobs with a 15% salary increase, only notify me of jobs that use my most recent acquired badge skills, etc.) and/or specific criteria provided by the employer (e.g., only notify us for matches of current employees of a competitor company, only notify us for matches who have badge ABC, etc.). In step 3904, the notifications determined in step 3903 (if any) may be generated by the automated recruiting engine 3815 and transmitted from the badge platform server 3910 to the appropriate party. In some cases, such notifications may inform the worker or employee of the potential match, but might not reveal the identity of the matching counterparty until a later time (e.g., until both parties except the match or until the party has paid their subscription fee, etc.).

Certain aspects described herein relate to determining and analyzing the skills profiles of users based on the badges those users have earned (and/or additional factors), and then providing feedback and additional functionality to the badge earners based on their skills profile. For instance, different badge offerings may have overlapping skills, or may have complementary skills or substitute skills with respect to certain technical fields or occupations. That is, different badges and/or skills in certain fields may be complementary to one another, in that they may be acceptable substitutes in the eyes of potential employers. Also, different occupations (and/or different technical fields or employers) may require different amounts of training, different sets of badges, different levels of various skills, etc., to be competitive in the job market. For instance, in certain occupations, candidates are often hired for quality entry-level positions after obtained only a bachelor's degree, while in other occupations the candidates generally need a more advanced degree (e.g., a masters or PhD) to be competitive in the job market. Still other occupations require no college degrees. Thus, depending on the candidate and the job/field/occupation they are seeking, it may hinder the candidate's opportunities and job prospects to acquire either too little or too much education (e.g., badges/skills), and will always hinder the candidate to acquire educational degrees, badges, and/or skills that are duplicative of what they already have or are a mismatch for the job or occupation they seek. Thus, certain embodiments herein including determining skills profiles for users and the analyzing/evaluating the skills profiles to suggest badges, map skills profiles to occupations or technical fields, etc.

Figure 40:
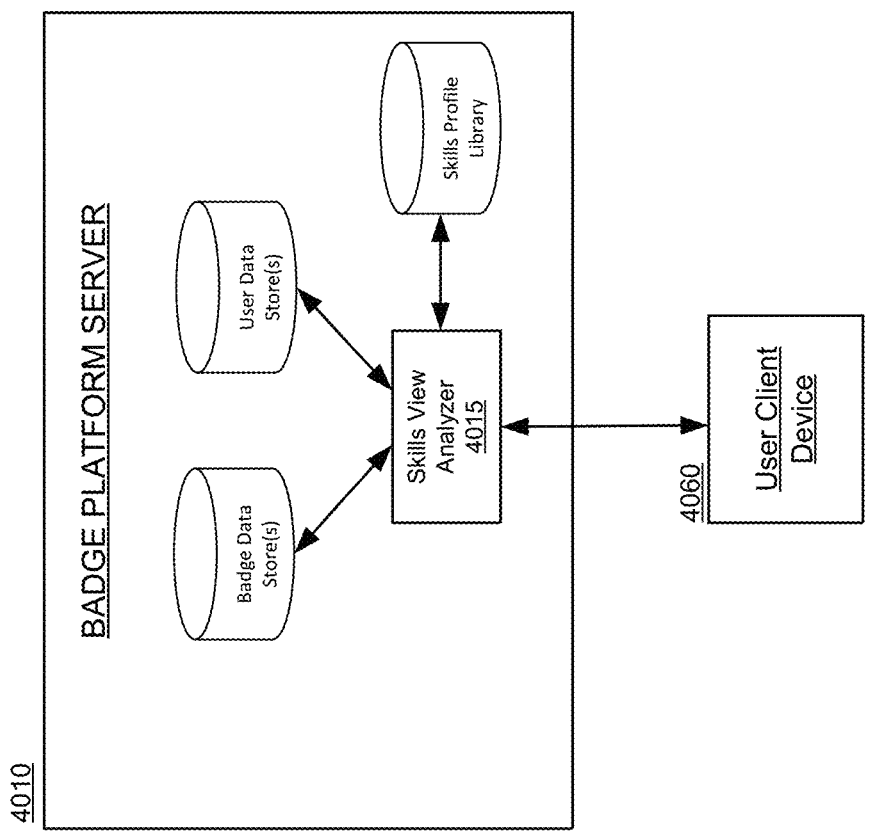
FIG. 40 is a diagram illustrating an example computing environment including a badge platform server configured to retrieve and generate skills view data and analyses using a skills view analyzer.

Referring now to FIG. 40, an example computing environment 4000 is shown, including a badge platform server 4010 configured to retrieve and generate skills view data and analyses using a skills view analyzer 4015. In some examples, the badge platform server 4010 may be a badging server similar or identical to the digital credential server 610 discussed above. Thus, server 4010 may be configured as a badge repository and credentialing system, acting as a clearinghouse for badge owners, issuers, earners, endorsers, etc. As shown in this example, the skills view analyzer 4015 may be configured to receive and respond to requests from user devices 4060 generate skills views based on the user's badge portfolio (and/or other user data), and to analyze the user's skills views with respect to the user's current occupation and/or other occupations and technical fields. In order to establish a skills view for a particular user, the skills view analyzer 4015 may retrieve and analyzer user data from various data stores. For example, a badge data store may be configured to store badging information such as the details of the particular badges earned by particular users (e.g., badge portfolios), including any combination of the badge data and associated data discussed above. Additionally, user data stores may store various additional user data for badge earners, such as demographic data, employment and educational data, other qualifications, current employment details, other attributes/traits, etc. A user's skills profile may be generated by retrieving and aggregating the skills associated with each of the user's badges, factoring in any possible degradation in the skills based on the length of time since each badge was earned, and then further factoring in the additional user data (e.g., educational data, employment data, on-the-job monitoring data, etc.), to determine the user's current skill level for a plurality of different skills.

As discussed below, the user's skills profile may be compared to a plurality of profiles stored within a skills profile library, and each profile in the library may correspond to a particular occupation, job, technical field, or employer, etc. The profiles within the library may be predetermined and pre-stored based on various types of analyses. For instance, skills profiles within the library for certain occupations, jobs, technical fields, and/or employers may be input by an administrative user (e.g., a user associated with a job posting, an employer, etc.). In other cases, skills profiles within the library for occupations, jobs, technical fields, and/or employers may be determined by analyzing current employment data, job listing, etc., and averaging skills (or using other techniques such as vector space analysis) to generate the skill profiles within the library.

Figure 41:
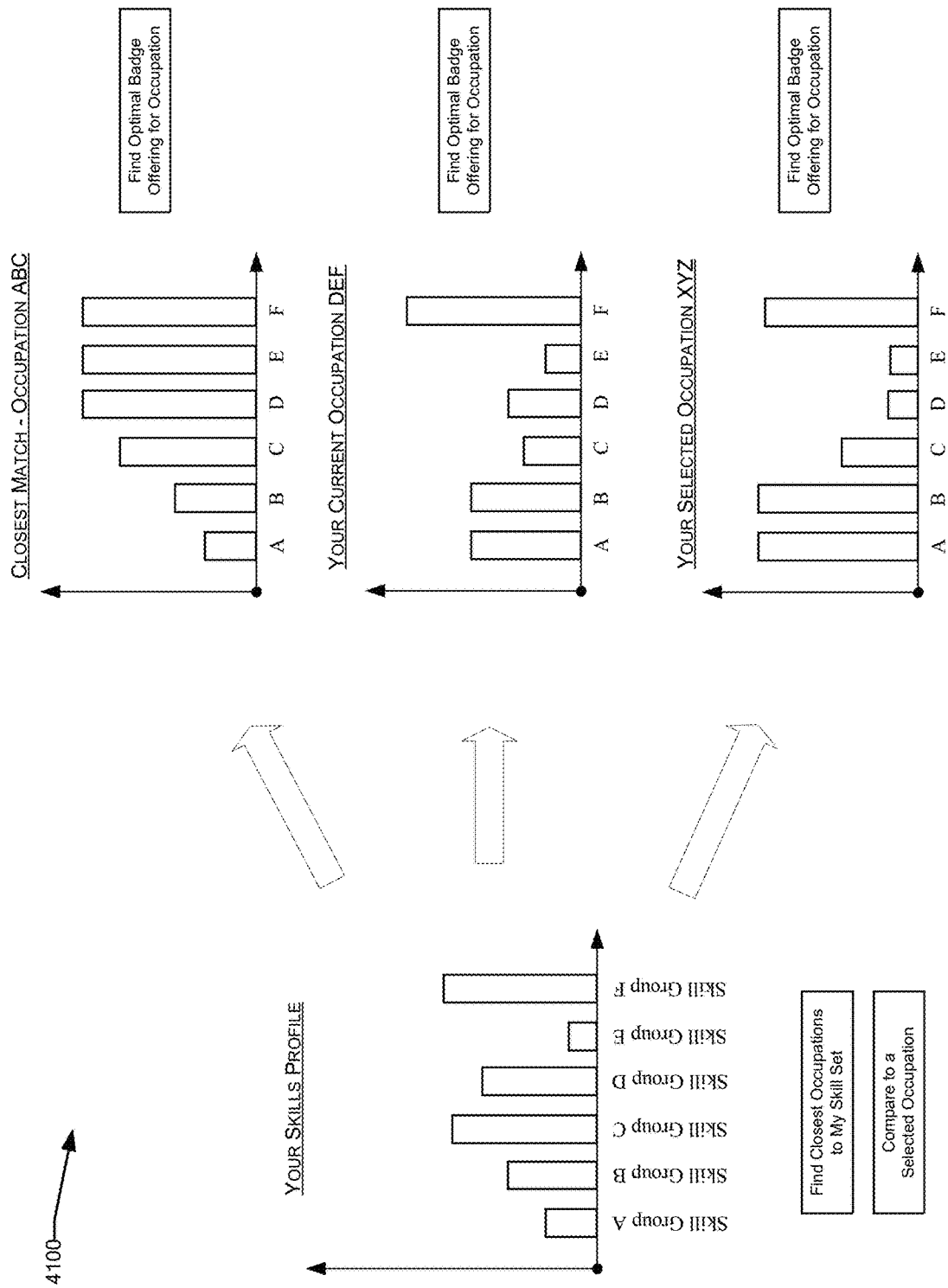
FIG. 41 is a diagram illustrating a user interface screen or multiple related screens showing a visual comparison between a user's skills profile and other related profiles.

Referring now to FIG. 41, an example diagram is shown representing a user interface screen (or multiple related screens) showing a visual comparison between a user's skills profile and other related profiles. In this example, a user has logged in to the skills view analyzer 4015 via a client device 4060 to request a skills profile. The user's skills profile may be displayed graphically, as in this case, with different bars representing the amount (e.g., current level) of different skills groups. In other cases, the user's skills profile may be output numerically via a chart of numbers or a spreadsheet describing the user's current skill level at a variety of different skills. As noted above, the user's current skill level for each skill (or group of related skills) may be determined by analyzing the badges earned by the user, the age of the badges, on-the-job monitoring, other tests and simulations, as well as other user data such as educational data, employment data, other professional certifications or verified traits/abilities of the user.

As shown in this figure, the example user interface may provide the user with options to compare the user's current skills profile against various skills profiles retrieved from the library or from other sources. For instance, the skills view analyzer 4015 may compare the user's skills profile to a minimum skills profile, average skills profile, or preferred/exceptional skills profile for the user's current occupation. Additionally, the skills view analyzer 4015 may search and analyze the library to find one or more different occupations having the closest matching skills profile to the user's current skills profile. In some cases, other criteria may be taken into account during the matching, such as salary, lifestyle, educational qualifications, etc. In still other examples, the skills view analyzer 4015 may permit the user to select one or more occupations for comparison against the user's current skills profile. In addition to these examples, in some embodiments, the user may be permitted to compare their skills profile against the skills profile of another user (e.g., a friend, coworker, etc.), or against their own earlier skills profile (e.g., from the previous year, five years ago, etc.). For all of these examples, the skills view analyzer 4015 may provide additional functionality such as searching for an optimal set of badges that the user could earn to bring the user's current skills profile up to the skill levels of the compared profiles. Additional functionality may include taking into account the anticipated degradation of the user's skills over time, based on time since a badge was earned, current job description/skills, on-the-job monitoring, etc., as well as identifications of badges (currently held by the user or prospective) that may be unnecessary or redundant to achieving the desired skills profile.

Certain aspects described herein relate to systems and methods of employer-specific badging, including different badge types that may be earned by and issued to employers rather than workers, and stored/maintained in a similar or identical badge data store. In some embodiments, badge issuers may tailor offerings to employers, not employees, and evaluate workplaces based on different metrics so employers could earn badges based on their own characteristics, including services and/or benefits provided to the employees. Additionally, employer badge portfolios and other employer data may be used to rank employers, and/or may be used to weight or filter searches of job listings or employment opportunities by recruiters or candidates.

Accordingly, in some embodiments, badge earners may include employer entities that are eligible to earn and be issued particular types of badges specific to employers. There may be some overlap or no overlap between the badge types that can be earned by employers and those that can be earned by individual workers. For instance, since employers are corporate or organizational entities, they generally cannot be evaluated in the same way as an individual (e.g., formal written testing, live action simulations, etc.), but various other evaluation techniques are possible. For example, evaluations of employers may be performed by receiving and analyzing responses to employee surveys, workplace monitoring systems, aggregating individual employee test results, and/or by collecting and evaluating data from various external data sources (e.g., job listing data, governmental data, etc.).

In some cases, employers may be required to expressly apply for specific badges in order to earn these badges, while in other cases employers may be evaluated automatically and may be award badges without needing to expressly apply. Examples of badges that may be earned by employers may include, for example: employee satisfaction badges (e.g., based on determining a minimum threshold of employee satisfaction based on survey responses, turnover ratio/rate of change of employees leaving the company, third-party employee satisfaction studies, etc.), workplace safety badges (e.g., based on number of workplace injuries and accidents as reported by the employer, insurance claims, OSHA, etc.), employer badges for offering specific types of benefits (e.g., parental leave, paid sick days, retirement plan matching, performance bonuses, etc.), employer badges for offering specific a work environment and/or lifestyle options (e.g., part-time work options, job sharing, community involvement options, location flexibility, telecommuting, subsidized employee fitness programs, employee discounts, mentoring and counseling services, paid sabbaticals, tuition assistance, etc.), employer stability badges (e.g., based on reporting of layoffs and downsizing, workforce retainment statistics, job market/hiring data, etc.), employer competitive salary badges (e.g., based on market research data and awarded to employers exceeding a threshold salary within the industry for particular positions). Other possible employer badges may relate to the competence level of the employer's workforce (e.g., based on badges and/or evaluations of individual employees through formal testing, simulations, on-the-job monitoring systems, etc.) and badges awarded to employers that enable and/or encourage their employees to continue developing their skills (e.g., based on rates of new badges earned by existing employees, new skills acquired in different fields, rates of recertification of existing badges and professional certifications, etc.).

Thus, in these embodiments, employers may earn and retain badge portfolios in much the same way as individuals, and within the same infrastructure of badging networks and badge platform server(s) described in various examples above. Employer badges may be stored in the same or similar badge data stores, and employer badge portfolios may be managed and shared in the same way as individual badge portfolios. Employer badges also may degrade over time, like a skills-based badge of an individual badge earner, and requiring the employer to "recertify" the badge periodically (e.g., based on updated employee surveys or statistics, job market data, workplace monitoring data, etc.).

Further, employer badge portfolios stored within badge platform servers may be accessible via portals, APIs, web services, and other techniques, so that employer badge may be accessed and used by a variety of internal and external clients and tools. For instance, recruiter tools, job matching tools, candidate finder tools, and individual recruiters and candidates for job listings may use various employer badges to weight and/or filter job listings results in order to favor employers having certain specified badges. For instance, a job candidate or recruiter using a recruiting or job-matching tool may choose to exclude (or just to de-prioritize) any job listings from the result set from employers that do not have a recent employee high-satisfaction badge. Of course, many other such examples of different user types using search criteria based on employer badges or combinations of badges are possible.

Additional aspects described herein relate to identifying top performers for a particular job, occupation, or employer, and determining top performer profiles for the particular job, occupation, or employer based on the badge portfolios of the identified top performers as well as any other skills, attributes, or traits of the top performers. For instance, the top performers in a particular job may be identified, and the skills profiles of these top performers may be analyzed to determine a Top Performer Blueprint for the particular job. Thus, if an employer wanted to hire N new employees for a particular position, that employer may use the top performer blueprint empirically determined from the existing workforce, including the skills/traits of those top performers, to make hiring decisions for the new positions. The identification of top performers may be done by direct on-the-job observation (e.g., on-the-job monitoring systems with cameras and/or sensors), or by performance output from the employer's systems to measure productivity (e.g., number of products sold, number of maintenance tickets closed, efficiency rate, etc.), or by subjective evaluations (e.g., reviews from supervisors and/or peers), and the like. Then, once the top performers are identified, a top performer blueprint tool within a badge platform system (or other external tools) can analyze the skills and/or traits of the top performers, including badges (e.g., both skills-based, personality/temperament trait badges, health/DNA based badges, etc.), to create the blueprint of top performers. Since the characteristics of top performers may be different from job to job, occupation to occupation, and employer to employer, the top performing blueprint may be difficult to predict in advance, and may be the result of unique sets of factors in different cases. For example, aside from the particular job skills and personality traits required to be top performer, additional factors such as company culture, location/region, etc., may affect which workers are the top performers and which badges/traits are identified within a top performer blueprint.

Figure 42:
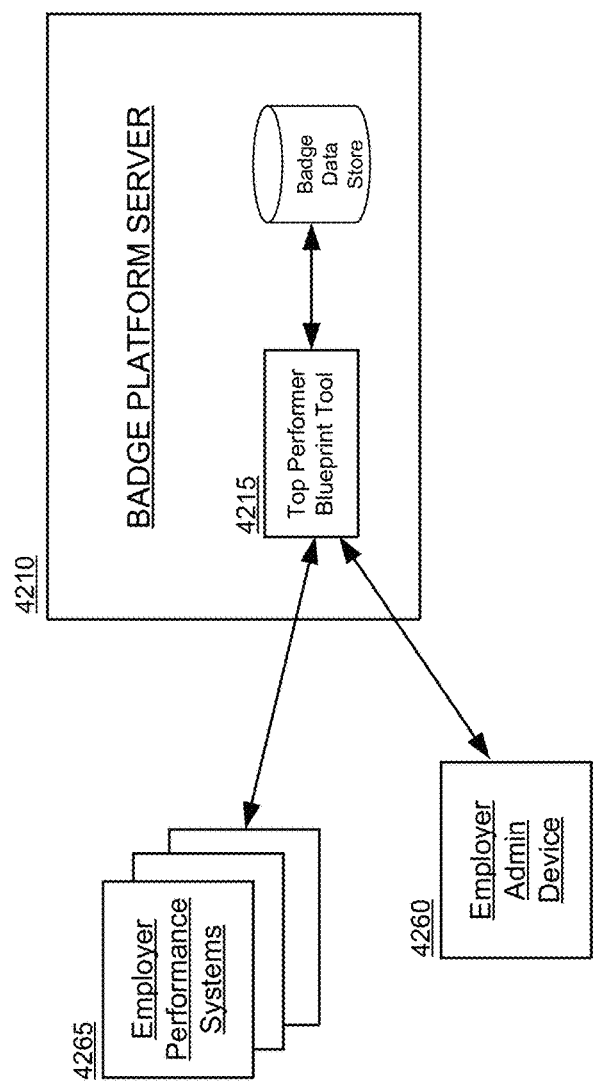
FIG. 42 is a diagram illustrating an example computing environment including a badge platform server in communication with one or more employer performance systems and employer administrator client devices.

Referring now to FIG. 42, an example computing environment 4200 is shown, including a badge platform server 4210, in communication with one or more employer performance systems 4265 and employer administrator client devices 4260. In some examples, the badge platform server 4210 may be a badging server similar or identical to the digital credential server 610 discussed above. Thus, server 4210 may be configured as a badge repository and credentialing system, acting as a clearinghouse for badge owners, issuers, earners, endorsers, etc. As shown in this example, server 4210 may include a top performance blueprint tool, implemented via specialized hardware and/or software configured to retrieve and analyze employee performance data from systems 4265, and to determine top performer blueprints (e.g., a top performer badge portfolio) associated with a particular job, occupation, and/or employer. Employer performance system 4265 may include systems from one employer or several, and may include many different types of performance systems (e.g., formal skills testing systems, simulation testing systems, on-the-job monitoring systems, employee review/evaluation systems, and employee output or productivity systems). Additionally, performance systems 4265 may include systems from other entities, such as supplier systems, customer systems, governmental systems, and the like, from which particular employee performance (e.g., outputs or quality of the employee's work output) can be determined. In contrast, an employer administrator client 4260 may be operated by an individual representative of the employer (e.g., an owner, supervisor, internal recruiter, etc.) used to access the top performer blueprint tool in order to retrieve a top performer blueprint for a particular job opening, position, or for the employer's workforce as a whole.

Figure 43:
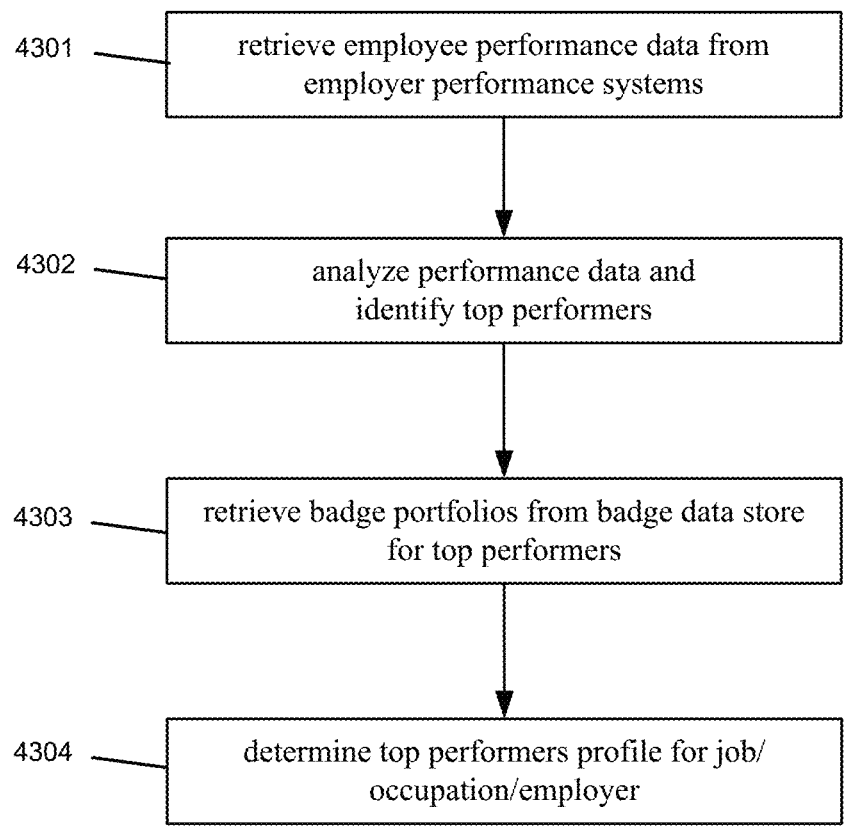
FIG. 43 is a flow diagram illustrating an example process of determining and providing a top performer profile for a particular job, occupation, or employer.

Referring now to FIG. 43, a flow diagram is shown illustrating an example process of determining and providing a top performer profile (e.g., top performer blueprint) for a particular job, occupation, or employer. Thus, in some embodiments, this process may be performed by badge platform server 4210, using a top performer blueprint tool 4215 to retrieve and analyze employee performance data, and correlate that data with the badge portfolios of top performers. In step 4301, the top performer blueprint tool 4215 may retrieve employee performance data from one or more employer performance systems 4265. As noted above, such data may include employee evaluation data (e.g., performance scores, raises, promotions, etc.) employee scores on various work-related testing (e.g., professional certification scores, simulation scores, etc.), employee output (e.g., data metrics regarding employee efficiency, amount of work completed, quality of work completed, etc.), and/or on-the-job monitoring data. In step 4302, based on any combination of the received employee performance data, the top performer blueprint tool 4215 may identify a number of the top performing employees within the company's current (and/or past workforce). In some cases, the top performing employees may be selected from within a particular role at the company (e.g., performing a particular job, at a particular seniority level, at a particular location/region/office, having a salary less than a salary threshold, etc.), in order to match the criteria of new employees being sought by the employer. In different embodiments, different numbers of top performing employees may be selected in step 4302, such as the top 100 performing employees, the top 10% of performing employees, the top 10 most profitable employees from the past N years, etc. In step 4303, for each of the employees identified in step 4302, the top performer blueprint tool 4215 may retrieve the badge portfolio and/or any other available user data. The badge portfolio (or other user data) retrieved in step 4303 may include an aggregated skills profile for the user (e.g., based on the skills associated with each of the user's badges), including personality-based badges (e.g., emotion-related badges, temperament-based badges, etc.), badges for abilities/traits, DNA-based or health-related badges, and/or any other user characteristics determinable from the user's badge portfolio or other user data. Finally, in step 4304, the top performer blueprint tool 4215 may determine a top performers profile for the particular job, occupation, or employer, based on the badge portfolios and other user data retrieved in step 4304. In some examples, the top performer blueprint tool 4215 may identify a set of the most-commonly earned badges among the identified top performing users. Additionally or alternatively, the top performer blueprint tool 4215 may identify the most-common skills among the top performing users, the most-common personality traits, and/or any other common abilities, traits, and/or characteristics shared by some or all of the top performing users, and/or which are particularly strong among the top performing users. Thus, the top performer profile for the particular job, occupation, or employer may then be provided to an employer administrator 4260 and/or other client device (e.g., candidate seeking a job, recruiter seeking to fill an open position, etc.).

Certain aspects described herein relate to determining current and expected market values for particular badge offerings (e.g., individual badges or groups of badges) for particular badge earners. For example, within a badging platform and network, different badge owners and issuers may charge various amounts for their different badges. Costs may include course/training costs, testing and simulation costs, administrative costs and recertification costs. Badge earners, especially those who may be new to the badging system and/or new the job market, may want to know the objective value of a badge offering to decide whether or not it's worth the user's effort (in both time and money) to obtain that badge. Accurate and current calculation of badge values may be difficult because the value may be driven by market factors (e.g., current employment data, current job listing data, etc.), and also may be different for different badge earners (e.g., based on the earner's other similar or complementary badges, based on the earner's current skills profile and other qualifications, etc.). Accordingly, a badge valuation tool may be implemented as a user-facing tool that provides current valuations of each badge for a particular earner (e.g., including both the earner's current badges and potential badges that the earner might decide to obtain). Such tools also may recommend badges to the particular badge earner, based on the current value of the badge, or may recommend substitute badge offering to a potential badge (e.g., a suggestion to get these two badges which are quicker and cheaper, rather than one longer and more expensive badge). Such data also could be provided to badge owners/issuers, to allow them to change the price or availability of their badge offerings, etc.

Figure 44:
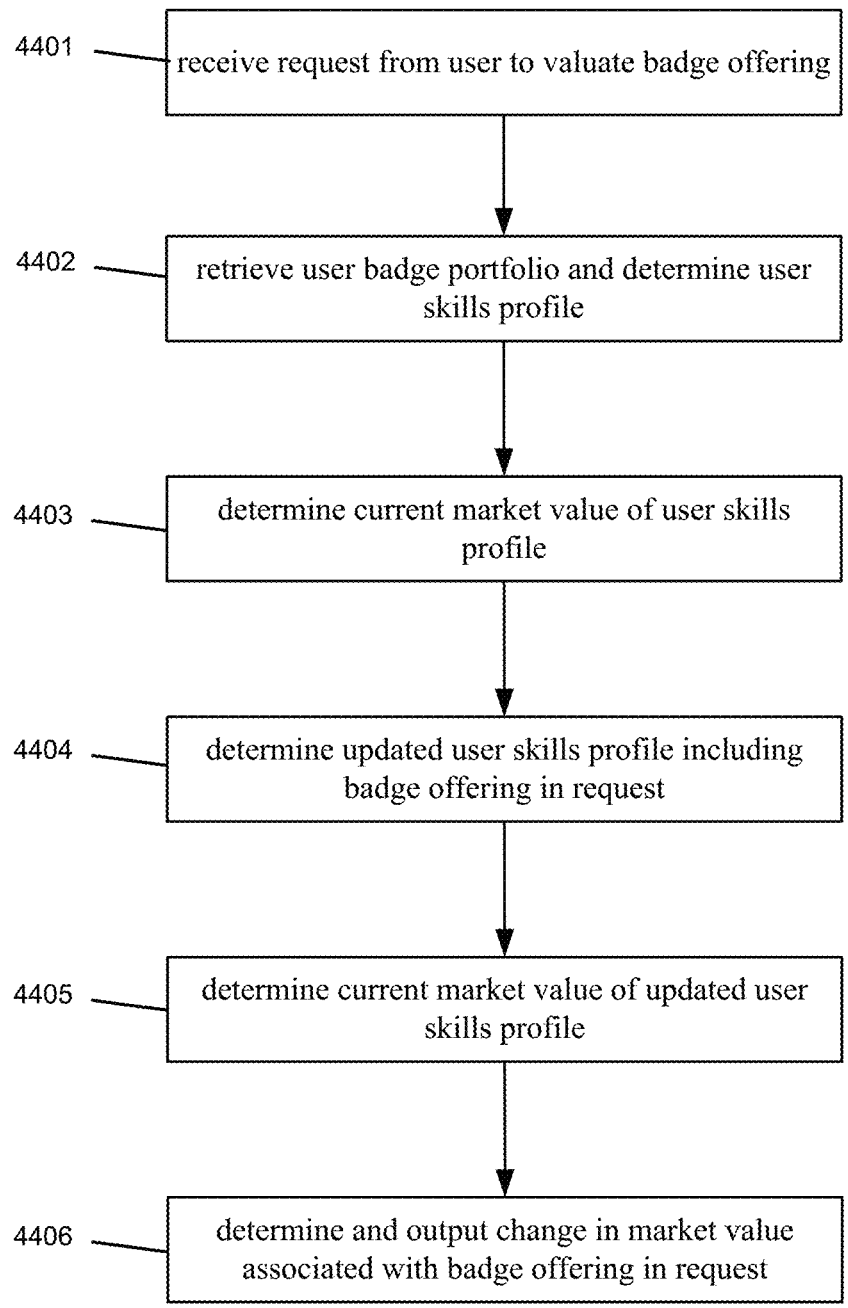
FIG. 44 is a flow diagram illustrating an example process of valuing a badge offering for a particular user within a badge platform system.

Referring now to FIG. 44, a flow diagram is shown illustrating an example process of valuating a badge offering for a particular user within a badge platform system. In some embodiments, this process may be performed by a badge platform server (e.g., 610) using a specialize badge offering valuation tool configured to retrieve and analyze both badge portfolio/skills data, and job market data, as described in various examples above. In step 4401, the badge platform server may receive a request from a user via a client device to determine a value for a particular badge or badge offering (e.g., badge grouping or package) that the user is considering. The badges or badge offerings identified in the request may correspond to new badges that the user is considering obtaining, or to the user's existing badges that the user is considering recertifying (or not recertifying). Additionally, as described below, the request in the step 4401 may be associated with a particular badge earner having an existing badge portfolio and/or user profile data within the system, and thus, the valuation of the badge may be determined with respect to the particular badge user based on his/her badge portfolio and other user data. However, in other examples, it may be possible to determine a value for a badge or badge offering that is not tied to any particular user.

In step 4402, the badge platform server may retrieve the badge portfolio and/or any other available user data (e.g., current employment data, educational qualifications, location data, other skills/abilities data, etc.) for the user that initiated the request in step 4401. Based on the retrieved data, the badge platform server may determine a current skills profile for the user by aggregating the level of the user's skills in different skill areas based on the badges the user has earned and/or other available user data. In step 4403, the badge platform server may determine a current market value associated with the user's current skills profile. The current market value may be based on an analysis of data from multiple different data sources, including data from multiple employer systems within the same technical field (e.g., average skills profiles/skills levels of current employees in different positions, salaries of employees in those positions), current job posting data (e.g., number of type of jobs/positions being advertised by employers, and the number of current candidates with compatible skill sets for those jobs, etc.). In step 4404, the skills profile determined for the user in step 4402 may be updated based on an assumption that the user has obtained the badge (or badges) identified in the request, or taken whatever other prospective action was identified in the request (e.g., learning a new skill, moving cities, obtaining an additional degrees, letting a badge lapse, etc.). In step 4405, the updated skills profile for the user, which may include additional skills, increased levels of existing skills, and/or the reduction or elimination of other skills, may be used to determine an updated market value associated with the updated skills profile. Thus, the process in the step 4405 may be similar or identical to the determination of the market value for the user's current skills profile in step 4403. In step 4406, the change in the market value of the user's skills profile, between the user's current skills profile and the user's updated prospective skills profile may be determined and output to the requesting user.

In some examples, it may be found that the prospective badge offering may greatly increase the market value of the user's skills profile, while in other cases the prospective badge offering might increase the market value of the user's skills profile very little or not at all. The changes may be based on an objective value of the badge offering itself (e.g., the skills offered, the endorsements and determined quality of the badge testing, etc.), as well as the current job market/hiring/employment data, and also based on the user's particular skill set. For instance, if the skills associated with the badge offering are redundant to the user's current skill set, or are not complementary to the user's current skill set, then there may be little or no increase in value for the user to obtain the badges. However, if the skills associated with the badge offering are lacking within the user's current skill set, and/or would be complementary to the user's current skill set, then there may be a significant increase in value for the user to obtain the badges.

In some embodiments, results may be displayed graphically via a user interface, and a variety of different user-facing functionality may be offered based on prospective badge valuation. For instance, the badge platform server may provide tools to allow users to browse and estimate the value to that user of different badge offerings. Related tools may allow employers or recruiters to recommend badges to existing employees or job candidates, and/or may allow badge owners and issuers to evaluate the demand for their own badge offerings. Referring briefly now to FIG. 45, an example user interface screen 4500 is shown displaying the results of a prospective badge search for a particular user ("User ABC"). In this example, a number of possible badges that the user may obtain is shown in response to the user's request, including for each possible badge data identifier the badge issuer, the estimated time commitment that will be required for the user to obtain the badge (e.g., as provided by the issuer), the cost for the user to obtain the badge (e.g., as provided by the issuer), and the estimated change in the market value of the user's skill set that would result from the user obtaining the badge.

Figure 46:
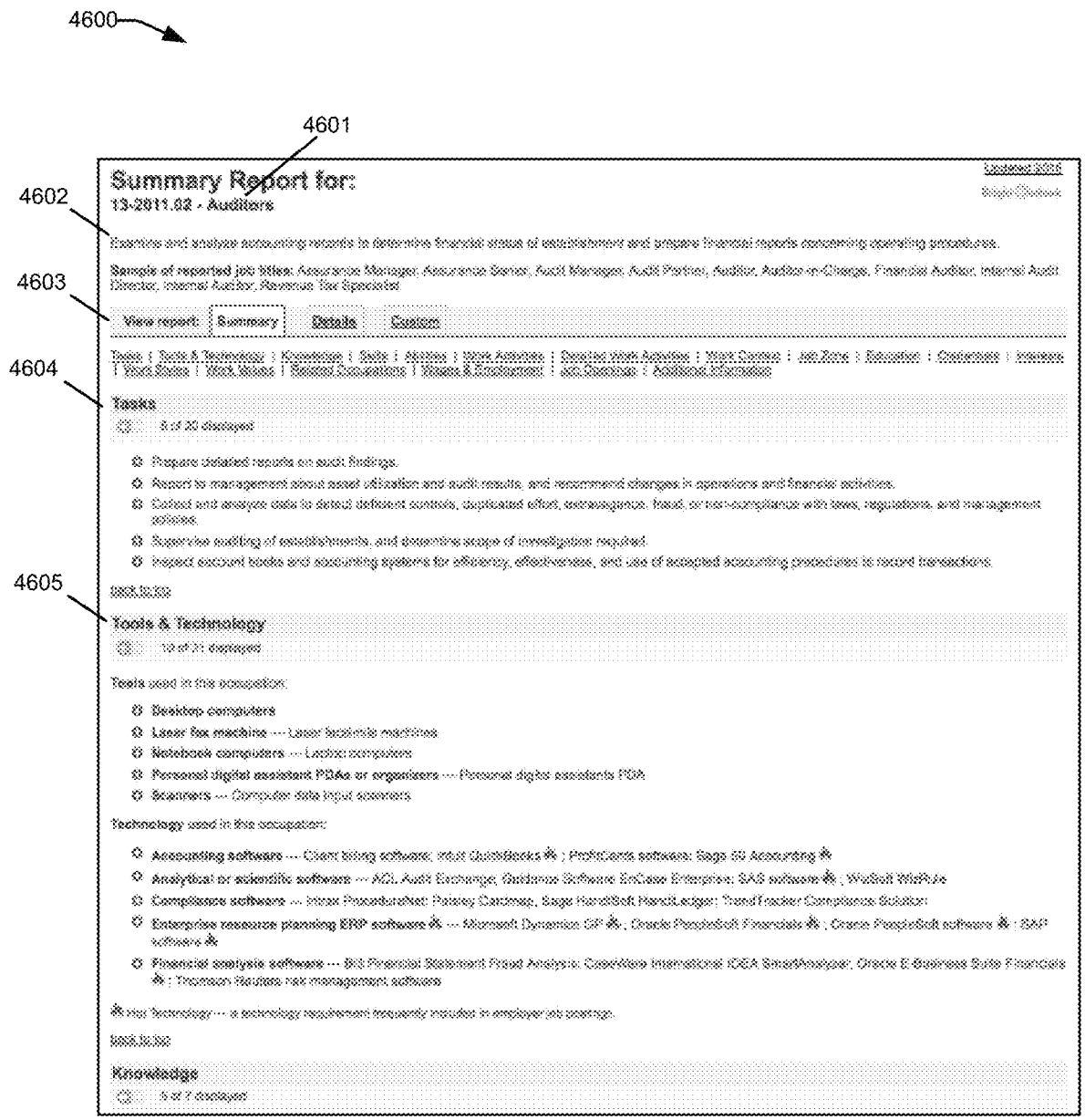
FIG. 46 depicts an example user interface screen depicting an occupation listing web document.

Certain aspects described herein relate to analyzing new occupation listings and/or job listings in order to identify a particular group of skills, badges, and/or users as relevant potential targets for that occupation listing or job listing. For example, referring briefly to FIG. 46, an example occupation listing web document 4600 is shown from an O*NET database corresponding to the "Auditor" field (or occupation). In this example, document 4600 may be formatted in accordance with a known O*NET document format, including separate data fields at predetermined locations within the document 4600 that display the title 4601 of the field/occupation, a description 4602 of the field/occupation, a set of tasks 4603 associated with the field/occupation, a set of related tools and technologies 4604 associated with the field/occupation, and several additional data fields accessible via tabs and links 4605 to provide additional data relating to the field/occupation.

For occupation listings such as these, and/or for individual job postings within a job listing database, the badge platform system may encounter new occupations and/or new jobs that have not previously been analyzed or classified. In these cases, the new occupations and/or new job listings may be analyzed to determine which badges, skills, etc., are potentially relevant to the new occupation or job. An analogy to the analysis performed may be found in recommendation services for media (e.g., streaming music services, online media services, etc.) in which a brand new piece of media (e.g., a new song, new article, new television show, new movie, etc.) has recently been released and does not yet have any direct user feedback. In such cases, the content of the newly-released media may be analyzed in order to determine similarity with existing media items, thus allowing the new media to be recommended to users that are likely to want the new media. Similarly, for any brand new occupation listing and/or new job posting, the badge platform server may identify both the unique fields/characteristics of the new occupation/job, as well as the fields/characteristics shared with other occupation or job listings. The badge platform server may determine which of those fields/characteristics are important and which are not (with respect to determining similarity to other occupations/fields), and then based on the other occupations/fields determined to be similar, the platform server may recommend which badges, skills, and/or other traits/qualifications are most applicable to the new occupation or new job posting. In some embodiments, a processing tools within the badging platform servers may mix and match skills to create several possible occupation flavors, and every possible combination of user badges/skills or other characteristics may be mapped, even if such combinations of badges, skills, and characteristics might never correspond to any real-world occupation.

Additional aspects described herein relate to improved job postings. Currently, job postings are human-made written text descriptions of existing job openings, that may be written by an employer or recruiter with the goal of attracting qualified and interested candidates. Current job postings may include job descriptions, listings of skills, requirements, and/or qualifications that describe which candidates may be appropriate for the job. However, these job postings may often read like an unordered and unlimited set of desirable features for candidates. Not only might the descriptions, skills, requirements, and qualifications within a job posting be a sub-optimal way of describing an ideal candidate (e.g., they may be inaccurate or include unnecessary requirements/skills with compared with analyses of existing top performers), but these lists also exclude more and more candidates the longer they get.

Accordingly, in some embodiments, the process for designing and preparing some or all of the components of job postings (e.g., job descriptions, job requirements, job skills, job technologies, etc.) may be redesigned so that they describe the candidate as a series of trade-offs, rather than an unlimited set of desires. An analogy to the updated analysis performed may be the processing of video game character, in which certain trade-offs are enforced between the character's strengths and corresponding weaknesses (e.g., sacrifice strength for speed, size for intelligence, etc.). A redesigned front-end system may require a job poster to describe (or design) an ideal candidate in terms of trade-offs rather than as a list of qualities, in order to get better information about the desirable characteristics and qualifications of the candidate.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

The invention claimed is:

1. A system, comprising:
a detection system including a plurality of sensors configured to detect employee activity within a physical environment, the detection system being configured to:
  detect, using the plurality of sensors, a plurality of employee activities performed by an employee within the physical environment, and
  transmit a set of sensor data corresponding to the plurality of employee activities performed within the physical environment to one or more digital skill proficiency badge generators;
a digital skill proficiency badge generator configured to:
  determine that the employee is eligible to receive a first digital skill proficiency badge based on the plurality of employee activities performed within the physical environment;
  store a first digital skill proficiency badge associated with the employee in a digital skill proficiency badge repository;
a processing unit comprising one or more processors operated by an employer;
one or more network interfaces; and
memory coupled with and readable by the processing unit and storing therein a set of instructions that, when executed by the processing unit, causes the processing unit to:
  access an employee records database to identify a plurality of employees;
  identify a first set of employees in the plurality of employees, wherein each employee in the first set of employees belong to a single department within the employer;
  for each employee in the first set of employees, access a server computer hosting the digital skill proficiency badge repository to identify a plurality of digital skill proficiency badges associated with the employee;
  analyze the plurality of digital skill proficiency badges of each employee in the first set of employees to generate a statistical analysis of the plurality of digital skill proficiency badges by:
  determining an age of a digital skill proficiency badge associated with each employee in the first set of employees,
  determining, for each digital skill proficiency badge associated with each employee, a badge strength value by applying a degradation function against the digital skill proficiency badge based on the age of the digital skill proficiency badge,
  encoding an indicator of the badge strength value into the statistical analysis, and
  determining a percentage of employees in the first set of employees that are associated with a first digital skill proficiency badge;
encode the statistical analysis into a user interface, wherein the statistical analysis includes the indicator of the badge strength value;
transmit the user interface including the statistical analysis to a user device;
identify a second set of employees in the plurality of employees, wherein each employee in the second set of employees is associated with a second digital skill proficiency badge;
determine a first average salary of the employees in the second set of employees;
identify a third set of employees in the plurality of employees, wherein each employee in the second set of employees is not associated with the second digital skill proficiency badge;
determine a second average salary of the employees in the third set of employees;
determine a second statistical analysis by comparing the first average salary to the second average salary; and
transmit second data identifying the second statistical analysis to the user device.

2. The system of claim 1, wherein the processing unit is further configured to:
identify a fourth set of employees in the plurality of employees, wherein each employee in the fourth set of employees is associated with a third digital skill proficiency badge;
access a database storing human resources data to determine an average review score for the employees in the fourth set of employees;
determine a third statistical analysis based upon the average review score; and
transmit third data identifying the third statistical analysis to the user device.

3. The system of claim 1, wherein identifying the first set of employees in the plurality of employees includes identifying the first set of employees, wherein each employee in the first set of employees belong to a single collaborative team.

4. A method, comprising:
detecting, using a plurality of sensors in a physical environment, a plurality of employee activities performed by an employee within the physical environment;
determining that an employee is eligible to receive a first digital skill proficiency badge based on the plurality of employee activities performed within the physical environment;
storing a first digital skill proficiency badge associated with the employee in a digital skill proficiency badge repository;
accessing an employee records database to identify a plurality of employees;
identifying a first set of employees in the plurality of employees, wherein each employee in the first set of employees belong to a single department within the employer;
for each employee in the first set of employees, accessing a server computer hosting the digital skill proficiency badge repository to identify a plurality of digital skill proficiency badges associated with the employee;
analyzing the plurality of digital skill proficiency badges of each employee in the first set of employees to generate a statistical analysis of the plurality of digital skill proficiency badges by:
  determining an age of a digital skill proficiency badge associated with each employee in the first set of employees,
  determining, for each digital skill proficiency badge associated with each employee, a badge strength value by applying a degradation function against the digital skill proficiency badge based on the age of the digital skill proficiency badge,
  encoding an indicator of the badge strength value into the statistical analysis, and
  determining a percentage of employees in the first set of employees that are associated with a first digital skill proficiency badge;
encoding the statistical analysis into a user interface, wherein the statistical analysis includes the indicator of the badge strength value; and
transmitting the user interface including the statistical analysis to a user device;
identifying a second set of employees in the plurality of employees, wherein each employee in the second set of employees is associated with a second digital skill proficiency badge;
determining a first average salary of the employees in the second set of employees;
identifying a third set of employees in the plurality of employees, wherein each employee in the second set of employees is not associated with the second digital skill proficiency badge;
determining a second average salary of the employees in the third set of employees;
determining a second statistical analysis by comparing the first average salary to the second average salary; and
transmitting second data identifying the second statistical analysis to the user device.

5. The method of claim 4, further comprising:
identifying a fourth set of employees in the plurality of employees, wherein each employee in the fourth set of employees is associated with a third digital skill proficiency badge;
accessing a database storing human resources data to determine an average review score for the employees in the fourth set of employees;
determining a third statistical analysis based upon the average review score; and
transmitting third data identifying the third statistical analysis to the user device.

6. The method of claim 4, wherein identifying the first set of employees in the plurality of employees includes identifying the first set of employees, wherein each employee in the first set of employees belong to a single collaborative team.

7. A non-transitory computer-readable medium, having instructions stored therein, which when executed by a computing system cause the computing system to perform a set of operations comprising:
- detecting, using a plurality of sensors in a physical environment, a plurality of employee activities performed by an employee within the physical environment;
- determining that an employee is eligible to receive a first digital skill proficiency badge based on the plurality of employee activities performed within the physical environment;
- storing a first digital skill proficiency badge associated with the employee in a digital skill proficiency badge repository;
- accessing an employee records database to identify a plurality of employees;
- identifying a first set of employees in the plurality of employees, wherein each employee in the first set of employees belong to a single department within the employer;
- for each employee in the first set of employees, accessing a server computer hosting a digital skill proficiency badge repository to identify a plurality of digital skill proficiency badges associated with the employee;
- analyzing the plurality of digital skill proficiency badges of each employee in the first set of employees to generate a statistical analysis of the plurality of digital skill proficiency badges by:
  - determining an age of a digital skill proficiency badge associated with each employee in the first set of employees,
  - determining, for each digital skill proficiency badge associated with each employee, a badge strength value by applying a degradation function against the digital skill proficiency badge based on the age of the digital skill proficiency badge, and
  - encoding an indicator of the badge strength value into the statistical analysis, and
  - determining a percentage of employees in the first set of employees that are associated with a first digital skill proficiency badge;
- encoding the statistical analysis into a user interface, wherein the statistical analysis includes the indicator of the badge strength value;
- transmitting the user interface including the statistical analysis to a user device;
- identifying a second set of employees in the plurality of employees, wherein each employee in the second set of employees is associated with a second digital skill proficiency badge;
- determining a first average salary of the employees in the second set of employees;
- identifying a third set of employees in the plurality of employees, wherein each employee in the second set of employees is not associated with the second digital skill proficiency badge;
- determining a second average salary of the employees in the third set of employees;
- determining a second statistical analysis by comparing the first average salary to the second average salary; and
- transmitting second data identifying the second statistical analysis to the user device.

8. The non-transitory computer-readable medium of claim 7, wherein the instructions cause the computing system to perform:
- identifying a fourth set of employees in the plurality of employees, wherein each employee in the fourth set of employees is associated with a third digital skill proficiency badge;
- accessing a database storing human resources data to determine an average review score for the employees in the fourth set of employees;
- determining a third statistical analysis based upon the average review score; and
- transmitting third data identifying the third statistical analysis to the user device.

9. The system of claim 1, wherein the processing unit is configured to:
- determine that a first employee is associated with a first digital skill proficiency badge and a second digital skill proficiency badge, wherein the first digital skill proficiency badge and the second digital skill proficiency badge are associated with the same skill set; and
- modify the degradation function applied to the first digital skill proficiency badge to reduce a rate of degradation of the first digital skill proficiency badge over time.

* * * * *